(12) United States Patent
Loh et al.

(10) Patent No.: US 12,551,636 B2
(45) Date of Patent: Feb. 17, 2026

(54) INHALABLE MEDICAL AEROSOL DISPENSING SYSTEM

(71) Applicant: National University of Singapore, Singapore (SG)

(72) Inventors: Wee Chuan Melvin Loh, Singapore (SG); Hugo Van Bever, Singapore (SG); Tsui Ying Rachel Hong, Singapore (SG); Jing Ze Li, Singapore (SG)

(73) Assignee: National University of Singapore, Singapore (SG)

( * ) Notice: Subject to any disclaimer, the term of this patent is extended or adjusted under 35 U.S.C. 154(b) by 852 days.

(21) Appl. No.: 17/427,906

(22) PCT Filed: Apr. 9, 2020

(86) PCT No.: PCT/SG2020/050217
§ 371 (c)(1),
(2) Date: Aug. 2, 2021

(87) PCT Pub. No.: WO2020/209798
PCT Pub. Date: Oct. 15, 2020

(65) Prior Publication Data
US 2022/0105285 A1 Apr. 7, 2022

Related U.S. Application Data

(60) Provisional application No. 62/832,892, filed on Apr. 12, 2019.

(51) Int. Cl.
*A61M 15/00* (2006.01)
*G16H 20/10* (2018.01)

(52) U.S. Cl.
CPC ...... *A61M 15/002* (2014.02); *A61M 15/0021* (2014.02); *A61M 15/0065* (2013.01);
(Continued)

(58) Field of Classification Search
CPC .. A61M 15/0086; A61M 15/008; G61H 20/13
See application file for complete search history.

(56) References Cited

U.S. PATENT DOCUMENTS 6,210,272 B1 * 4/2001 Brown ............... A63F 13/30
434/350
6,347,629 B1 * 2/2002 Braithwaite ...... A61M 15/0086
128/203.15
(Continued)

*Primary Examiner* — Kendra D Carter
*Assistant Examiner* — Jaeick Jang

(57) ABSTRACT

A respiratory therapy management system includes intelligent valved holding chamber devices (IVHCs) corresponding to patients. Each IVHC generates air inflow data during an inhalation therapy session, and determines an inhalation technique score for the session. For each IVHC, a mobile computing device receives and processes inhalation technique scores; generates composite inhalation technique scores and inhalation therapy regimen compliance scores corresponding to multiple inhalation therapy sessions; and presents visual representations of such scores. A remote therapy management server manages patient incentive awards; provides a social media platform and/or games accessible to patients; and communicates with physician computing devices to facilitate physician review of composite inhalation technique scores and inhalation therapy regimen compliance scores, and physician access to the social media platform. For a given patient, provision of incentive awards, aspects of social media interaction, and/or game play depend upon their composite inhalation technique scores and/or inhalation therapy regimen compliance scores.

11 Claims, 27 Drawing Sheets

(52) U.S. Cl.
CPC .......... *A61M 15/009* (2013.01); *G16H 20/10* (2018.01); *A61M 2205/3334* (2013.01); *A61M 2205/3553* (2013.01); *A61M 2205/3584* (2013.01); *A61M 2205/502* (2013.01); *A61M 2205/52* (2013.01); *A61M 2205/583* (2013.01); *A61M 2230/42* (2013.01)

(56) References Cited

U.S. PATENT DOCUMENTS

| | | | | |
|---|---|---|---|---|
| 9,352,107 | B2* | 5/2016 | Von Hollen | A61M 15/0016 |
| 11,395,890 | B2* | 7/2022 | Meyer | A61B 5/0873 |
| 2015/0100335 | A1* | 4/2015 | Englehard | G16H 40/63 |
| | | | | 705/2 |
| 2016/0325058 | A1* | 11/2016 | Samson | A61B 5/0022 |
| 2017/0270260 | A1* | 9/2017 | Shetty | G16H 40/67 |
| 2017/0333645 | A1* | 11/2017 | Alizoti | A61M 15/0086 |
| 2019/0038854 | A1* | 2/2019 | Fuchs | A61M 15/00 |
| 2019/0134460 | A1* | 5/2019 | Cheu | A63F 13/245 |
| 2019/0298942 | A1* | 10/2019 | Koblenski | A61B 7/003 |
| 2022/0047822 | A1* | 2/2022 | Vokey | A61M 15/008 |

* cited by examiner

Add Note

828

Rewards

Rewards

Icy Dessert
Chris is 80% to Target!
Target 100%

Universal Studios
Chris is 30% to Target!
Target 70%

New Bag
Chris is 20% to Target!
Target 80%

*Create Reward*

*Reward History*

860

INHALABLE MEDICAL AEROSOL DISPENSING SYSTEM

CROSS-REFERENCE TO RELATED APPLICATIONS

This application is a U.S. National Phase entry of International Patent Application No. PCT/SG2020/050217 filed 9 Apr. 2020, which claims priority to U.S. Provisional Patent Application Ser. No. 62/832,892 filed on 12 Apr. 2019, each of which is incorporated by reference herein in its entirety.

TECHNICAL FIELD

Aspects of the present disclosure relate to a medical aerosol dispensing system having at least one intelligent valved holding chamber (IVHC) interfaceable with a medical aerosol inhaler.

BACKGROUND

Inhalable medical aerosols are commonly dispensed from an inhaler device or inhaler, which is formed as a holder or housing having a cavity therein, into which a conventional or standard pressurized medical aerosol canister is removably insertable. Such an inhaler is typically referred to as a propellant-based (e.g., hydroxyfluoroalkane (HFA)) inhaler or a pressurized metered dose inhaler (pMDI). To enhance or optimize the intake and delivery of a therapeutic dosage of an inhaled medical aerosol into intended respiratory pathways, individuals can employ a spacer or valved holding chamber (VHC) that interfaces with the inhaler. The spacer or VHC provides an internal chamber or compartment that disperses or expands the medical aerosol therein, and decreases the velocity of the medical aerosol as it travels towards the individual's mouth. For many individuals, spacer or VHC usage is relatively straightforward. However, the correct inhalation technique in the presence of the spacer or VHC may not be straightforward for some individuals, particularly young or easily-distracted children or individuals with learning disabilities.

In addition, medical aerosols are generally self-administered by individuals or patients in accordance with an inhalation therapy regimen that is determined or specified by a clinician or physician. The onus is on the individual to consistently adhere to their inhalation therapy regimen. Self-administration of the medical aerosol on a consistent basis in accordance with the inhalation therapy regimen can be difficult for children, easily-distracted individuals, or individuals with learning disabilities as they may temporarily or occasionally entirely forget a scheduled medical aerosol inhalation, and mistime or entirely miss a dose of their medical aerosol. Such behavioral missteps on the part of individuals to whom medial aerosols have been prescribed can introduce unpredictable variations into their treatment regimen, and give rise to significantly less effective medical aerosol treatment.

In order to address at least some of the above issues, a number of medical aerosol dispensing systems or devices have been developed which are capable of providing feedback to the patients with respect to their inhalation technique in taking the aerosol medicaments. For example, U.S. Pat. No. 4,984,158 (U.S. Pat. No. 4,984,158) describes an inhalation therapy apparatus for enhancing patient performance during inhalation of a medical aerosol. The disclosed apparatus carries sensors to determine inspiration and expiration airflow as well as cyclic expiration point representative of lung exhaustion for a display to indicate a prescribed inhalation airflow pattern to the patient.

U.S. Pat. No. 6,958,691 (U.S. Pat. No. 6,958,691) describes an inhaler providing a housing providing a receptacle into which a pressurized medical aerosol canister is insertable and removable, where the housing does not (and cannot) serve as a spacer or VHC. The housing includes patient breath sensors, an electronic date management system having a memory, a microprocessor, and a transmitter enabling data exchange between the electronic data management system and a network computer system. The data in U.S. Pat. No. 6,958,691 relates to patient performance data such as breath data.

U.S. Pat. No. 9,352,107 (U.S. Pat. No. 9,352,107) discloses a respiratory drug delivery apparatus in the form of a spacer or VHC, which is formed as a detachable feedback and compliance device into which an HFA or pMDI inhaler is insertable. The detachable feedback and compliance device bears sensors including at least one infrared sensor for sensing air temperature moving through an exhalation valve and relative distance of the drug delivery apparatus from the face of a patient. The detachable feedback and compliance device includes a processing unit and sensors configured for determining whether the patient is complying with proper or correct VHC usage technique during a single medical aerosol delivery session. Under the control of the processing unit, light emitting diodes and a speaker provide specific types of stepwise instructional information to the patient corresponding to the sequence of actions that the patient needs to perform in order to properly or successfully deliver the medical aerosol into intended portions of their respiratory system. In particular, the processing unit and sensors are configured to determine whether the device has been shaken once the patient has inserted the inhaler into the VHC device; whether the inhaler has been activated within a first predetermined number of seconds after it has been shaken; whether inhalation has occurred over a second predetermined number of seconds after the inhaler has been activated; and whether the patient has held their breath post-inhalation for a third predetermined number of seconds.

UK Published Patent Application No. 2556016A (UK2556016A) describes a device that is resides between and is distinct and separable from a conventional metered dose inhaler (MDI) and a conventional inhaler spacer. The device described in UK2256016A can sense air flow and volume during patient inhalation, or medical aerosol dispensing from the MDI; and can provides visual feedback to the user that indicates inhalation rate or adherence to an optimal inhalation rate.

Ioannis Smanis describes, at www.ismanis.com, an engineering project referred to as "Chameleon," which is a multi-function inhaler spacer and spirometer. The Chameleon provides separate air passages or chambers are defined corresponding to inhaler spacer and spirometer functionality.

With respect to the devices described by UK2556016A and Ioannis Smanis, such devices are undesirably limited with respect to their overall functionality, including functionality that is specifically relevant for enhancing or maximizing the likelihood of inhalation therapy regimen compliance for children, easily-distracted individuals, or individuals with learning disabilities.

In view of the foregoing, the devices described in the aforementioned patent references may be needlessly complex, and are poorly suited for children, easily-distracted individuals, or individuals with learning disabilities, particularly with regard to enhancing or maximizing the likelihood of such individuals' inhalation therapy regimen compliance. A need exists for a solution to these drawbacks.

SUMMARY

Figure 1:
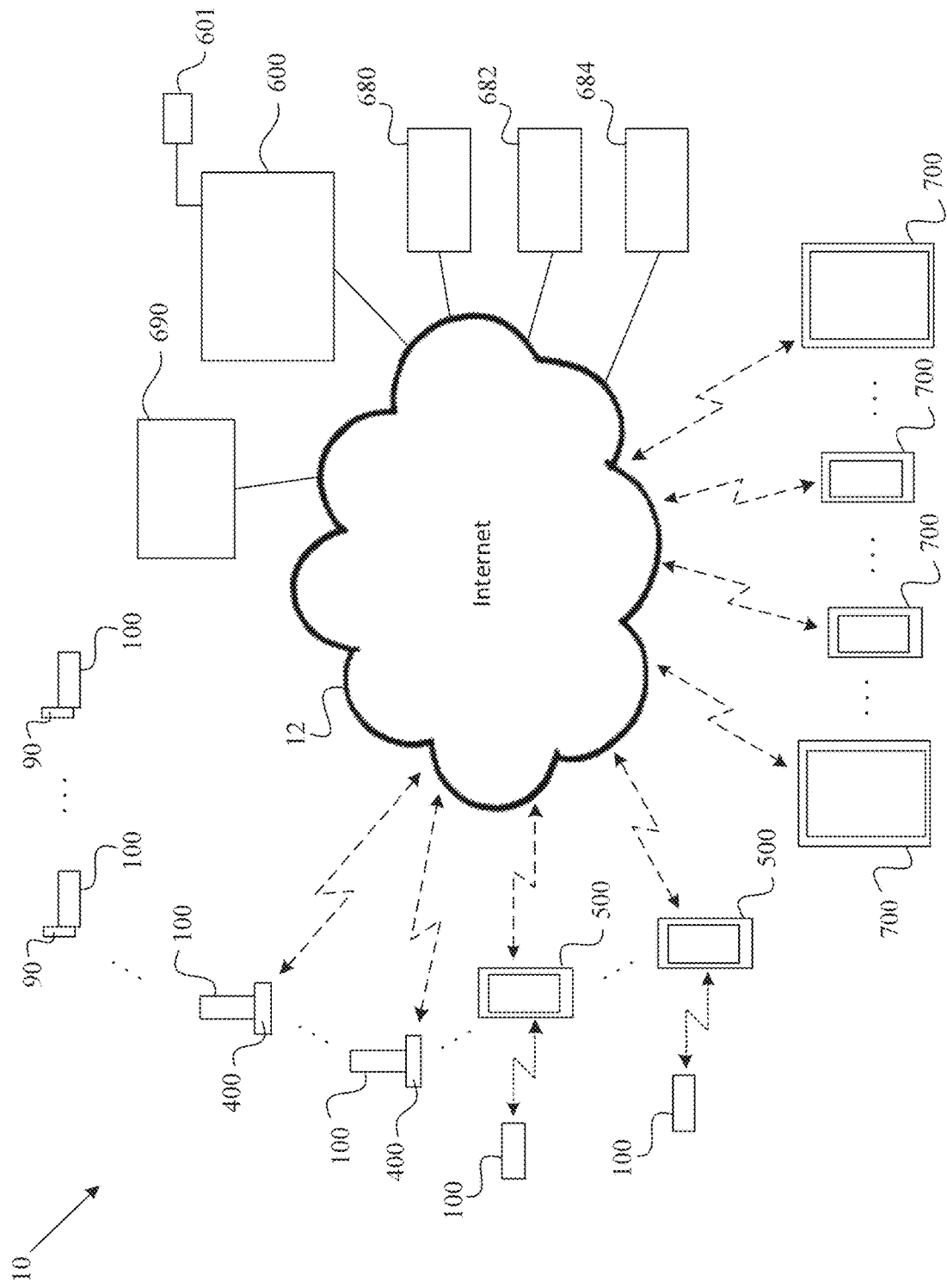
FIG. 1 is a block diagram of a system for dispensing inhalable medical aerosols in accordance with an embodiment of the present disclosure.

Aspects of several embodiments in accordance with the present disclosure are described herein with respect to particular non-limiting representative examples of systems, apparatuses, devices, and processes relating to, involving, or including a set of intelligent valved holding chambers (IVHCs), each of which is configured for interfacing with a medical aerosol inhaler. Each IVHC carries a processing unit, a communication unit, a set of transducers/sensors, a memory, and associated processor-executable program instruction sets configured for (a) sensing or measuring signals correlated with or corresponding to IVHC usage data indicative of user inhalation technique and user inhalation therapy regimen compliance; and (b) communicating IVHC usage data to one or more external computing devices or systems configured for (i) analyzing IVHC usage data and generating IVHC usage scores; (ii) generating inhalation technique histories and inhalation therapy regimen compliance histories, and user interfaces corresponding thereto; and/or (ii) generating user interfaces by which incentive rewards are presentable and providable to the user based on the user's IVHC usage score(s), which can include the user's inhalation therapy regimen compliance across one or more time periods.

In accordance with an aspect of the present disclosure, a system for managing aspects of respiratory therapy, including inhalation therapy, for each of a set of patients, includes: a set of intelligent valved holding chamber (IVHC) devices, each IVHC device corresponding to a particular patient and providing: (1) a distal receiver portion couplable with a pressurized metered dose inhaler (pMDI), and providing: a set of air inlets fluidically coupled to an external environment of the IVHC device; and a lumen structure into which a medical aerosol dose discharged from the pMDI is introducible; (2) an intermediate sleeve member extending proximal to the receiver portion and providing: a chamber fluidically couplable to the air inlets and the lumen of the receiver portion, into which the medical aerosol dose can travel in a proximal direction after discharge from the pMDI, wherein the chamber has a volume greater than that of the lumen structure; and an exit aperture fluidically coupled to the chamber; (3) a mouthpiece portion extending proximal to the receiver portion and providing an inhalation/exhalation aperture at a proximal end thereof, which is fluidically couplable to the chamber of the intermediate sleeve member, and which is insertable into the patient's mouth, by which the patient can draw air from the external environment into the and through the IVHC device and inhale the medical aerosol dose into their respiratory passages; (4) a one-way valve structure configured for enabling proximal to distal flow of gases through the intermediate sleeve member, and preventing distal-to-proximal flow of gases through the intermediate sleeve member; (5) a set of sensors, including at least one gas flow sensor configured for detecting air inflow into a portion of the IVHC device; (6) a first processing unit; (7) a power source coupled to the processing unit; (8) a user interface panel providing a set of patient selectable controls and a set of visual feedback elements;

and (9) a memory coupled to the set of sensors and the first processing unit and storing first program instructions executable by the first processing unit, which when executed cause the first processing unit to: (a) obtain from the set of sensors data values including sampled air inflow data values sensed by the at least one gas flow sensor; (b) determine whether an inhalation therapy session is occurring by way of: (i) determining whether an inhalation event is occurring by way of determining whether sampled air inflow data values have reached or exceed a predetermined threshold air inflow rate; and (ii) determining whether a medical aerosol dose discharge has occurred during an inhalation event; (c) during the inhalation therapy session, for each inhalation event of the inhalation therapy session store multiple date and time stamped sampled air inflow data values; and (d) following the inhalation therapy session, determine and store a date and time stamped inhalation technique score for the inhalation therapy session based on the multiple date and time stamped sampled air inflow data values.

The inhalation therapy session can correspond to a single medical aerosol discharge and multiple inhalation events associated with a tidal breathing protocol, and the inhalation technique score can provide a single value that represents patient inhalation technique across the multiple inhalation events.

The lumen structure can include structural elements configured for creating a spiral flow of medical aerosol and inhaled air passing through the lumen structure. The structural elements can include a plurality of curved structures disposed nonlinearly with respect to an IVHC central axis defined along a proximal to distal direction through the IVHC, wherein the plurality of curved structures guide or deflect inhaled air and medical aerosol passing through the lumen structure along spiral pathways.

The system can further include, for each IVHC device, a mobile/portable computing device associated with the patient and configured for communication with the IVHC device, wherein the mobile/portable computing device comprises: a second processing unit; a user interface device that includes a display; and a memory coupled to the second processing unit, the memory storing second program instructions executable by the second processing unit, which when executed cause the second processing unit to: communicate with the IVHC device to obtain a set of date and time stamped inhalation technique scores stored in the memory of the IVHC device; process multiple date and time stamped inhalation technique scores obtained from the IVHC device to generate at least one composite inhalation technique score, wherein each composite inhalation technique score represents patient inhalation technique across multiple inhalation therapy sessions corresponding to a predetermined or selectable time period; and present visual representations of composite inhalation technique scores on the user interface device.

The memory of the mobile/portable computing device can further store an inhalation therapy regimen for the patient corresponding to the IVHC device, and wherein the second program instructions when executed can cause the second processing unit to further: analyze date and time stamps of inhalation technique scores relative to a set of time periods corresponding to an inhalation therapy schedule established by the inhalation therapy regimen; determine a set of inhalation therapy regimen compliance scores for each time period under consideration, wherein each inhalation therapy regimen compliance score represents an extent or measure of patient compliance with their inhalation therapy regimen across a particular time period; and present visual representations of inhalation therapy regimen compliance scores on the user interface device.

The system can further include a remote therapy management server configured for communication with each mobile/portable computing device, the remote therapy management server including: a third processing unit; and a memory storing third program instructions executable by the third processing unit, which when executed cause the third processing unit to: for each mobile/portable computing device, communicate with the mobile/portable computing device to: obtain from the mobile/portable computing device inhalation therapy regimen compliance scores and composite inhalation technique scores for the patient associated with the mobile/portable computing device; analyze inhalation therapy regimen compliance scores and composite inhalation technique scores corresponding to a particular time period relative to stored criteria; and at least one of: (a) selectively transfer an inhalation therapy regimen compliance incentive award or a notification thereof to the mobile/portable computing device in the event that the stored criteria are met; (b) determine whether inhalation therapy regimen compliance scores and composite inhalation technique scores for the patient associated with the mobile/computing device for a particular time period meet or exceed an incentive points award threshold; selectively award or allocate a particular number of incentive points to the patient; and transfer a current incentive points total for the patient to the mobile/portable computing device; (c) provide the patient associated with the mobile/portable computing device access to a set of games playable by the patient, wherein for at least one game within the set of games a level of game play, aspects of a game avatar, game player characteristics or capabilities, and/or game player accessories are established, adjusted, or varied based on inhalation therapy regimen compliance scores and/or composite inhalation technique scores corresponding to the patient; and (d) provide the patient associated with the mobile/computing device and/or a caretaker associated with the patient access to a social media platform; and establish and/or adjust a social media standing, rating, categorization, or communication capability of the patient based on patient inhalation therapy regimen compliance scores and/or inhalation patient composite inhalation technique scores.

The system can further include a set of physician computing devices configured for communication with the remote therapy management server, wherein each physician computing device corresponds to a physician responsible for one or more patients having IVHC devices corresponding thereto, and each physician computing device includes: a fourth processing unit; a user interface including a display device; and a memory storing fourth program instructions executable by the fourth processing unit for causing the fourth processing unit to: communicate with the remote therapy management unit to obtain inhalation therapy regimen compliance scores and composite inhalation technique scores corresponding to patients for whom the physician is responsible; and present on the user interface visual representations of inhalation therapy regimen compliance scores and/or inhalation therapy technique scores corresponding to individual patients or groups of patients based on predetermined or physician-selectable criteria.

The third program instructions and the fourth program instructions can provide physician access to the social media platform, such that physicians can interact with patients and/or caretakers associated with patients by way of the social media platform.

DETAILED DESCRIPTION

The FIGs. included herewith show aspects of particular non-limiting representative embodiments in accordance with the present disclosure, and particular structural elements shown in the EEGs. may not be to scale or precisely to scale relative to each other. The depiction of a given element or consideration or use of a particular element number in a particular FIG. or a reference thereto in corresponding descriptive material can encompass the same, an equivalent, an analogous, a generally analogous, a categorically analogous, a similar, or a generally similar element or element number identified in another FIG. or descriptive material associated therewith. The presence of "/" in a FIG, or text herein is understood to mean "and/or" unless otherwise indicated. The recitation of a particular numerical value or value range herein is understood to include or be a recitation of an approximate numerical value or value range, for instance, within +/−20%, +/−15%, +/−10%, +/−5%, +/−2.5%, +/−2%, +/−1%, +/−0.5%, or +/−0%. The term "essentially all" can indicate a percentage greater than or equal to 90%, for instance, 92.5%, 95%, 97.5%, 99%, or 100%.

As used herein, the term "set" corresponds to or is defined as a non-empty finite organization of elements that mathematically exhibits a cardinality of at least 1 (i.e., a set as defined herein can correspond to a unit, singlet, or single element set, or a multiple element set), in accordance with known mathematical definitions (for instance, in a manner corresponding to that described in An Introduction to Mathematical Reasoning: Numbers, Sets, and Functions, "Chapter 11 Properties of Finite Sets" (e.g., as indicated on p. 140), by Peter J. Eccles, Cambridge University Press (1998)). Thus, a set includes at least one element (i.e., a set includes 1 or multiple elements). In general, an element of a set can include or be one or more portions of a system, an apparatus, a device, a structure, an object, a process, a physical parameter, or a value (e.g., a signal value) depending upon the type of set under consideration.

In the present disclosure, data communication includes or means wireless and/or wire-based data transfer or exchange that occurs directly between devices or systems; or wireless and/or wire-based data transfer or exchange that occurs indirectly between devices or systems by way of a data communication network. Network communication includes or means data communication by way of one or more data communication networks, which can include one or more types of data communication networks such as a personal area network (PAN), a local area network (LAN), a wide area network (WAN), a satellite communication network, the Internet, a cellular or mobile communication network, and/or another type of data communication network.

Overview

Embodiments in accordance with the present disclosure are directed to inhalable medical aerosol dispensing systems, apparatuses, devices, and processes. An inhalable medical aerosol dispensing system includes or provides at least one intelligent spacer or intelligent valved holding chamber (IVHC) apparatus or device (hereafter "IVHC" for purpose of brevity and clarity). An IVHC user or patient can interface or engage their IVHC with a medical aerosol inhaler, such as a hydroxyfluoroalkane (HFA)) inhaler or a pressurized metered dose inhaler (pMDI), which is configured for releasing pressurized doses of medical aerosol. The inhaler can be conventional or standard, and the medical aerosol can thus be contained in a conventional or standard canister that is removably insertable into the inhaler, as will be readily understood by individuals having ordinary skill in the relevant art. The removable canister can contain a preventative, preventer, or controller type medical aerosol intended for chronic or long term treatment of a respiratory disease, disorder, dysfunction, or symptoms; or a reliever type medical aerosol intended for acute or essentially immediate treatment of respiratory symptoms, in a manner that individuals having ordinary skill in the relevant art will also readily comprehend.

Once the IVHC and the inhaler are engaged, the patient can self-administer a dose of medical aerosol into portions of their respiratory system, e.g., in accordance with an inhalation therapy regimen established or defined by their physician or clinician. An inhalation therapy regimen typically specifies at least (i) a number of medical aerosol inhalation sessions that the patient is to undergo each day, where each such inhalation session involves the patient's inhalation of a dose of medical aerosol by way of their IVHC; (ii) a target time of day at which each inhalation session is to occur; and (iii) possibly a time period (e.g., 1 month, 3 months, 6 months, or longer) across which the inhalation therapy regimen is to be followed prior to review and/or revision, in a manner that individuals having ordinary skill in the relevant art will readily comprehend. Individuals having ordinary skill in the relevant art will understand that an inhalation session can involve a single inhalation event by way of a single patient inhalation through the IVHC in association or coordinated with a single discharge of medial aerosol into the IVHC; or multiple sequenced inhalation events (i.e., which are separated or isolated from each other by exhalation events) by way of multiple patient inhalations through the IVHC in association or coordinated with a single medical aerosol discharge into the IVHC, which is a medical aerosol inhalation technique known as tidal breathing.

For purpose of clarity and simplicity, the terms "proximal" or "forward" in the description hereafter in relation to an IVHC refer or correspond to structural portions of the IVHC that are closer to a user or patient's mouth than other structural portions of the IVHC that are farther from the patient's mouth during their inhalation of a medical aerosol through the IVHC into their mouth. The term "front" can refer or correspond to structural portions of the IVHC that can reside within, at, adjacent to, or slightly outside of the patient's mouth during their medical aerosol inhalation. Analogously, the terms "distal" and "rearward" in the description hereafter refer or correspond to structural portions of the IVHC that are farther away from a user or patient's mouth than other structural portions of the IVHC that are closer to the patient's mouth during their inhalation of a medical aerosol through the IVHC into their mouth. The term "rear" can refer or correspond to structural portions of the IVHC that are furthest away from the patient's mouth during such medical aerosol inhalation. The term "top" can refer or correspond to portions or surfaces of an IVHC that are intended to face in a direction towards the patient's nose or eyes, e.g., upwards, during their medical aerosol inhalation, and the term "bottom" can refer or correspond to portions or surfaces of the IVHC that are intended to face in a direction toward the patient's chin or chest, e.g., downwards, during their medical aerosol inhalation.

In various embodiments, the IVHC includes a distal or rear intelligent base portion that can be defined as an intelligent receiver, into which a user or patient can removably insert an inhaler for self-administration of a dose medical aerosol provided by or released from the inhaler (e.g., by way of a conventional medical aerosol canister inserted into the inhaler). That is, the intelligent receiver is configured for removably receiving the inhaler. The IVHC also includes an intermediate sleeve portion or member (e.g., providing a sleeve structure that forms an elongate gas expansion and flow velocity reduction chamber) that proximally extends away from the IVHC's intelligent receiver, into which the dose of medical aerosol can flow following its output, discharge, or release from inhaler; and a proximal or front mouthpiece structure or portion by which the IVHC user or patient draws air into and through the IVHC by way of inhalation, and inhales or intakes such drawn-in air combined with the dose of medial aerosol discharged from the inhaler through the intermediate sleeve portion and into their mouth and respiratory system. The IVHC also includes a one-way valve and exhaled gas vents or exit apertures, such that exhaled breath does not back-flow into the intermediate sleeve member during an inhalation session.

Each IVHC carries a processing unit (e.g., a microcontroller); a clock or timing unit (which can be a portion of the processing unit, or distinct from the processing unit depending upon embodiment details); a data store or memory; a power source (e.g., a battery, which can be rechargeable, such as by way of a Universal Serial Bus (USB) interface); a wireless communication interface and/or a wire-based communication interface; and a set of transducers including a set of sensors. The set of sensors includes at least one gas flow sensor (e.g., at least one air flow rate sensor), and can also include additional gas flow sensors and/or other types of sensors. The memory can store data as well as one or more program instruction sets executable by the processing unit, in a manner readily understood by individuals having ordinary skill in the relevant art. At a minimum, the set of sensors is monitorable, activatable, or controllable by the processing unit, e.g., by way of processing unit execution of program instructions, and is configured for sensing, monitoring, estimating, measuring, or sampling the flow or flow rate of air, and typically also the discharge, presence, flow, and/or flow rate of the dose medical aerosol, into or through portions of the IVHC along a distal-to-proximal direction (e.g., from the intelligent receiver toward the mouthpiece portion). The air inflow rate, i.e., the amount of air inflow into the IVHC per unit time, is indicative of or correlated with or corresponds to the force by which the patient draws air into the IVHC, and is further indicative of or correlated with or corresponds to the likelihood that the combination of air that the patient draws into the IVHC plus the dose of medical aerosol released from the inhaler during their inhalation will reach intended or target tissues within the patient's respiratory system. Thus, the level or amplitude of sensed air inflow, e.g., the sensed air inflow rate defined as air inflow volume per unit time, into or through portions of the IVHC during and after the inhaler's release of a given dose of medical aerosol dose is indicative of or correlated with or corresponds to the likelihood that this dose of medical aerosol is likely to be efficacious in treating the patient.

In several embodiments, once the air inflow rate into or through the IVHC corresponding to the patient's inhalation reaches or exceeds a first or minimum threshold or lower bound, in association with program instruction execution the set of sensors is configured for monitoring for or detecting the occurrence of a medical aerosol dose discharge from the inhaler into the IVHC, e.g., by way of one or more gas flow sensors that can generate distinguishable data values corresponding to air inflow rate in the absence of the inhaler's discharge of the medical aerosol dose, and air inflow rate combined with a gas flow rate corresponding to the medical aerosol dose released by the inhaler.

Depending upon embodiment details, the set of sensors can possibly also include one or more additional, auxiliary, or adjunct sensors, such as at least one of a spatial orientation sensor (e.g., in the form of a gyroscope); a temperature sensor; a piezoelectric sensor; a microphone; a chemical species or chemical compound sensor (for instance, in the form of a ChemFET, e.g., configured for detecting nitric oxide levels); and/or a photodetector paired with an LED that is configured for outputting light within portions of the visible or non-visible spectrum. In some embodiments, particular additional, auxiliary, or adjunct sensors can be activated in response to the detection of air inflow within the IVHC by one or more gas flow sensor(s).

In various embodiments, in association with the execution of a set of program instructions by the processing unit and the generation, acquisition, or sampling of signal data values by the IVHC's sensor(s), the IVHC's memory stores inhalation session data, which includes sensed signal data values, e.g., multiple sensed air inflow rate data values, generated during each inhalation session, along with a date and time stamp corresponding to each sensed signal data value.

Each IVHC additionally carries a set of feedback elements configured for providing feedback to the patient as part of an inhalation session, which indicates on a near-real time or essentially real time basis during the inhalation session whether a current set of sensed or sampled air inflow rate data values or a mathematical function or combination (e.g., an average) thereof (a) is below or above a minimum threshold level needed for proper delivery of the medical aerosol into intended respiratory pathways or tissues, (b) falls within a predetermined, target, therapeutically most/ highly efficacious, or optimum air inflow rate range, or (c) is above or beyond a maximum threshold level needed for proper delivery of the medical aerosol into the intended respiratory pathways or tissues. Thus, during each inhalation session, the IVHC provides the patient with feedback indicating whether they are (or are not) employing a suitable, proper, or optimal inhalation technique when using the IVHC, such that the patient can self-adjust their breath inhalation force (or pressure) on a real or near-real time basis during their inhalation session in order to enhance or optimize the delivery of the medical aerosol into intended respiratory pathways, thereby enhancing the likelihood of efficacious treatment of the patient's respiratory symptoms and/or respiratory disease, disorder, or dysfunction. In various embodiments, the feedback includes or is visual feedback, and the set of feedback elements include a plurality of LEDs and/or a display screen, which can include or be a liquid crystal display (LCD) or other type of display device, which can be touch sensitive and/or flexible.

In multiple embodiments, in association with the execution of a set of program instructions by the processing unit, the IVHC is also configured for generating inhalation session technique data. In several embodiments, for a most-recent/most-current inhalation session, the inhalation session technique data includes or is a date and time stamped inhalation session technique score for this inhalation session, which is a calculated or mathematically derived measure of the user's medical aerosol inhalation technique for the inhalation session under consideration based on the sensed signal data values that were generated or captured during the inhalation session. In several embodiments, an inhalation technique score can be defined as a set of values that indicates, rates, categorizes, or represents the patient's inhalation technique across an entire inhalation session, whether the inhalation session included a single inhalation event or multiple inhalation events associated or coordinated with a single medical aerosol discharge. For instance, an inhalation technique score can include or be a consolidated value (e.g., a single value, such as a mathematical average) that accounts for air inflow rate fluctuations that occur during each of the inhalation session's inhalation events. Inhalation session data corresponding to an inhalation session can be defined to include date and time stamped sensed signal data values and an associated date and time stamped inhalation technique score for the inhalation session.

Each IVHC carries one or more types of communication units or interfaces (e.g., wireless and/or wire-based communication units or interfaces) configured for communicating or transferring stored data to one or more external electronic/computing destinations, devices, or systems. Such data includes at least some inhalation session data, which depending upon embodiment details can include inhalation session technique scores, and possibly date and time stamped sampled air inflow rate data values, additional sampled signal data values, and/or mathematically derived data values corresponding thereto (e.g., date and time stamped average sampled air inflow rate data values, and possibly additional/other average sampled signal data values, calculated with respect to predetermined time intervals).

One such type of external computing device or system to which the IVHC can transfer stored data, e.g., inhalation session data, can be a computing device or system that is operable or operated by the patient and/or the patient's parent, guardian, steward, or caretaker, such as a portable or mobile computing device (e.g., a mobile phone/smart phone or tablet computer) usable or used by the patient, or shared by the patient with their parent, guardian, steward, or caretaker, or belonging to the patient. Such a patient/parent computing device includes an application program/app executing thereon, e.g., a patient/parent app, that can be configured for receiving or retrieving from the patient's IVHC current or most-recent inhalation session data, including one or more inhalation session technique scores, and possibly date and time stamped data inhalation session values corresponding to sensed or sampled signals (e.g., raw and/or mathematically derived versions of sampled air inflow rate data values and possibly other sampled signal data values).

In multiple embodiments, as part of its execution, the patient/parent app can process or analyze current and past inhalation session data generated by or received from the IVHC, and can generate IVHC usage data or scores based on such current and past inhalation session data. For instance, the patient/parent app can quantify, categorize, evaluate, or rate multiple individual inhalation technique scores generated across a time period spanning multiple individual inhalation session(s), and can generate a consolidated or composite inhalation technique score representative of the patient's overall inhalation technique for the collection of inhalation sessions spanning a time period under consideration. In several embodiments, the patient/parent app can generate composite inhalation technique scores corresponding to multiple time periods, such as a number of days, weeks, months, or years (e.g., 1 day, 3 days, 5 days, 1 week, 2 weeks, 1 month, 3 months, 6 months, or 1 year). Each composite inhalation technique score can have a date interval associated, linked, or stored therewith.

The patient/parent app can further process, compare, or analyze date and time stamped inhalation session data (e.g., which is linked with or exists as part of the patient's inhalation technique scores) that was obtained or received from the IVHC most recently and over time with respect to a stored inhalation therapy regimen to correspondingly evaluate an extent of patient compliance with their inhalation therapy regimen over one or more time intervals or periods. For instance, the patient/parent app can process or analyze date and time stamps corresponding to current and past inhalation technique scores and/or composite inhalation technique scores relative to a stored inhalation therapy regimen, and can generate one or more inhalation therapy regimen compliance scores, where each inhalation therapy regimen compliance score indicates, corresponds to, or represents an extent or measure of patient compliance with their inhalation therapy regimen across a particular time period, such as a number of days, weeks, months, or years (e.g., 1 day, 3 days, 5 days, 1 week, 2 weeks, 1 month, 3 months, 6 months, or 1 year).

The patient/parent app can additionally generate and present a set of user interfaces/visual interfaces to the patient/parent computing device user, which can provide a visual indication of at least some of the patient's individual inhalation technique score(s), composite inhalation technique score(s), and inhalation therapy regimen compliance score(s) corresponding to one or more time periods, such as a number of days, weeks, months, or years (e.g., 1 day, 3 days, 5 days, 1 week, 2 weeks, 1 month, 3 months, 6 months, or 1 year).

The patient/parent app can additionally generate at least one user/visual interface configured for receiving user input corresponding to respiratory attacks, such that the patient can indicate or report whether one or more respiratory attacks occurred on a particular date or date and time period, in response to which the patient/parent app generates and stores a set of attack indications. For any given attack indication, such user/visual interfaces can receive further user input defining an attack annotation, e.g., text indicating or describing respiratory attack details, such as attack severity, patient location, and likely attack trigger(s). Respiratory attack data can include or be defined as attack indications and corresponding attack annotations.

The remote therapy management server is configured for maintaining a patient management database that stores information corresponding to multiple patients and their IVHCs. Such information can include basic patient data, inhalation therapy regimens and at last some of individual inhalation technique scores, composite inhalation technique scores, inhalation therapy regimen compliance scores, and respiratory attack data corresponding to each patient having an IVHC. The remote therapy management server includes a patient management application program executing thereon, which is configured for performing various types of patient management operations, including managing data communication with patient/parent computing devices and the retrieval or download of data therefrom, such as data corresponding to the aforementioned information.

The remote therapy management server can include a physician/clinician application program executing thereon, which can manage data communication with clinician or physician computing devices or systems (e.g., a desktop computer, a laptop computer, a tablet computer, or a smart phone) by way of associated clinician or physician application programs/apps executing on the physician computing devices or systems. The remote therapy management server can also maintain a physician/clinician database.

By way of a physician app executing on a physician computing device, the patient's physician can define and store an inhalation therapy regimen for a specific IVHC patient for whom they are responsible. Typically, the inhalation therapy regimen corresponds to, includes, or designates a particular time period associated therewith for which the regimen remains valid.

The inhalation therapy regimen can be communicated to the remote therapy management server and stored in the physician/clinician database and/or the patient database, and thus further communicated to the appropriate patient/parent computing device(s), e.g., to the patient's computing device and their parent's computing device. For each of the physician's patients who use an IVHC, the physician app can also be configured to receive or retrieve from the remote therapy management server data associated with, based upon, or corresponding to the patient's inhalation therapy sessions and respiratory attacks, e.g., corresponding to at least some composite inhalation technique scores and inhalation therapy regimen compliance scores, which the remote therapy management server received or generated based upon received data. The physician app can also be configured to receive or retrieve patient respiratory attack data from the remote therapy management server.

The remote therapy management server and/or a physician app can be configured for performing one or more types of analyses (e.g., additional, more detailed, or statistical analyses) upon data associated with one or more inhalation therapy regimens that relates or is relevant to the physician's patients. The physician app can provide a physician with data visualization tools such as visual interfaces by which they can review or track their patients' individual and composite inhalation session technique scores, inhalation therapy regimen compliance scores, and respiratory attack histories, e.g., on an individual patient or patient group basis (e.g., based on patient age, gender, or geographic location) relative to particular time periods.

In several embodiments, the remote therapy management server additionally includes a compliance application program executing thereon, and is coupled to a reward/award database. The patient/parent app executing on a given patient/parent computing device can communicate with such a compliance application program and/or the reward/award database, and can provide a set of user interfaces by which one or more incentive rewards or prizes can be selected by the patient and/or their parent, along with a set of compliance criteria that the patient must satisfy in order to achieve the reward. For instance, the remote therapy management server can transfer the selected incentive reward to the patient under consideration in the event that (a) an inhalation therapy regimen compliance score exceeds a minimum inhalation therapy compliance threshold or target (e.g., 80%) for a specified time period; and/or (b) a composite inhalation technique score corresponding to a minimum threshold or target percentage of inhalation sessions (e.g., 70%, 75%, 80%, or 85%) throughout a specified time period is rated as suitable, good, or excellent.

In some embodiments, the compliance application program executing on the remote therapy management server in association with the reward/award database and a patient/parent app executing on a patient/parent computing device can implement and manage an incentive points award program by which incentive points can be awarded to the patient and/or their parent as a result of one or more patient inhalation therapy regimen compliance score(s) and/or composite inhalation technique score(s) corresponding to a particular time period meeting or exceeding a points award threshold. For instance, if (a) the points award threshold corresponding to a 2 week time period, i.e., 14 days, is an inhalation therapy regimen compliance score of 80%; (b) the patient's inhalation therapy regimen stipulates 2 inhalation sessions per day; and (c) the patient's calculated inhalation therapy regimen compliance score is 90% for the 2 week period under consideration, the compliance application program can allocate a number of incentive points, such as 90%×2 sessions per day×14 days equals 25.2 incentive points, to a current incentive point total or count corresponding to the patient. Moreover, in response to sequentially uninterrupted or unbroken attainment of multiple points award thresholds across the time periods associated therewith, the compliance application program can apply an above-unity multiplier to the current incentive point total. Additionally or alternatively, the compliance application program can allocate a predetermined or a quasi-random incentive point bonus to the patient's current incentive point total if one or more inhalation therapy regimen compliance scores and/or composite inhalation technique scores exceed a bonus threshold level relative to one or more time periods.

In several embodiments, the remote therapy management server is additionally configured for communication with, or hosts and manages, an inhalation therapy relevant or related social media platform for patients, parents, and physicians. By way of patient interaction with patient/parent computing devices, physician interaction with physician computing devices, communication between patient/parent computing devices and the social media platform, and physician computing device communication with the social media platform, patient experiences, recommendations or advice, inhalation therapy regimen compliance scores, inhalation technique scores, inhalation therapy related experiences, possibly respiratory attack experiences, and therapy guidelines, suggestions, or recommendations can be posted or shared and viewed, e.g., among a community of patients, parents, and physicians. The inhalation therapy related social media platform operates in association with associated social media apps executing on patient/parent computing devices and physician computing devices, where such apps can generate inhalation therapy social media user/visual interfaces. For patients whose inhalation therapy regimen compliance scores consistently exceed a long term compliance threshold or target, the inhalation therapy social media platform can elevate the patient or their parent to a "mentor," "pro," or "star" level, and can enable such individuals to submit inhalation therapy advice, tips, or guidance to others.

In some embodiments, the remote therapy management server is also configured for communication with, or hosts, manages, or provides a set of games or game apps by which patients can incentivized to become or remain more fully engaged or compliant with their prescribed inhalation therapy regimen(s). The games can be single player or multi-player/interactive games, in a manner readily understood by individuals having ordinary skill in the relevant art. Depending upon embodiment details, a game can be a simple single player games, e.g., a Tamagotchi type game; or a game can be a more complex single player or multi-player game.

By way of (a) presenting individual and/or composite inhalation technique scores and inhalation therapy regimen compliance scores; (b) providing (i) patient/parent selectable incentive rewards that can be flexibly selected or defined over time, and/or (ii) redeemable incentive points awards, where such rewards and awards are relevant or preferentially or specifically targeted to or are expected to be appealing or motivating to patients and/or parents based on factors such as patient age, geolocation, gender, personal interests, and/or financial incentives (e.g., discounts from participating partner businesses); (c) an inhalation therapy social media platform; and/or (d) one or more games or game apps by which the patient may be more likely to remain engaged or compliant with their inhalation therapy regimen, the system can incentivize, motivate, or enhance patient compliance (e.g., long term compliance) with such regimen(s). The system can thus significantly increase the likelihood that young patients, or patients who tend to be easily-distracted or have learning disabilities, will be compliant, generally compliant, or more consistently compliant with their regimen(s), particularly relative to categorically analogous individuals who utilize conventional inhalation therapy devices.

In some embodiments an IVHC can provide a set of emergency alert/"SOS" buttons that the patient can activate to indicate that they are currently experiencing a respiratory attack. Such an IVHC can communicate an emergency alert/SOS notification to one or more electronic/computing destinations, devices, or systems, such as by way of wireless data communication. The IVHC can include cellular data network communication circuitry, such that emergency alerts/SOS notifications can be communicated by way of a cellular data network to one or more recipient electronic/computing devices or systems, such as the patient/parent computing device associated with the IVHC; the remote therapy management server; and/or possibly a physician computing device. In some embodiments, the patient/parent computing device provides a visual/graphical emergency alert/SOS button that the patient or their parent can activate, in response to which the patient/parent app can communicate an emergency alert/SOS notification to the remote therapy management server and/or the appropriate physician computing device(s).

Aspects of Particular Representative System Embodiments

FIG. 1 is a block diagram of a system 10 for dispensing inhalable medical aerosols into the respiratory systems of users or patients by way of IVHCs 100, and providing patient inhalation technique and inhalation therapy regimen compliance interfaces (e.g., one or more visual/user interfaces) in accordance with particular non-limiting representative embodiments of the present disclosure. In an embodiment, the system 10 includes a set of IVHCs 100, such as a plurality of IVHC's 100, each of which corresponds to a particular patient under the care of a given physician who defines and/or reviews/revises the patient's inhalation therapy regimen. Each IVHC 100 is configured for engagement with an inhaler 90, as further detailed below.

Each IVHC 100 is configured for data communication with at least one external computing device or computing system, including a set of patient/parent computing devices 500 associatable or associated with the IVHC 100. Each patient/parent computing device 500 is configured for network communication with a remote therapy management server 600, such as by way of the Internet 12; and the remote therapy management server 600 is configured for network communication with a set of physician computing devices 700, such as by way of the Internet 12. In some embodiments, the remote therapy management server 600 can be coupled to or include a set of cellular network communication units 601, e.g., which can include or be a set or array of cellular data modems, such that the remote therapy management server 600 can send and/or receive information (e.g., signals and/or data) by way of one or more cellular communication networks.

The remote therapy management server 600 is also configured for communication (e.g., network communication) with a patient database 680; a physician/clinician database 682; and a reward/award database 684. Depending upon embodiment details, the remote therapy management server 600 can be configured for providing an inhalation therapy related social media platform and/or a set of games or game apps by which patients can remain more engaged or compliant with their inhalation therapy regimen. Alternatively, at least some patient/parent computing devices 500 and the remote therapy management server 600 can be configured for communication with one or more additional, associated, adjunct, or auxiliary servers 690, such as a set of social media and/or game servers (online game servers) that respectively support or provide a social media platform and one or more games in which patients can participate.

Aspects of Particular Representative IVHC Apparatuses or Devices

FIGS. 2A-2G are schematic illustrations showing portions of IVHCs 100 in accordance with particular non-limiting representative embodiments of the present disclosure.

Figure 2A:
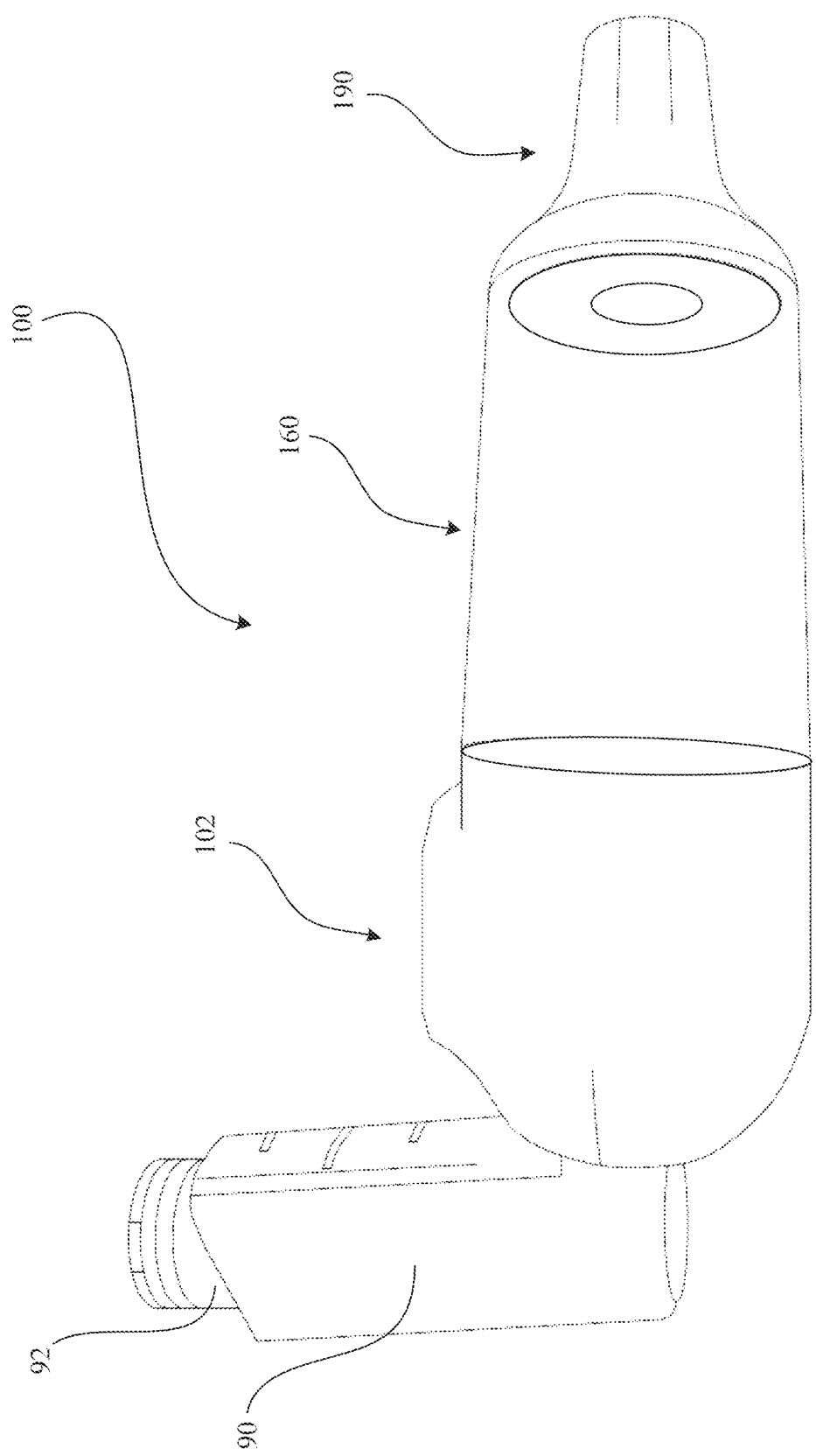
FIG. 2A is an image showing an embodiment of an intelligent valved holding chamber (IVHC) having an inhaler inserted therein in accordance with an embodiment of the present disclosure.
Figure 2B:
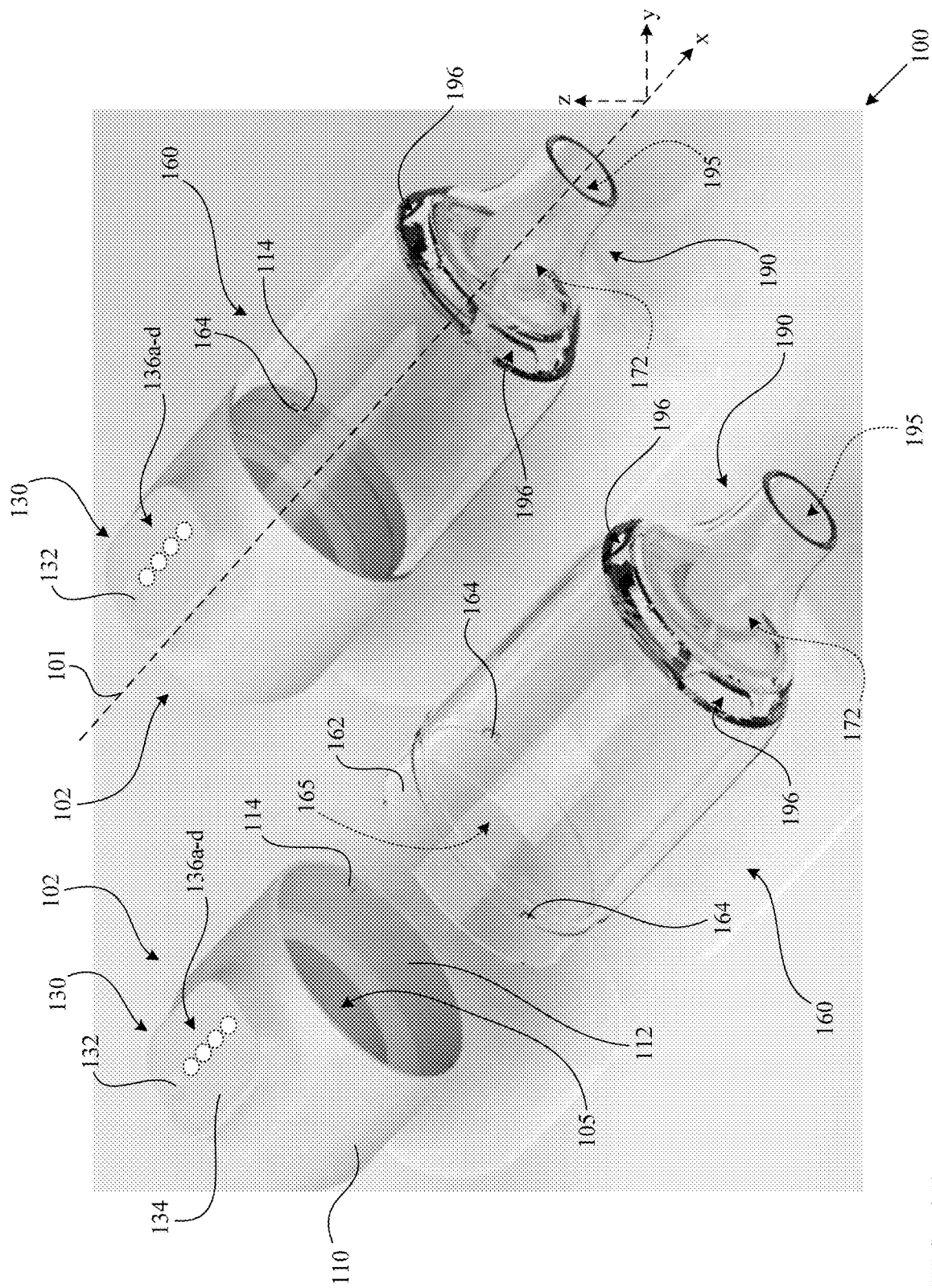
FIG. 2B is a perspective illustration showing side-by-side partially disassembled and assembled IVHCs in accordance with an embodiment of the present disclosure.

More specifically, FIG. 2A is an image showing an embodiment of an IVHC 100 having an HFA or pMDI inhaler 90 inserted therein, where the inhaler 90 carries a corresponding pressurized medical aerosol canister 92; and FIG. 2B is a perspective illustration showing an embodiment of a partially assembled (or partially disassembled) IVHC 100 and a corresponding fully assembled IVHC 100. In an embodiment, the IVHC 100 includes a distal or rear intelligent base portion or receiver 102 providing a housing structure or housing 110 that interfaces or is matingly engageable with an intermediate or intermediary sleeve portion, member, or structure 160, which interfaces or is matingly engageable with a proximal or front mouthpiece portion 190. Hence, the intermediate sleeve member 160 resides and extends lengthwise between the intelligent receiver 102 and the mouthpiece portion 190. A central, lengthwise, or longitudinal axis 101 of the IVHC 100 can be defined, which extends through a center point or centroid of each of the intelligent receiver 102, the intermediate sleeve member 160, and the mouthpiece portion 190. A reference three-dimensional coordinate system can be defined corresponding to this central axis 101, such as a representative (x, y, z) Cartesian coordinate system in which the central axis 101 forms or corresponds to this coordinate system's x-axis, in a manner readily understood by individuals having ordinary skill in the relevant art.

As further detailed below, the intelligent receiver 102 is engageable (e.g, matingly engageable) with and disengageable from the inhaler 90, such that a medical aerosol discharged from the inhaler 90 can be introduced into the intelligent receiver 102 and can flow in a distal-to-proximal direction toward and into the intermediate sleeve member 160. The intermediate sleeve member 160 provides an internal bore, passage, lumen, or chamber 165 that enables the expansion and velocity reduction of the medical aerosol traveling therethrough, in a manner readily understood by individuals having ordinary skill in the relevant art. In various embodiments, the intermediate sleeve member's lumen 165 has an elliptical (e.g., oval or circular) or generally elliptical cross-sectional area. As shown in FIGS. 2A and 2B, the mouthpiece portion 190 includes a patient breathing or inhalation/exhalation aperture 195 at a proximal end thereof, which is insertable into the patient's mouth, by which the patient can inhale gaseous substances or gases including air and a medical aerosol dose that have been drawn through the IVHC 100 into their mouth and respiratory system, and exhale gases as part of their breathing activity.

As indicated in FIG. 2B, the intermediate sleeve member 160 and the mouthpiece portion 190 can be transparent, in order to show particular aspects of each of (a) a mounting structure 180 that couples, links, joins, or secures the intermediate sleeve member 160 to the mouthpiece portion 190; and (b) a one-way (e.g., duckbill) valve structure 170 disposed between the intermediate sleeve member 160 and the mouthpiece portion 190, where the one-way valve structure 170 is typically centrally aligned with the mouthpiece portion 190 and extends partially therein in a distal-to-proximal direction along the central axis 101. The one-way valve structure 170 enables distal-to-proximal flow of gases, including air and medical aerosol, from the lumen 165 of the intermediate sleeve member 160 into the mouthpiece portion 190, and prevents proximal-to-distal flow of gases from the mouthpiece portion 190 into the lumen 165 of the intermediate sleeve member 160. The IVHC 100 additionally includes a set of exhaled gas vents or apertures 196 corresponding to or carried by the mouthpiece portion 190 by which gases exhaled by the patient can be vented or discharged from the IVHC 100 without entering the intermediate sleeve member's lumen 165. As further described below with reference to FIG. 2G, the one-way valve structure 170 typically includes an exhalation deflection plate structure 174 that deflects or redirects the patient's exhaled gases toward the exhaled gas vents 196. The one-way valve structure 170 is typically centrally seated in the deflection plate structure 174.

As indicated in FIG. 2B, the intelligent receiver 102 and the intermediate sleeve member 160 can carry counterpart engagement/disengagement structures by which the intelligent receiver 102 is matingly engageable to and disengageable from the intermediate sleeve member 160. For instance, the intelligent receiver's housing 110 can include a plurality of engagement/disengagement recesses 114, and the intermediate sleeve member 160 can include a counterpart plurality of engagement/disengagement protrusions or tabs 164 that enable snap-fit engagement of the intelligent receiver 102 with the intermediate sleeve member 160.

The intelligent receiver 102 additionally includes a user interface or user interface panel 130 having an on/off button 132, and a set of display elements/devices such as a plurality of LEDs 136a-d and/or a display screen. The display screen can include or be a liquid crystal display (LCD) or other type of display device, which can be touch sensitive and/or flexible, in a manner readily understood by individuals having ordinary skill in the relevant art. In several embodiments, the on/off button 132 is seated on or in a translucent or transparent window 134 that partially overlays or overlays the set of display elements, e.g., the plurality of LEDs 136a-d. The on/off button 132 is directly accessible to the patient's finger(s), and light output by the set of display elements, e.g., the plurality of LEDs 136a-d, is visible to the patient through the window 134 while they are using their IVHC 100, including during their inhalation of a medical aerosol dose. In some embodiments, the intelligent receiver 102 also carries a set of emergency alert/"SOS" controls or buttons 135 having one or more activatable elements that are directly accessible to the patient's finger(s), which the patient can press, press and hold, or otherwise activate, such as multiple times within a predetermined time interval (e.g., at least 3 times in a 1-2 second time interval), or for a predetermined minimum continuous amount of time (e.g., least 2-3 seconds) to indicate that they are experiencing a respiratory attack.

Figure 2C:
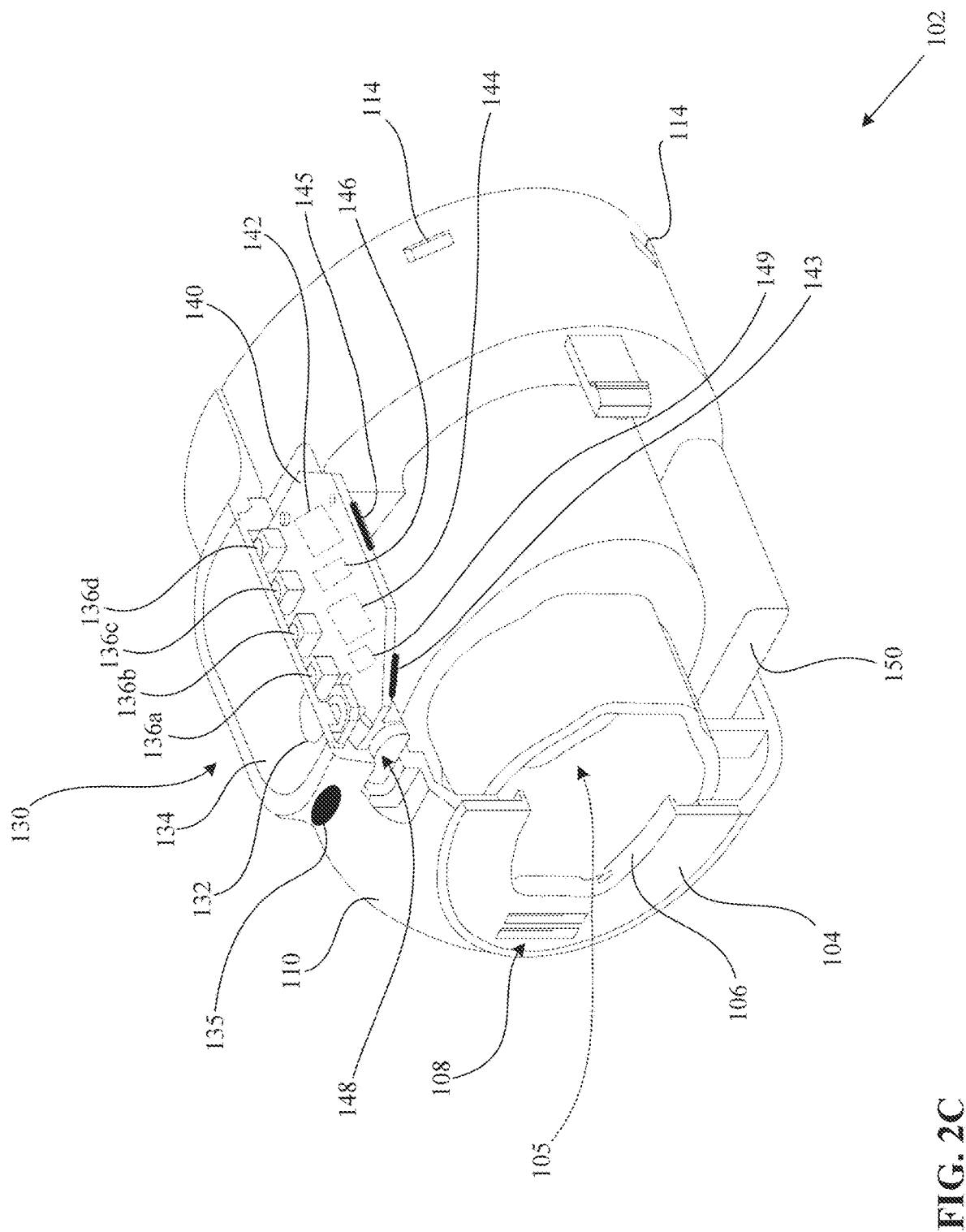
FIGS. 2C and 2D are a cutaway perspective view and a rear view of an embodiment of an intelligent receiver of an IVHC in accordance with an embodiment of the present disclosure.
Figure 2D:
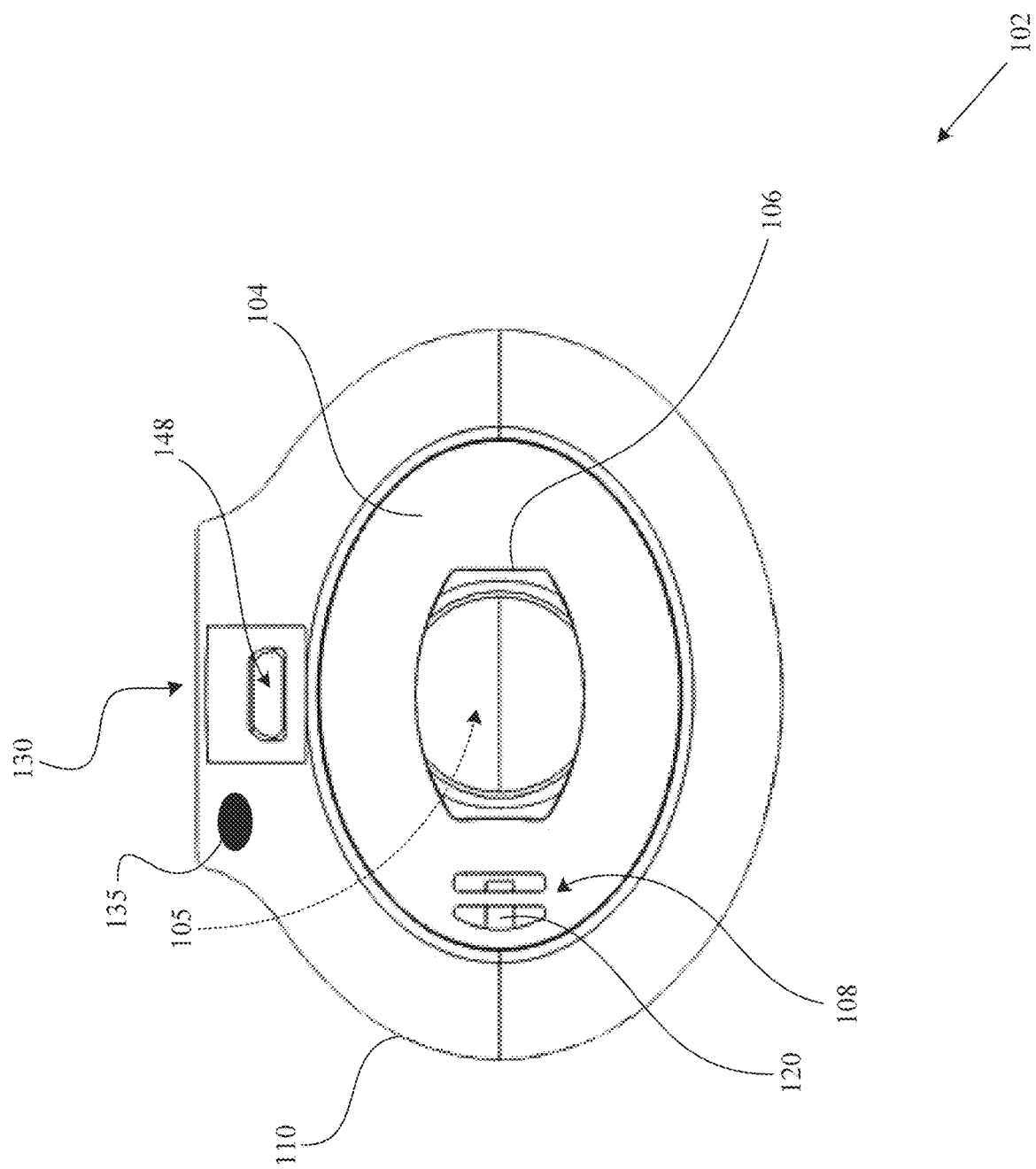
Figure 2E:
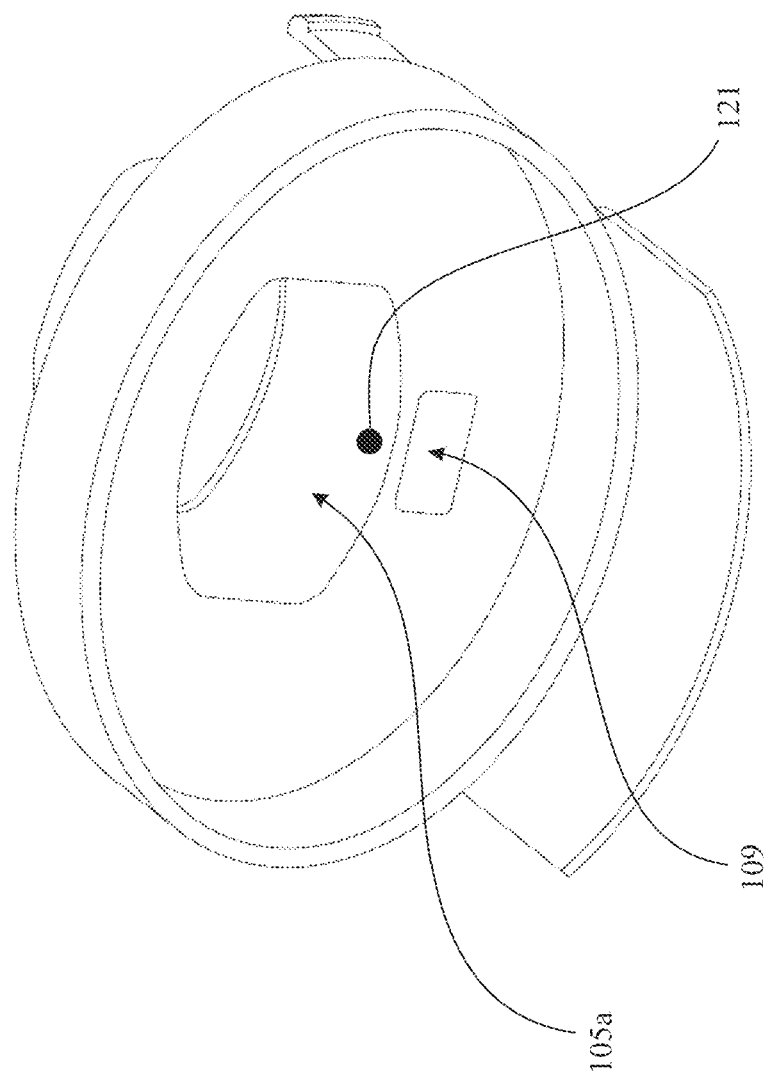
FIGS. 2E and 2F are perspective views showing proximal-facing portions of embodiments of a first lumen structure and a second lumen structure, respectively, within an intelligent receiver corresponding to that shown in FIG. 2C.
Figure 2F:
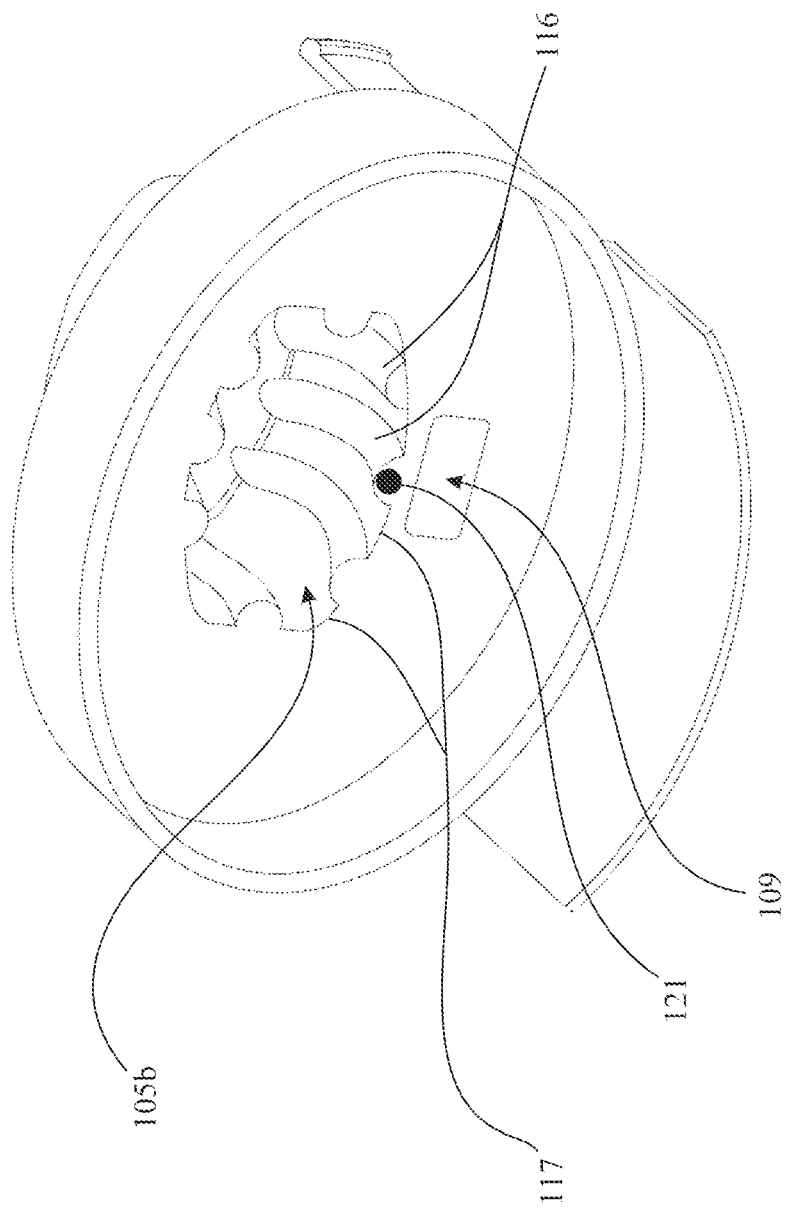

FIGS. 2C-2F show further aspects of an intelligent receiver 102 in accordance with particular non-limiting representative embodiments of the present disclosure. More specifically, FIG. 2C is a cutaway perspective view of an embodiment of the intelligent receiver 102, showing certain internal structures or elements thereof; and FIG. 2D is a rear view of an embodiment of the intelligent receiver 102. As further detailed below, the intelligent receiver 102 includes a lumen structure therein, within which air and a medical aerosol dose can travel or flow, e.g., in a distal to proximal direction toward and into the intermediate sleeve member 160. Different intelligent receiver lumen structures can exhibit different structural aspects depending upon embodiment details. For instance, FIG. 2E is a perspective view showing proximal-facing portions of an embodiment of a first lumen structure 105a within the intelligent receiver 102; and FIG. 2F is a perspective view showing proximal-facing portions of an embodiment of a second lumen structure 105b within the intelligent receiver 102. In the following text, the intelligent receiver's lumen structure can be generally referred to by way of reference numeral 105, e.g., reference numeral 105 can refer to a lumen structure 105 exhibiting structural and/or functional aspects that are applicable to or provided by the first lumen structure 105a, the second lumen structure 105b, and/or another embodiment of the intelligent receiver's lumen structure 105, in a manner consistent with the first paragraph of the description herein.

As indicated in FIG. 2C, the intelligent receiver 102 includes a rear wall structure 104 at a distal end thereof, which resides distal and typically adjacent to the intelligent receiver's lumen structure 105. The rear wall structure 104 includes a centrally-disposed inhaler receiving aperture 106 therein, which exhibits a cross-sectional profile or shape configured to receive and engage with the medical aerosol exit port or mouthpiece of the inhaler 90, such that the inhaler 90 is disposed, held, or retained in a predetermined or intended position when inserted into the intelligent receiver 102, and the inhaler's medical aerosol exit port extends toward, to, or partially into the intelligent receiver's lumen structure 105.

As indicated in FIGS. 2C and 2D, the intelligent receiver's lumen structure 105 provides at least a first cross-sectional area and a first internal volume into which the medial aerosol released by the inhaler 90 can be discharged or ejected from the inhaler 90 into the intelligent receiver's lumen structure 105, and flow therefrom into the lumen 165 of the intermediate sleeve member 160 along one or more distal-to-proximal flow paths toward the mouthpiece portion 190.

FIG. 2E provides a perspective view along a proximal-to-distal direction of the intelligent receiver's first lumen structure 105a in accordance with multiple embodiments of the present disclosure. As shown in FIG. 2E, the first lumen structure 105a has a generally smooth, uniform, continuous, and slowly varying curvature with respect to upper and lower portions thereof across its cross sectional area.

FIG. 2F is a perspective illustration showing the second lumen structure 105b as a rotational or spiral lumen structure 105b in accordance with an embodiment of the present disclosure, which includes lengthwise curved structures such as curved projections/protrusions/ridges 116 and/or curved indentations/recesses/grooves 117 disposed along portions of the lumen structure's length, and about the lumen structure's circumference. Thus, in particular embodiments, the intelligent receiver's lumen structure 105b can include or carry structural elements or features configured for creating a rotational or spiral flow of medical aerosol and inhaled air passing therethrough. In several embodiments, these curved structures are nonlinear with respect to the IVHC's central axis 101, and along their length can be correlated with, correspond to, or defined by portions of a logarithmic spiral, a parabola, an ellipse, or other type of mathematical function. Such curved structures can guide or deflect air that was drawn or inhaled into the lumen structure 105b, as well medical aerosol carried therewith following the inhaler's discharge of a medical aerosol dose, along one or more rotational or spiral pathways, such that this air and any medical aerosol carried therewith exhibits rotational or spiral flow components upon entry into the intermediate sleeve member's lumen 165, thereby further slowing the medical aerosol's distal to proximal flow velocity. In certain embodiments, at least some of such curved structures can include or be replaced by a sequence or series of interrupted or discontinuous bumps or protrusions in order to facilitate the generation of an intended medical aerosol dose flow pattern.

In some embodiments, the intelligent receiver's lumen structure 105 provides multiple (e.g., two) sections or segments having distinct cross sectional areas or internal volumes, which become progressively larger along a distal-to-proximal direction. In certain embodiments, the intelligent receiver's lumen structure 105 is progressively tapered such that its cross-sectional area increases along at least a portion of its length along a distal-to-proximal direction. The intermediate sleeve member's lumen 165 provides an additional (e.g., second or third), larger, or largest cross sectional area and an additional (e.g., second or third), larger, or largest internal volume into which the medical aerosol released from the inhaler 90 into the intelligent receiver's lumen structure 105 can radially or outwardly expand, e.g., in directions away from the IVHC's central axis 101, as the medical aerosol travels toward the mouthpiece portion 190. Thus, in various embodiments the cross-sectional area and internal volume provided by the intermediate sleeve member's lumen 165 are respectively larger than the cross-sectional area(s) and internal volume(s) provided by the intelligent receiver's lumen structure 105.

With reference to FIGS. 2C-2F, the rear wall structure 104 includes a set of air inlets or apertures 108, and the housing 110 includes a corresponding inhaled air channel or passage 109, by which air can be drawn into the IVHC 100 during patient inhalation (e.g., in response to a patient-applied inhalation/suction force) when the mouthpiece portion's breathing aperture 195 resides in the patient's mouth. The location(s) of the air inlets or apertures 108 and the corresponding inhaled air channel 109 can vary depending upon embodiment details. As shown in FIG. 2D, the intelligent receiver 102 carries a set of gas flow sensors 120, typically including at least one gas flow sensor 120 aligned with and proximally disposed relative to the set of air apertures 108 in the manner shown (e.g., forward of the air apertures 108, typically beside and adjacent to or slightly forward of the inhaler's medical aerosol exit port). The set of gas flow sensors 120 is configured for sensing, sampling, or measuring air inflow values corresponding to or generated by distal-to-proximal air flow into or within the intelligent receiver 102. In several embodiments, the set of gas flow sensors 120 includes or is at least one microelectromechanical system (MEMS) thermal mass flow sensor. The set of gas flow sensors 120 is electrically coupled to a processing unit 142 and a memory 144 that reside within the intelligent receiver 102, as further detailed below.

The set of gas flow sensors 120 can also be configured for sensing, sampling, estimating, or measuring the discharge of the inhaler's medical aerosol dose, e.g., as an additional sensed gas flow signal component relative or in addition to a sensed air inflow signal component. For instance, in such embodiments the set of gas flow sensors 120 can measure air inflow into the intelligent receiver 102 while the patient is drawing air into the IVHC 100 by way of inhalation, prior to or in the absence of medical aerosol release by the inhaler 90; and can also measure a combination of air inflow into the intelligent receiver 102 and medical aerosol inflow into the intelligent receiver 102 while the patient is drawing air into the IVHC 100 by way of inhalation and the inhaler 90 is releasing or discharging the medical aerosol into the intelligent receiver 102.

In certain embodiments, the IVHC 100 includes an additional, supplemental, auxiliary, or adjunct set of sensors (e.g., in addition to the aforementioned set of gas flow sensors 120) electrically coupled to the intelligent receiver's processing unit 142 and memory 144, including one or more sensors configured for aiding or enabling the reliable detection of medical aerosol discharge or release from the inhaler into the intelligent receiver 102 and toward or into the intermediate sleeve member 160. For instance, with reference to FIGS. 2E and 2F, the intelligent receiver 102 can carry a set of inhaler discharge detection transducers/sensors 121, such as a temperature sensor and/or a microphone disposed within or proximate to the intelligent receiver's lumen structure 105, which can respectively be configured for detecting the inhaler's release of medical aerosol into the intelligent receiver 102 by way of detecting a temperature fluctuation/change or a set of sound frequencies within the base portion 102 associated with medical aerosol release from the inhaler 90. Additionally or alternatively, the set of inhaler discharge detection transducers/sensors 121 can include a photodiode configured for emitting particular visible or non-visible (e.g., infrared) optical wavelengths, and a corresponding photodetector (e.g., disposed opposite to or across from the photodiode) configured for detecting the light emitted by the photodiode. The photodiode and photosensor can be activated in response to the set of air flow sensors 120 detecting that the patient has begun drawing air into the intelligent receiver's lumen structure 105. Variation(s) in light intensity detected by the photodetector during patient inhalation can be correlated with medical aerosol discharge from the inhaler 90.

With reference again to FIG. 2C, the processing unit 142 and the memory 144 can be carried by a printed circuit board 140 disposed within the intelligent receiver's housing 110, e.g., below the user interface panel 130. The IVHC 100 also includes a timing unit or clock, which can be part of the processing unit 142 or separate therefrom depending upon embodiment details, in a manner readily understood by individuals having ordinary skill in the relevant art. An on/off switch 133 corresponding to the on/off button 132 can be carried by a particular portion of the printed circuit board 140, e.g., a first or upper side of the printed circuit board 140, as can the set of display devices, e.g., the plurality of LEDs 136a-d and/or the display screen. A set of emergency alert/SOS switches (not shown in FIG. 2D, but further indicated below with reference to FIG. 3) corresponding to the set of emergency alert/SOS buttons 135 can also be carried by a particular portion of the printed circuit board 140, such as the first or upper side of the printed circuit board 140.

The processing unit 142 and the memory 144 can be carried by another portion of the printed circuit board 140, such as a second, lower, or opposing side of the printed circuit board 140. The printed circuit board 140 can additionally carry a wireless communication unit 146 and associated wireless communication circuitry (e.g., one or more types of antennas) configured for wireless signal communication by way of Bluetooth™, WiFi, and/or another wireless communication modality (e.g., near field communication (NFC)); and a wire-based communication interface 148, which can include or be a micro-Universal Serial Bus (USB) interface or port.

In some embodiments, the wireless communication unit 146 and associated wireless communication circuitry additionally or alternatively includes a cellular modem (e.g., a conventional cellular modem integrated circuit chip) coupled to a subscriber identity module (SIM) card 145 (e.g., a conventional SIM card) carried and a cellular communication antenna (e.g., a conventional cellular communication antenna). In such embodiments, one or more of the cellular modem, the SIM card 145 (e.g., a nano-SIM card), and the cellular communication antenna can be carried by portions of the printed circuit board 140, an additional or associated printed circuit board, and/or a portion of the intelligent receiver's housing 110. For instance, the SIM card 145 can be insertable into and removable from a conventional SIM card interface carried by the intelligent receiver's housing 110, e.g., in a manner analogous to that for conventional mobile phones. In such embodiments, the IVHC 102 can communicate with other electronic/computing devices when communication by way of a Bluetooth™ or WiFi network is unreliable or unavailable/cannot be established, but communication with a cellular network (e.g., a cellular data network) is available. Moreover, in certain embodiments in which the IVHC 102 includes cellular network communication circuitry, cellular network signal strength can be indicated on the IVHC's user interface panel 130, e.g., by way of one or multiple signal strength bars presented by a display screen carried by the IVHC 102, in a manner readily understood by individuals having ordinary skill in the relevant art.

In multiple embodiments, the processing unit 142 is a microcontroller; however, in other embodiments, the processing unit 142 can include or be a Finite State Machine (FSM), an Application Specific Integrated Circuit (ASIC), an appropriately-programmed programmable logic device (PLD) such as a Field Programmable Gate Array (FPGA) loaded with an appropriate configuration bitstream, or a microprocessor. The memory 144 includes random access memory (RAM) and read-only memory (ROM), which can include programmable read-only memory (PROM) such as electrically erasable programmable read-only memory (EEPROM), in a manner readily understood by individuals having ordinary skill in the relevant art. In some embodiments, the processing unit 142, the memory 144, and the wireless communication unit 146 can be implemented by way of a system on a chip (SoC), in a manner readily understood by individuals having ordinary skill in the relevant art.

In a number of embodiments, the IVHC 100 includes a geolocation or geoposition unit 143, for instance, a Global Positioning Satellite (GPS) unit, e.g., which includes a micro-GPS or nano-GPS integrated circuit chip, which is coupled to the processing unit 142, and which can be carried by a particular portion of the intelligent receiver's printed circuit board 140 such as the second side thereof. The geolocation unit 143 is configured for capturing satellite generated signals, e.g., GPS signals, which facilitate or enable the determination of the geospatial or geographic location of the IVHC 100 or intelligent receiver 102 on a real time or near-real time basis, in a manner readily understood by individuals having ordinary skill in the art.

In some embodiments, the IVHC 100 also carries a spatial orientation sensor 149, such as a digital gyroscope (e.g., a MEMS gyroscope, such as a 3-axis MEMS gyroscope), which is configured for generating or capturing IVHC spatial orientation data values during an inhalation session, e.g., in response to or after the detection of medical aerosol dose discharge from the inhaler 90. The spatial orientation sensor 149 can be carried by a particular portion of the intelligent receiver's printed circuit board 140, such as its second side. In association with program instruction execution by the processing unit 142, date and time stamped spatial orientation data values generated or captured by the orientation sensor 149 are stored in the memory 144. By way of further program instruction execution, such spatial orientation data values can be processed or analyzed to determine whether the IVHC 100, and hence the inhaler 90, were in a proper, suitable, or acceptable spatial orientation or position during and/or after the inhaler's release of the medical aerosol dose. Individuals having ordinary skill in the relevant art will recognize that for proper release of an intended medical aerosol dose, during and immediately/shortly after medical aerosol dose discharge the IVHC 100 should be disposed such that the IVHC's central axis 101 is approximately horizontal relative to the surface of the earth, and the roll or rotation of a reference plane such as a plane corresponding to the printed circuit board 140 about the central axis 101 is within a predetermined acceptable roll range, e.g., +/− approximately 30 degrees.

The intelligent receiver 102 also carries a power source 150 internal to its housing 110, for instance, a battery and associated power distribution and power management circuitry. In several embodiments, the power source 150 can be recharged by way of the micro-USB port 148. In other embodiments, the power source 150 can be recharged by way of magnetic induction, in which case the housing 110 carries an appropriate magnetic induction antenna (e.g., a coil or loop antenna), in a manner readily understood by individuals having ordinary skill in the relevant art.

With reference again to FIG. 2B, the intelligent receiver's housing 110 also includes an intermediate sleeve member interface structure 112 having a predetermined length or depth parallel to the IVHC's central axis 101, and which is configured for receiving a corresponding or counterpart intelligent receiver interface structure 162 provided by the intermediate sleeve member 160. Such interface structures 112, 162, in conjunction with the aforementioned mating engagement elements 114, 164, ensure that the intelligent receiver 102 and the intermediate sleeve member 160 are securely held together when the IVHC 100 is being handled or used.

Figure 2G:
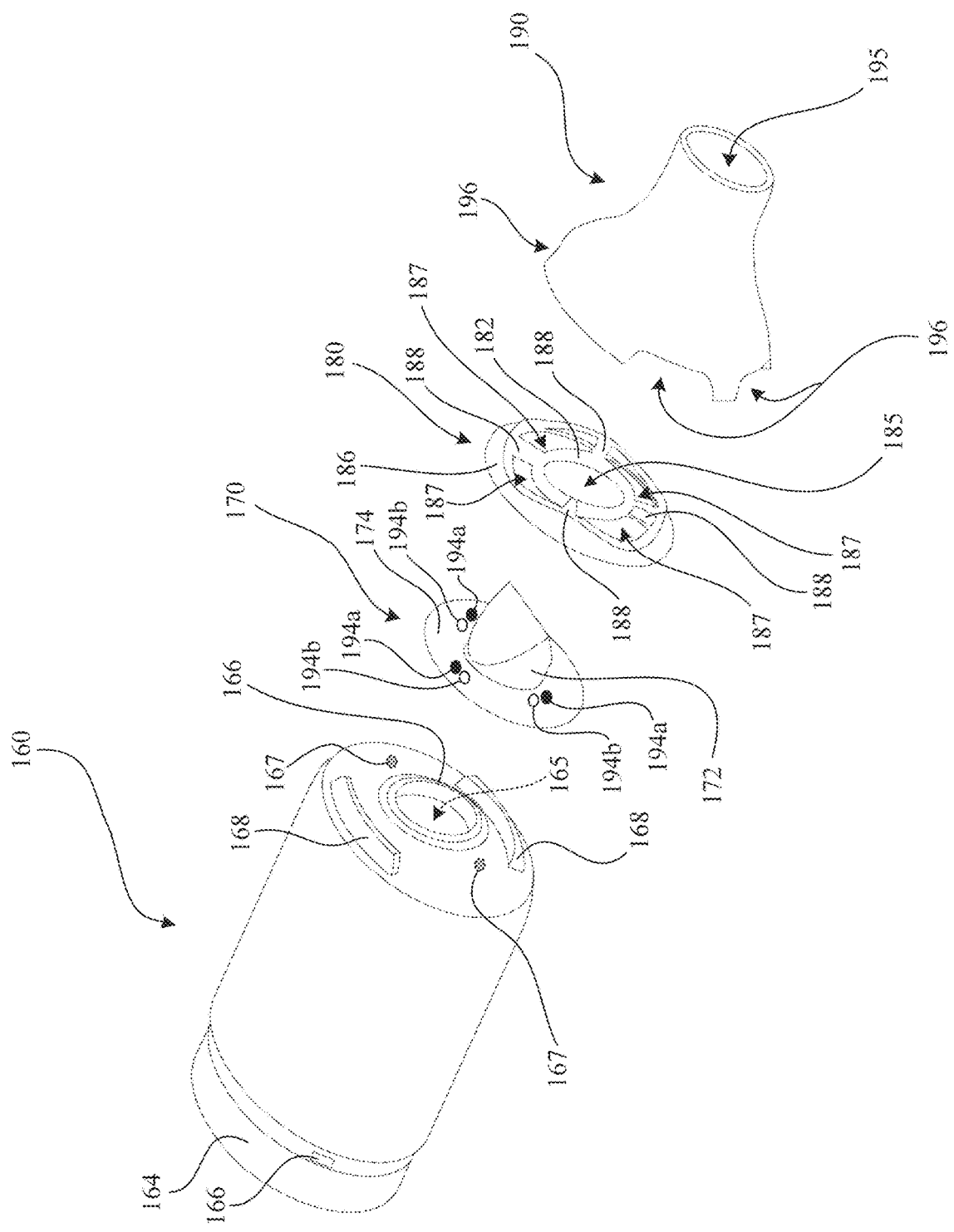
FIG. 2G is an exploded view showing portions of an intermediate sleeve member, a one-way valve structure, a mounting structure, and a mouthpiece portion of an IVHC in accordance with an embodiment of the present disclosure.

FIG. 2G is an exploded view showing portions of the intermediate sleeve member 160, the one-way valve structure 170, the mounting structure 180, and the mouthpiece portion 190 in accordance with an embodiment of the present disclosure. In certain embodiments, the intermediate sleeve member 160 can carry a set of ultrasonic transducers 167, e.g., carried by a proximal surface of the intermediate sleeve member 160, where each ultrasonic transducer 167 is electrically coupled to the processing unit 142, and is configured for emitting or outputting ultrasonic signals or a set of ultrasonic pulses in a proximal-to-distal direction within the intermediate sleeve member's lumen 165 following the detection of medical aerosol release from the inhaler into the base portion 102. Such ultrasonic signals or pulses emitted in directions counter to the distal-to-proximal flow of air and the medical aerosol dose traveling through the intermediate sleeve member 160 can further aid medical aerosol dose dispersal or expansion within the intermediate sleeve member's lumen 165, and reduction of the velocity of the medical aerosol dose flowing through the intermediate sleeve member's lumen 165. In such embodiments, the intermediate sleeve member 160 can have electrical wiring and corresponding electrical contact structures disposed therein/thereon (e.g., molded therein/thereon), which are configured for engagement with counterpart or corresponding electrical contact structures of the intelligent receiver 102 such that the ultrasonic transducers 167 can be electrically coupled to and controlled by the processing unit 142.

The intermediate sleeve member 160 includes a central exit aperture 166 at a proximal face or end thereof, into which portions (e.g., significant portions, such as at least 85-95% or more) of the medical aerosol dose released by the inhaler 90, along with the air that carries such portions of the medical aerosol dose, can exit the intermediate sleeve member 160 and flow into the one-way valve 172 and into the mouthpiece portion 190. In various embodiments, the intermediate sleeve member's central exit aperture 166 has a smaller cross-sectional area than the largest or maximum cross-sectional area of its lumen 165, e.g., such that a ratio of the cross-sectional are of the intermediate sleeve member's lumen 165 to the cross-sectional area of the central exit aperture 166 is between approximately 4.0-7.0

The intermediate sleeve member 160 can further include a plurality (e.g., a pair) of proximally projecting ribs 168 that are configured for insertion into or engagement (e.g., mating engagement) with the mounting structure 180 and/or counterpart inner structural elements of the mouthpiece portion 190. In several embodiments, the mounting structure 180 includes an inner ring 182 and an outer ring 186 that are coupled or joined together by way of a plurality of radially disposed posts or rods 188. The inner ring 182 provides an inner or central aperture 185; and the outer ring 186 in conjunction with the plurality of posts 188 provide a plurality of outer apertures 187 radially disposed about the central aperture 185. In several embodiments, the intermediate sleeve member's pair of proximally projecting ribs 168 are insertable into or through a corresponding pair of outer apertures 187 provided by the mounting structure 180.

The one-way valve structure 170 includes a one-way valve 172 (e.g., a duckbill valve) that is alignable with the intermediate sleeve member's central exit aperture 166, and which is insertable through the mounting structure's central aperture 185 such that it projects into portions of the mouthpiece portion 190. As indicated above, the one-way valve structure 170 additionally includes a deflection plate structure 174. When the IVHC 100 is assembled, the deflection plate structure 174 radially extends beyond the intermediate sleeve member's central exit aperture 166, and underlies the mounting structure's plurality of outer apertures 187. The deflection plate structure 174 can deflect and/or redirect gases exhaled by the patient into the mouthpiece portion 190 toward the exhaled gas vents 196 carried by the mouthpiece portion 190.

In further specific IVHC embodiments that include an additional set of sensors, the IVHC 100 can carry a set of exhaled breath sensors 194, which can be carried by the deflection plate structure 174 such that the exhaled breath sensor(s) are exposed to the patient's exhaled breath flowing in a proximal-to-distal direction through the mouthpiece portion 190 to a proximal surface of the deflection plate structure 174 that receives and deflects this exhaled breath toward the exhaled gas vents 196. The set of exhaled breath sensors 194 can include, for instance, a gas flow sensor 194a and/or a chemical species or chemical composition sensor 194b such as a ChemFET configured for sensing nitric oxide, the amount of which in exhaled breath is correlated with an extent of lung inflammation. Such exhaled breath sensors 194 and chemical composition sensors are also electrically couplable to the processing unit 142. For instance, the deflection plate structure 174 can include electrical contact structures configured for engagement with corresponding or counterpart electrical contact structures carried by the intermediate sleeve member 160, which can further carry wiring therein/thereon as well as electrical contact structures that are configured for engagement with corresponding or counterpart electrical contact structures provided by the intelligent receiver 102, such that the set of exhaled breath sensors 194 can be electrically coupled to and controlled by the processing unit 142.

The particular types of transducer(s)/sensor(s) carried by an IVHC 100, and the particular portion(s) of the IVHC 100 that carry the transducer(s)/sensor(s), can vary depending upon embodiment details, in a manner that individuals having ordinary skill in the art will readily comprehend in view of the description herein. In general, with respect to detecting distal-to-proximal flow of air inhaled into the IVHC 100 and possibly a medical aerosol dose introduced into the IVHC 100, the IVHC 100 includes at least a set of gas flow sensors 120 (i.e., one or more gas flow sensors 120 configured for sensing air inflow rate). In some embodiments, an IVHC 100 includes only gas flow sensors, e.g., the set of gas flow sensors 120 carried by the intelligent receiver 102, and omits, lacks, or excludes other types of sensors. In other embodiments, an IVHC 100 carries at least one gas flow sensor 120 and at least one inhaler discharge detection transducer/sensor 121. In several embodiments, only the IVHC's intelligent receiver 102 carries a set of gas flow sensors 120 and possibly a set of inhaler discharge detection transducers/sensors 121 (e.g., such that the set of gas flow sensors 120 is exposed to an internal portion of the intelligent receiver 102 through which inhaled air flows, and the set of inhaler discharge detection transducers/sensors 121 is exposed to an internal portion of the intelligent receiver 102 through which a medical aerosol dose flows), and other portions of the IVHC 100 omit, lack, or exclude transducers/sensors configured for sensing the distal-to-proximal transport or flow of substances within the IVHC 100. In alternate embodiments, the IVHC's intermediate sleeve member 160 can carry one or more transducers/sensors configured for sensing distal-to-proximal air and medical aerosol dose flow within the IVHC 100.

Aspects of Representative IVHC Electronics Architecture

Figure 3:
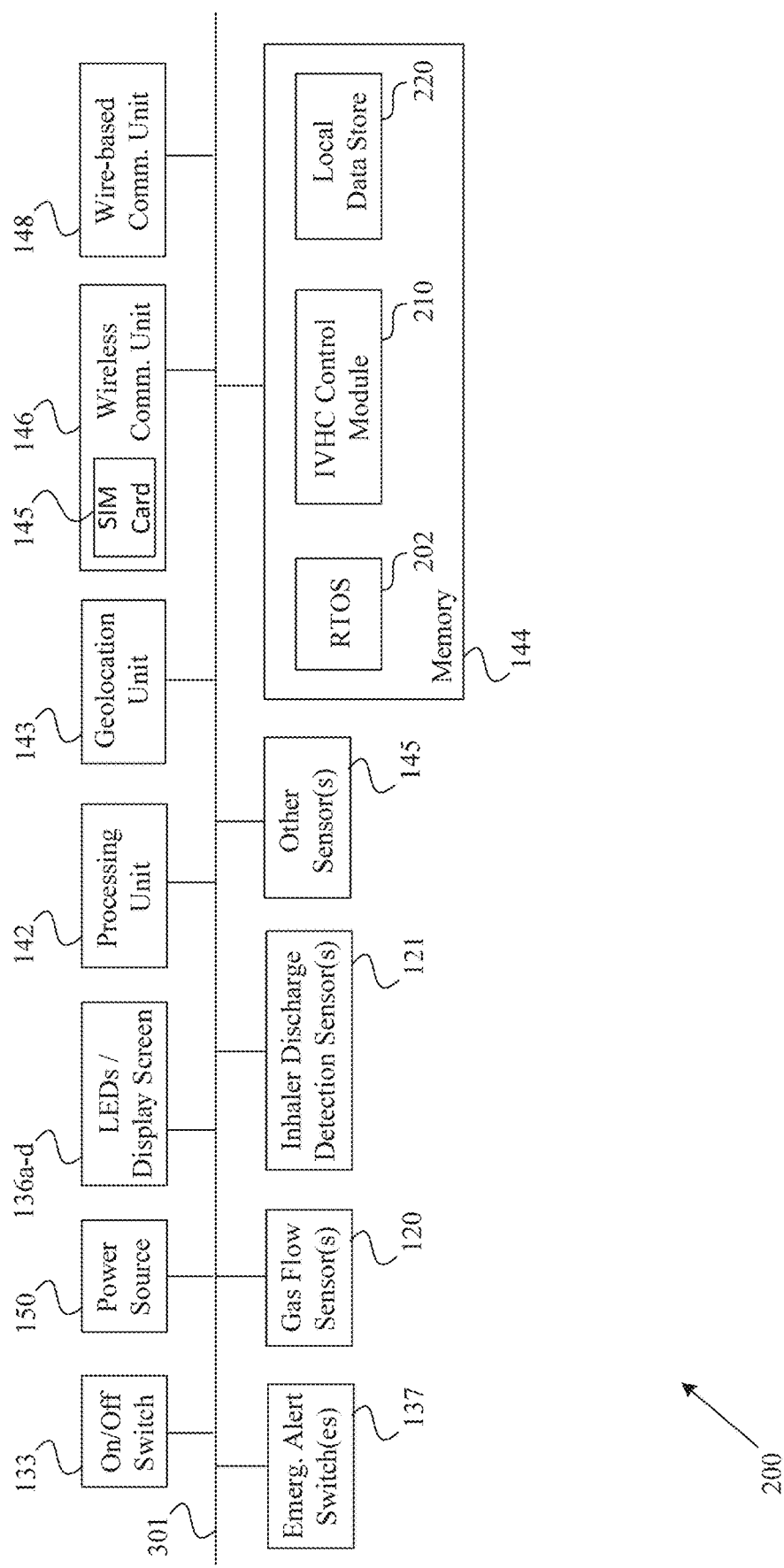
FIG. 3 is a block diagram of an IVHC electronics architecture in accordance with an embodiment of the present disclosure.

FIG. 3 is a block diagram of an IVHC electronics and program instruction set architecture 200 in accordance with a non-limiting representative embodiment of the present disclosure. In an embodiment, each of the processing unit 142, the memory 144, the wireless communication unit 146, the wire-based communication interface 148, the power source 150 and associated power management circuitry, the set of gas flow sensors 120, the set of inhaler discharge detection transducers/sensors 121 (if present), additional/other orientation sensor(s) 145 (if present), the on/off switch 133, the set of and the set of display devices, e.g., the plurality of LEDs 136a-d and/or a display screen, are electrically coupled by a set of predetermined signal communication lines and/or buses 301. When present, the set of ultrasonic transducers 147 and the set of exhaled breath sensors 194 are also electrically coupled to the set of signal lines and/or buses 301.

The memory 144 stores program instruction sets and data. In certain embodiments, a real time operating system (RTOS) 202 that is executable by the processing unit 142 can reside within the memory 144, whereas other embodiments need not include the RTOS or other OS, in a manner readily understood by individuals having ordinary skill in the relevant art. The memory 144 includes an IVHC control module 210 having or formed as one or more program instruction sets executable by the processing unit 142, which when executed control or perform various types of IVHC processes or operations, such as particular processes or operations described herein associated with generating, sampling, mathematically operating upon, and date/time stamping data values, and communicating stored data values to a destination external to the IVHC 100.

The IVHC control module 210 can also be configured for recording the incidence of and/or communicating an emergency alert or SOS signal or notification in response to patient activation of the set of emergency alert/SOS switches 137, e.g., when this set of switches 137 has been activated more than a predetermined number of times in succession (e.g., 3 or more times) during a particular time interval (e.g., e.g., 1-2 seconds), or activated continuously for a minimum amount of time (e.g., 2-3 seconds) in response to patient interaction with the set of emergency alert/SOS buttons 135. An emergency alert/SOS notification can include a date and time stamp, a patient ID, and a current geolocation of the intelligent receiver 102. The emergency alert/SOS notification can be communicated by way of the wireless communication unit 146 directly and/or indirectly to one or more electronic destinations, e.g., one or more of the patient/parent computing device 500 corresponding to the patient, the remote therapy management server 600, and a physician computing device 700 corresponding to the patient's physician. Such communication can involve signal or information transfer by way of one or more types of communication networks, e.g., a Bluetooth™ network or WiFi network if the IVHC 100 is connected thereto, and/or a cellular communication network (e.g., a cellular data network) if cellular network communication is available.

The memory 144 also includes a local data store 220 in which date and time stamped sampled data values that are acquired by way of the IVHC's transducer(s)/sensor(s), and calculated date and time stamped data values that are logically or mathematically derived from such sampled data values (e.g., by way of mathematical operations performed by the processing unit 142), can be stored. The memory 144 also provides one or more registers or buffers, e.g., including data communication buffers, in which data values can reside, in a manner readily understood by individuals having ordinary skill in the art.

Aspects of Representative Patient/Parent Computing Devices

As indicted above, a patient/parent computing device 500 can be a mobile computing device such as a smart phone or tablet computer, which in various embodiments inherently or by definition includes a processing unit (e.g., a microprocessor); a memory for storing program instruction sets (e.g., an operating system and software modules or application programs/apps) executable by the processing unit and data; a power source (e.g., a rechargeable battery); at least one type of data communication unit (e.g., a wire-based communication unit, such as a USB interface, and one or more wireless communication units such as a Bluetooth™ communication unit, a WiFi communication unit, and possibly an NFC communication unit); a user input device; and a display device, in a manner readily understood by individuals having ordinary skill in the relevant art. The input device and display device can be a combined user input/displace device, such as a conventional touch screen display. The patient/parent computing device's memory can also include a local inhalation therapy database corresponding to the patient. As further detailed below, by way of a patient/parent app executing on the patient/parent computing device, the display device can be configured for generating or providing particular types of user/visual interfaces that support or enable aspects of the patient's medical aerosol inhalation therapy regimen in accordance with embodiments of the present disclosure.

Figure 4:
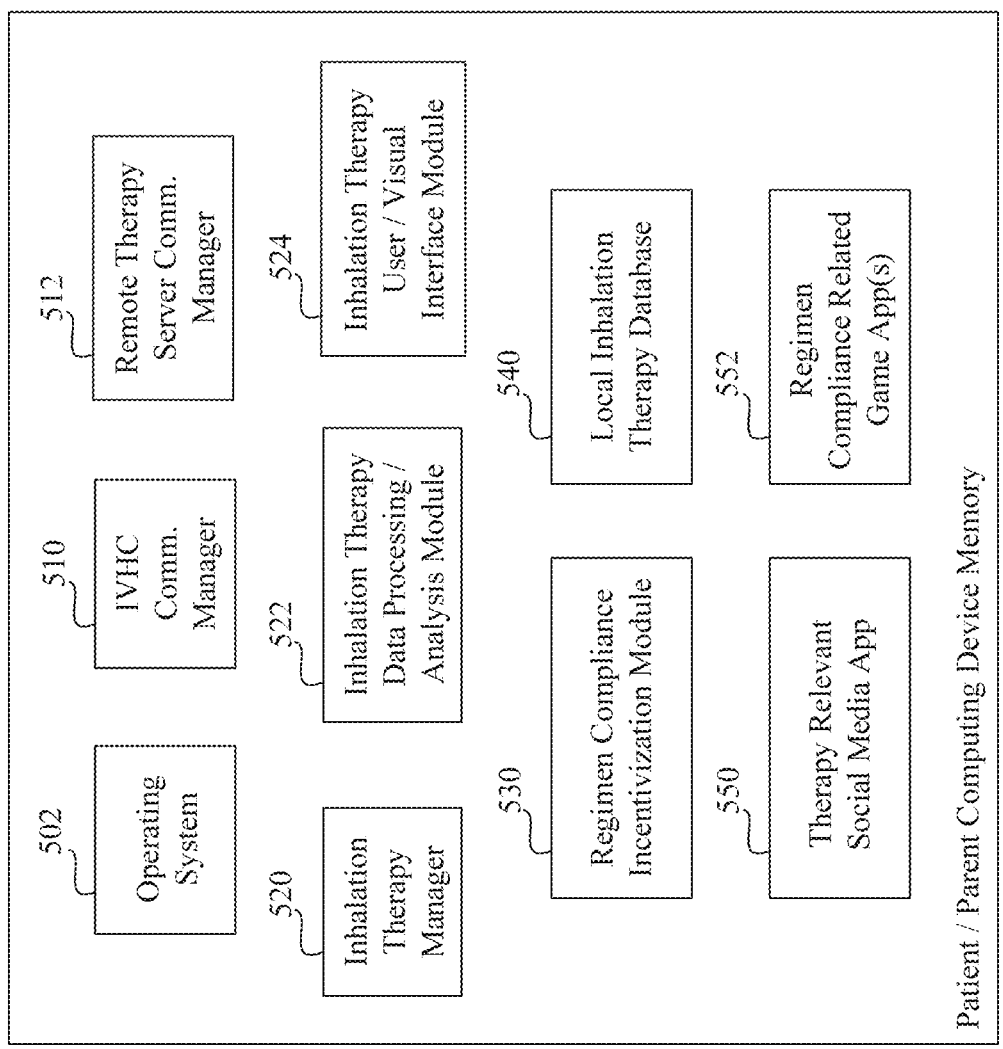
FIG. 4 is a block diagram showing portions of particular program instruction sets or software modules within a memory of a patient/parent computing device in accordance with an embodiment of the present disclosure.

FIG. 4 is a block diagram showing particular program instruction sets or software modules (e.g. application programs/apps, or portions thereof, including a patient/parent app) that can reside within the patient/parent computing device's memory, and which are executable by the patient/parent computing device's processing unit in accordance with particular non-limiting representative embodiments of the present disclosure for managing or controlling certain processes that support, track, or provide visual feedback relating to the patient's medical aerosol inhalation therapy regimen. In an embodiment, the patient/parent computing device's memory includes an operating system 502; a set of data communication modules, such as an IVHC communication module 510, and a remote therapy management server communication module 514; an inhalation therapy manager 520; an inhalation therapy data processing/analysis module 522; an inhalation therapy user/visual interface manager 524; a regimen compliance incentivization module 530; and a local inhalation therapy database manager 540. The patient/parent device's memory can further include an inhalation therapy relevant social media app 550, and/or a set of game apps 552 related or relevant to improving or incentivizing patient compliance with their inhalation therapy regimen.

The IVHC communication module 510 is configured for establishing and managing data communication processes or operations between the patient/parent computing device 500 and the particular IVHC 100 associated therewith, including the transfer of date and time stamped data, including inhalation technique scores corresponding to one or more most-recent inhalation therapy sessions, to the patient/parent computing device 500. The remote therapy management server communication module 514 is configured for establishing and managing data communication processes or operations between the patient/parent computing device 500 and the remote therapy management server 600, including the transfer of date and time stamped data corresponding to one or more most-recent inhalation therapy sessions between the patient/parent computing device 500 and the remote therapy management server 600; and the retrieval of a current or next (e.g., revised) inhalation therapy regimen corresponding to the patient from the remote therapy management server 600.

The inhalation therapy manager 520 is configured for receiving or retrieving the current or up-to-date inhalation therapy regimen from the remote therapy management server 600 by way of the remote therapy management server communication module 514. In some embodiments, the inhalation therapy manager 520 can additionally or alternatively be configured for patient/parent input or calendaring of an inhalation therapy regimen, e.g., based on written instructions provided by the patient's physician. The inhalation therapy manager 520, in association with the inhalation therapy user/visual interface manager 524, is also configured for generating or issuing and presenting reminders or notifications corresponding to a next scheduled inhalation therapy session based on the current inhalation therapy regimen, as well as tracking specifically when the patient's inhalation therapy sessions actually occurred. Such reminders can be presented to the patient or parent by way of the patient/parent device's user interface, or can be communicated to another type of patient/parent device such as a smart watch for presentation to the patient or parent thereby.

The inhalation therapy manager 520, in association with the inhalation therapy data processing/analysis module 522, is further configured for processing, analyzing, evaluating, managing, and/or tracking data or scores corresponding to the patient's current, recent, and/or historical inhalation technique and inhalation therapy regimen compliance. The inhalation therapy data processing/analysis module 522 can generate composite inhalation technique scores and inhalation therapy regimen compliance scores, which can be stored in the local inhalation therapy database. In some embodiments, the inhalation therapy data processing/analysis module 522 can also generate, calculate, or derive additional scores, ratings, or measures, such as trend information or statistical measures, from composite inhalation technique scores and inhalation therapy regimen compliance scores, which can also be stored in the local inhalation therapy database.

In some embodiments, the inhalation therapy manager 520 is also configured for generating and issuing an emergency alert/SOS notification to one or more electronic destinations, e.g., the remote therapy management server 600 and/or a physician computing device 700, in response to patient or parent activation of (i) the set of emergency alert/SOS buttons 135 such as set forth above, and/or (ii) a visual/graphical emergency alert/SOS button in a manner set forth below with respect to FIG. 9A. The emergency alert/SOS notification can indicate that the patient is currently experiencing a respiratory attack. The emergency alert/SOS notification can include a date and time stamp, a patient ID, and a current geolocation of the IVHC's intelligent receiver 102 or the current geolocation of the patient/parent computing device 400.

The local inhalation therapy database manager 540 manages the contents of the local inhalation therapy database, including local inhalation database storage of (a) most-recent and typically at least some historical data (e.g., representing 1-12 or more weeks of stored data corresponding to the patient), such as most-recent and some historical individual and composite inhalation technique scores and most-recent and some inhalation therapy regimen compliance scores; and (b) the current or up-to-date inhalation therapy regimen for the patient.

The inhalation therapy manager 520 in association with the inhalation therapy user/visual interface manager 524 is configured for generating or presenting user/visual interfaces on the patient/parent computing device's display that visually, graphically, or pictorially represent particular scores, ratings, or measures indicating the patient's current, recent, and/or historical inhalation therapy technique and inhalation therapy regimen compliance. Such user/visual interfaces can additionally receive patient input defining respiratory attack indications, and annotations or notes corresponding to respiratory attacks. A respiratory attack indication includes a date or date and time (e.g., estimated time) of a respiratory attack, and possibly a respiratory attack severity rating. The inhalation therapy manager 520 can store such respiratory attack related information as respiratory attack data. The inhalation therapy manager 520 can also be configured for communicating some or all of the aforementioned data, scores, ratings, or measures to the remote therapy management server 600 by way of the remote therapy management server communication module 514.

The inhalation therapy manager 520, in association with the regimen compliance incentivization module 530 and communication with the remote therapy management server 600, is further configured for generating or presenting a set of user/visual interfaces by which (a) one or more current inhalation therapy regimen compliance rewards can be selected, chosen, or defined; and (b) incentive points can be tracked, managed, and redeemed for incentive points awards. The inhalation therapy manager 520 can also be configured for indicating ongoing patient progress toward achieving or attaining such reward(s) or award(s), and indicating the award availability or transfer of such reward(s) or award(s) to the patient based on inhalation therapy regimen compliance scores. For instance, patient progress toward achieving such reward(s) or award(s) can be based on whether (a) one or more inhalation therapy regimen compliance scores over one or more time periods (e.g., 2 weeks, 1 month, 3 months, or 6 months, for instance, depending upon the type of reward or award, or the significance or value thereof) indicate the achievement or attainment of a selectable or predetermined threshold inhalation therapy compliance threshold or target (e.g., 70%, 80%, 85% or greater compliance with their inhalation therapy regimen), and/or exhibit an appropriate or predetermined trend; and possibly also (b) one or more inhalation technique scores over one or more time periods indicate acceptable, good, or excellent inhalation therapy technique, and/or exhibit an acceptable or appropriate trend, across a selectable or predetermined minimum threshold or target percentage of their inhalation therapy sessions (e.g., 70%, 80%, or 85%) during the time periods under consideration within the current inhalation therapy regimen.

The inhalation therapy relevant social media app 550 enables patient/parent access to a therapy relevant social media platform, by which patients, parents, and physicians can post or share various types of therapy related information such as described above. The set of game apps 552 provide or enable patient access to one or more games by which patient compliance with their inhalation therapy regimen can be incentivized. For instance, incentive points can be redeemed for particular types of game character accessories or items that are useful or needed during game play.

Aspects of a Representative Remote Therapy Management Server

The remote therapy management server 600 can include one or more physical and/or virtual servers, which can include or be cloud-based computing machines, in a manner readily understood by individuals having ordinary skill in the relevant art. Thus, in various embodiments the remote therapy management server 600 inherently or by definition includes one or more processing units; a memory for storing program instruction sets (e.g., an operating system and software modules or application programs) executable by the processing unit(s) and data; one or more data storage devices (e.g., disk drives and/or network attached storage devices); a power source; a set of communication units configured for data communication over one or more computer networks including the Internet; plus typically a user input device and a display device. In several embodiments, the remote therapy management server 600 is coupled to the patient database 680, the physician database 682, and the reward/award database 684, which can reside in an environment local to or remote from the remote therapy management server 600.

Figure 5:
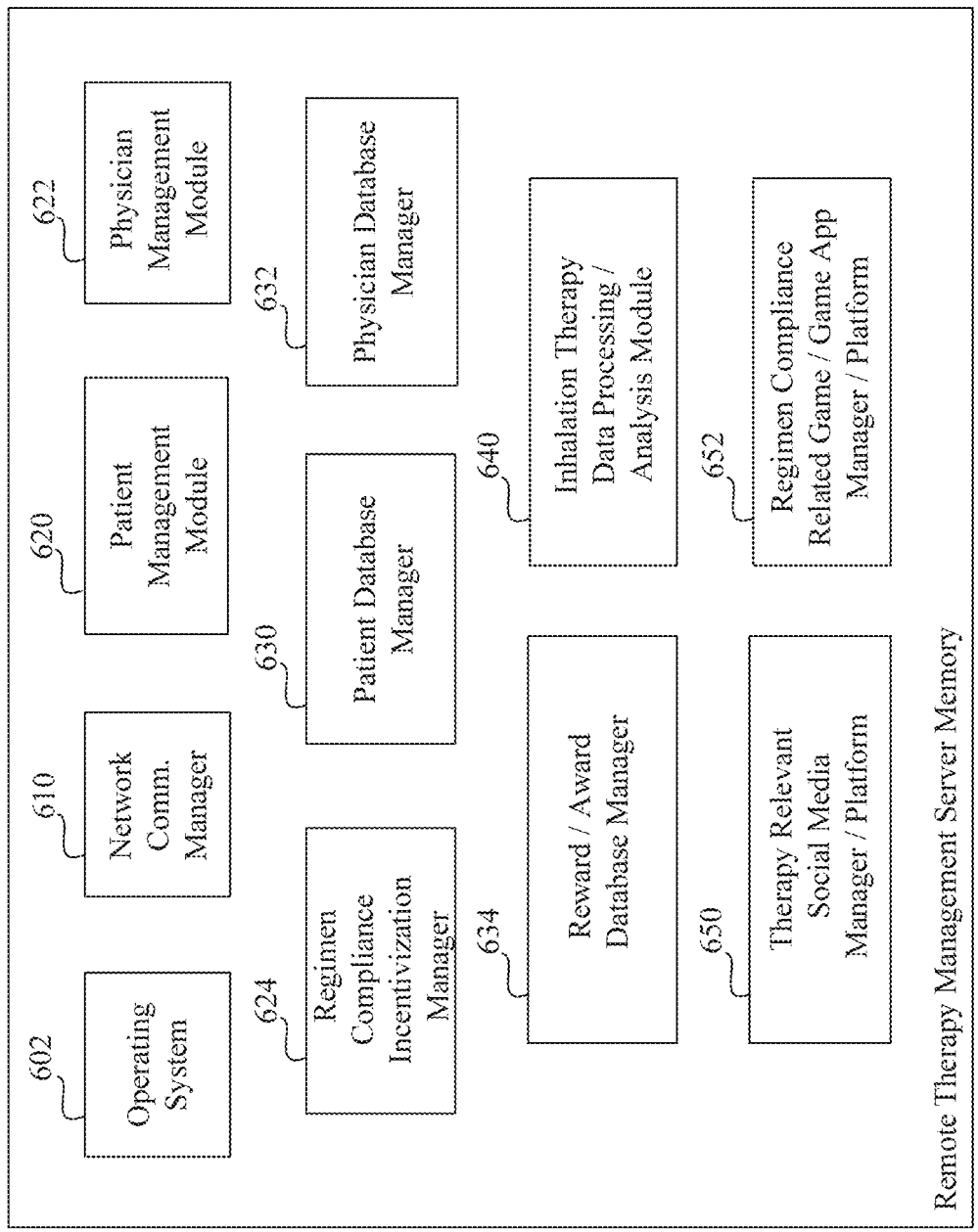
FIG. 5 is a block diagram showing portions of particular program instruction sets or software modules within a patient management server in accordance with an embodiment of the present disclosure.

FIG. 5 is a block diagram showing portions of particular program instruction sets or software modules within the remote therapy management server's memory in accordance with particular non-limiting representative embodiments of the present disclosure, which are executable by the remote therapy management server's processing unit(s). In an embodiment, the patient management server's memory includes an operating system 602; a network communication manager 610; patient management module 620; a physician management module 622; a regimen compliance incentive manager 624; a patient database manager 630; a physician database manager 632; a reward/award database manager 634; and an inhalation therapy data processing/analysis module 640. The patient management server's memory can further include a therapy relevant social media platform 650, and a regimen compliance related game/game app manager 652.

The network communication manager 610 can manage or control data communication between the remote therapy management server 600 and other computing systems or devices, which occurs over one or more computer networks to which the remote therapy server 600 is coupled.

For each patient having an IVHC 100, the patient management module 620 manages communication between the remote therapy management server 600 and each of the patient/parent computing device(s) 500. This can involve the retrieval or receipt of information corresponding to the patient, including basic patient data (e.g., patient name, physical address(es), email address(es), and telephone number(s)); the type(s) of patient/parent computing devices 500 associated with the patient's IVHC 100; possibly a patient/parent user name and password that each patient/parent computing device 500 uses to access the remote therapy management server; data corresponding to or derived from sampled signal data values generated or obtained by the patient's IVHC 100, such as inhalation technique scores, composite inhalation technique scores, inhalation therapy regimen compliance scores; and patient respiratory attack data. This can also involve the transfer of a current or updated inhalation therapy regimen for the patient to their patient/parent computing device(s) 500.

The physician management module 622 manages communication between the remote therapy management server 600 and physician computing devices 700. This can include the retrieval or receipt of information corresponding to or generated by physicians who are responsible for patients having IVHCs 100, including basic physician data (e.g., physician name, physical address(es), email address(es), and telephone number(s)); the type(s) of physician computing devices 700 associated with the physician, and for each physician a user name and password for accessing the remote therapy management server 600); names and/or identifiers corresponding to the patients with IVHCs 100 for whom the physician is responsible; and inhalation therapy regimen definitions for each of these patients. This can also include the transfer of one or more of the aforementioned scores relating to each such patient's inhalation therapy regimen, and/or trend information or statistical measures generated such scores, and respiratory attack data, to appropriate physician computing devices 700.

The patient database manager 630 manages the storage of patient-related data in and retrieval of patient-related data from the patient database 680; and the physician database manager 632 manages the storage of physician-related data in and retrieval of physician-related data from the physician database 682.

The inhalation therapy data processing/analysis module 640 can process or analyze inhalation therapy regimen related data corresponding to one or more patients of one or more physicians associated with the system 10, and generate associated analytical data such as categorical information, trend information, and statistical measures that can be stored in the patient database 680 and/or the physician database 682. Such analytical data can provide indications of, be correlated with, or correspond to patients' inhalation therapy regimen compliance scores, inhalation therapy technique scores, and/or respiratory attack data, e.g., based on one or more of patient age range(s), gender(s), geographical location(s), and/or other factors.

The inhalation therapy compliance regimen incentive manager 624 manages the provision of data relating to inhalation therapy regimen compliance incentive rewards and redeemable incentive point awards (e.g., where such data can include identifiers, images, descriptors, and/or hyperlinks) to patient/parent computing devices 500; the association of particular compliance incentive rewards and incentive point awards with a given patient, along with a selected or predetermined set of compliance incentive reward conditions and incentive point grant and redemption criteria, such as set forth above; and the award or transfer of compliance incentive rewards and incentive point awards to the patient/parent upon the patient's successful attainment or achievement of the appropriate conditions or criteria, such as indicated above. The inhalation therapy regimen compliance incentive database manager 634 manages the contents of its associated database 684, e.g., which includes references or hyperlinks to selectable compliance incentive award data and incentive points reward data.

The therapy relevant social media platform 650 can provide a social media platform by which patient/parent computing devices 500 and physician computing devices 700 can post or share information relating to patient therapy, patient regimen compliance, IVHC usage, and experiences relating to inhalation sessions and respiratory attacks. The game/game app manager 652 provides patient computing device access to particular games or game apps that can incentivize patient compliance with their inhalation therapy regimens.

Aspects of a Representative Physician Computing Device

As indicated above, physician computing devices 700 corresponding to a given physician or physician group can include one or more of a desktop computer, a laptop computer, a tablet computer, and a smart phone. Thus, in various embodiments a physician computing device 700 inherently or by definition includes a processing unit, a memory for storing program instruction sets (e.g., an operating system and application programs/apps) executable by the processing unit and data; a power source; one or more types of data/network communication units; an input device; and a display device. The physician computing device 700 can further include a local inhalation therapy database corresponding to the physician's patients. As further detailed below, by way of a physician app executing on a physician computing device 700, the physician computing device's display can be configured for generating or providing particular types of user/visual interfaces that support or enable physician review or analysis of the current and historical medical aerosol inhalation therapy performance or behaviors of their patients having IVHCs 100.

Figure 6:
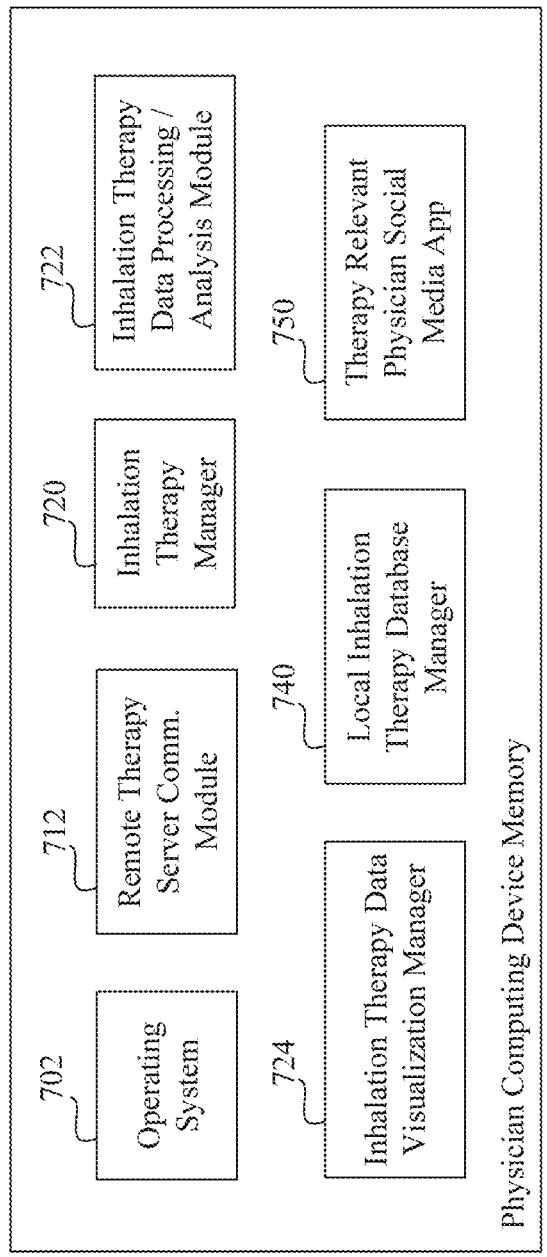
FIG. 6 is a block diagram showing particular program instruction sets or software modules within a physician computing device in accordance with an embodiment of the present disclosure.

FIG. 6 is a block diagram showing particular program instruction sets or software modules (e.g. application programs/apps, or portions thereof, including a physician app) that can reside within a physician computing device's memory, and which are executable by the physician computing device's processing unit in accordance with particular non-limiting representative embodiments of the present disclosure for managing processes that support, track, analyze, and/or provide visual feedback relating to their patients' inhalation therapy regimen performance or behaviors. In an embodiment, the physician computing device's memory includes an operating system 702; a remote therapy management server communication module 712; an inhalation therapy manager 720; an inhalation therapy data processing/analysis module 722; an inhalation therapy data visualization manager 724; and a local inhalation therapy database manager 740. The physician computing device's memory can further include a therapy relevant social media app 750.

The local inhalation therapy database manager 740 can manage the storage of patients' inhalation therapy related data in and retrieval of patients' inhalation therapy data from the local inhalation therapy database.

The inhalation therapy manager 720 can be configured for providing user/visual interfaces for establishing or defining an inhalation therapy regimen corresponding to each of the physician's patients, which for any given patient specifies the dates and times (e.g., recurring dates and times) at which the patient is to perform inhalation therapy sessions; and storing such inhalation therapy regimens in the local inhalation therapy database by way of the local inhalation therapy database manager 740. In association with the remote therapy management server communication module 712, the inhalation therapy manager 720 can also manage or initiate the communication of an inhalation therapy regimen corresponding to each of the physician's patients having an IVHC 100 to the remote therapy management server 600.

Similarly, the inhalation therapy manager 720 can also manage or initiate the retrieval or receipt of inhalation therapy related data corresponding to sampled IVHC data values associated with the physician's patients, and other data mathematically calculated or derived from such data values, from the remote therapy management server 600. Such data can include individual and composite inhalation technique scores, inhalation therapy regimen compliance scores, and respiratory attack data. The inhalation therapy manager 720, in association with the inhalation therapy data processing/analysis module 722 and/or the remote therapy management server 600, can further process or analyze such scores and data, possibly in combination with previously retrieved/received scores and data that reside within the local inhalation therapy database, e.g., based on patient age(s), gender(s), geographical location, medical history, and/or other factors, and can generate and store corresponding further data analysis results in the physician computing device's local inhalation therapy database by way of the local inhalation therapy database manager 640. The inhalation therapy data visualization manager 724 can generate or present user/visual interfaces on the physician computing device's display to indicate one or more of patients' inhalation technique scores plus inhalation therapy regimen compliance scores, and respiratory attack data on an individual patient or patient group basis, e.g., based on data stored in the local inhalation therapy database.

The therapy relevant social media app 750 enables physician access to a therapy related social media platform, by which patients, parents, and physicians can post or share various types of therapy related information such as described above.

Aspects of Representative Patient/Parent Computing Device User/Visual Interfaces FIGS. 7A-7G show particular representative user/visual interfaces generated or provided by a patient/parent computing device 500, e.g., by way of one or more portions of the patient/parent app executing thereon, in accordance with particular non-limiting representative embodiments of the present disclosure. Such user/visual interfaces can include conventional user/visual interface elements, in a manner readily understood by individuals having ordinary skill in the art. More particularly, in an embodiment, these user/visual interfaces include a main user interface or home page 800 such as that shown in FIG. 7A, which includes a data transfer or connection status portion 810 indicating whether a data transfer connection (e.g., a wireless data transfer connection, such as a Bluetooth™ connection) between the patient/parent computing device 500 and the patient's IVHC 100 exists; a next inhalation therapy session portion 812 that indicates the date and time of the patient's next inhalation therapy session; a next physician appointment portion 814 that indicates the date and time of the patient's next appointment with their physician; an inhalation session calendar and recent session summary portion 812 by which the patient/parent can access a detailed inhalation therapy session calendar, and which can provide a brief summary of recent inhalation therapy session results or outcomes (e.g., as previously entered by the patient); and an inhalation therapy regimen compliance and inhalation therapy technique portion 840 that a visual or graphical indicates patient inhalation therapy regimen compliance measures and inhalation therapy technique measures corresponding to one or more time periods, e.g., on a weekly or monthly basis for recent weeks or months, respectively. A navigation region or bar 890 provides selectable controls (e.g., icons) responsive to patient or parent input, by which the patient/parent computing device 400 can selectively present particular user/visual interfaces to the patient or parent.

In some embodiments, the main user interface 800 and/or one or more other user interfaces provide a visual or graphical emergency/SOS button 895 that the patient or their parent can activate or select, e.g., by way of repeatedly pressing the emergency/SOS button 895 at least a predetermined minimum number of times within a specific time interval (e.g., at least 3 times in succession within 1-2 seconds), or continuous depression for a minimum amount of time (e.g., at least 3 seconds). In response to activation or depression of the emergency/SOS button 895, the patient/parent app, e.g., the inhalation therapy manager 520, can generate and issue an emergency alert/SOS notification to one or more electronic destinations, such as in a manner set forth above.

Figure 7A:
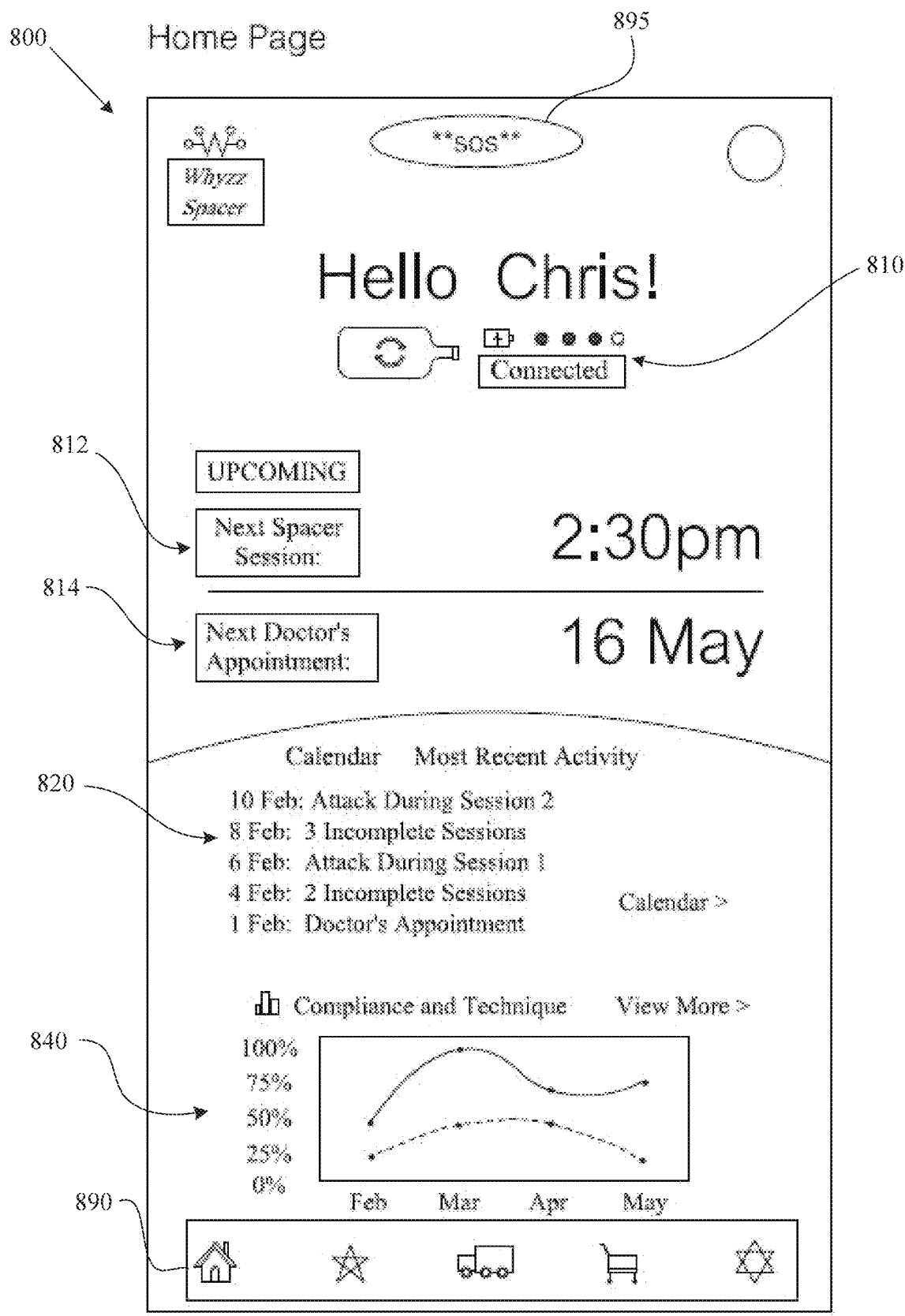
FIGS. 7A-7I show particular representative user/visual interfaces provided by a patient/parent computing device in accordance with an embodiment of the present disclosure.
Figure 7B:
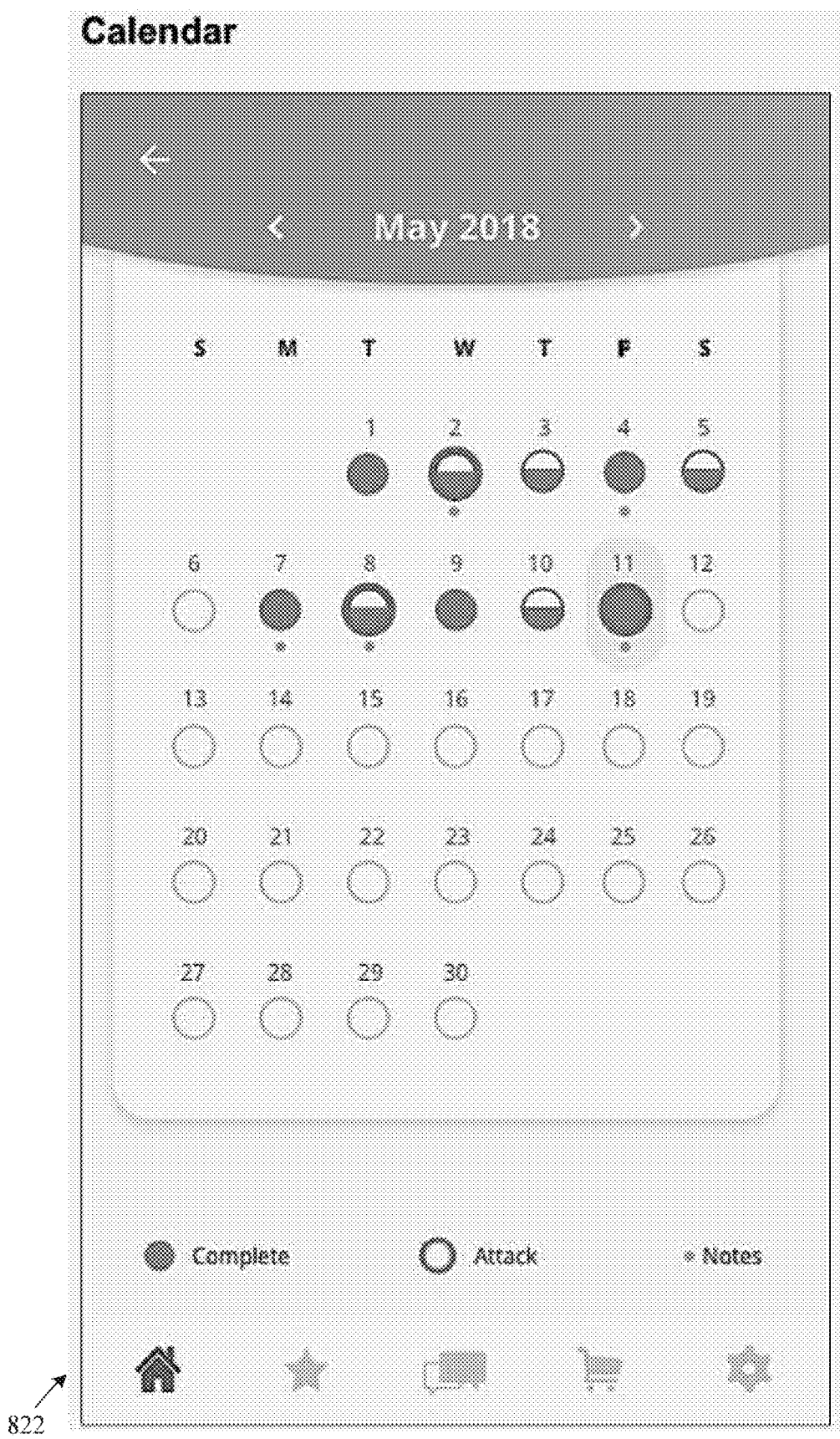
Figure 7C:
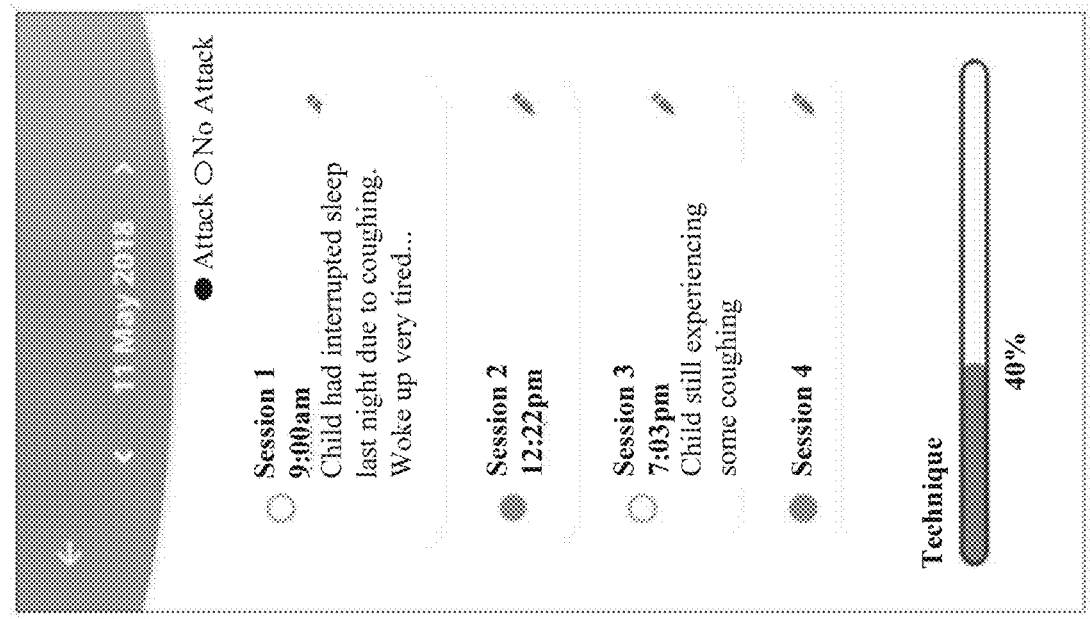

FIG. 7B illustrates a representative patient inhalation therapy session calendar interface 822 in accordance with an embodiment of the present disclosure, which indicates for each among multiple previously scheduled inhalation therapy sessions whether the session actually occurred; an outcome for the session, including whether the session was completed and whether and when a respiratory (e.g., asthmatic) attack occurred, such as recently or during the session; and whether any patient-entered notes (e.g., respiratory attack notes) exist for the session. In response to the selection of any given calendar date for which a session was scheduled, a corresponding inhalation therapy session result interface 824 such as that shown in FIG. 7C can be generated, which visually or graphically indicates or depicts an outcome for each session on that date, enables access to or entry of patient or parent notes corresponding to each such session, and provides individual or a composite inhalation therapy technique measure or score for the sessions on that date.

Figure 7D:
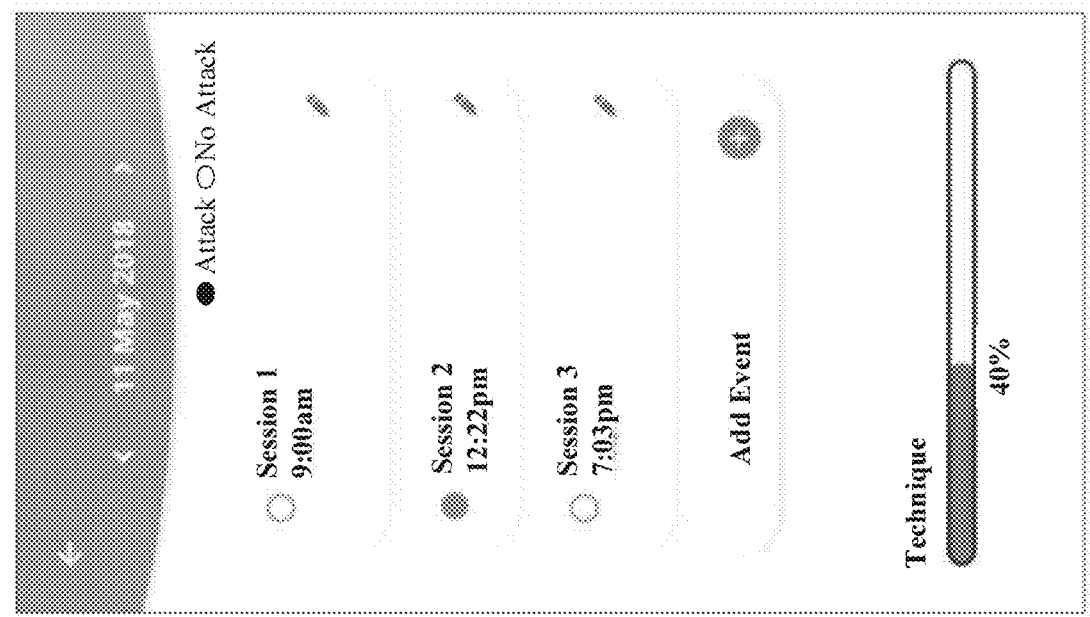
Figure 7E:
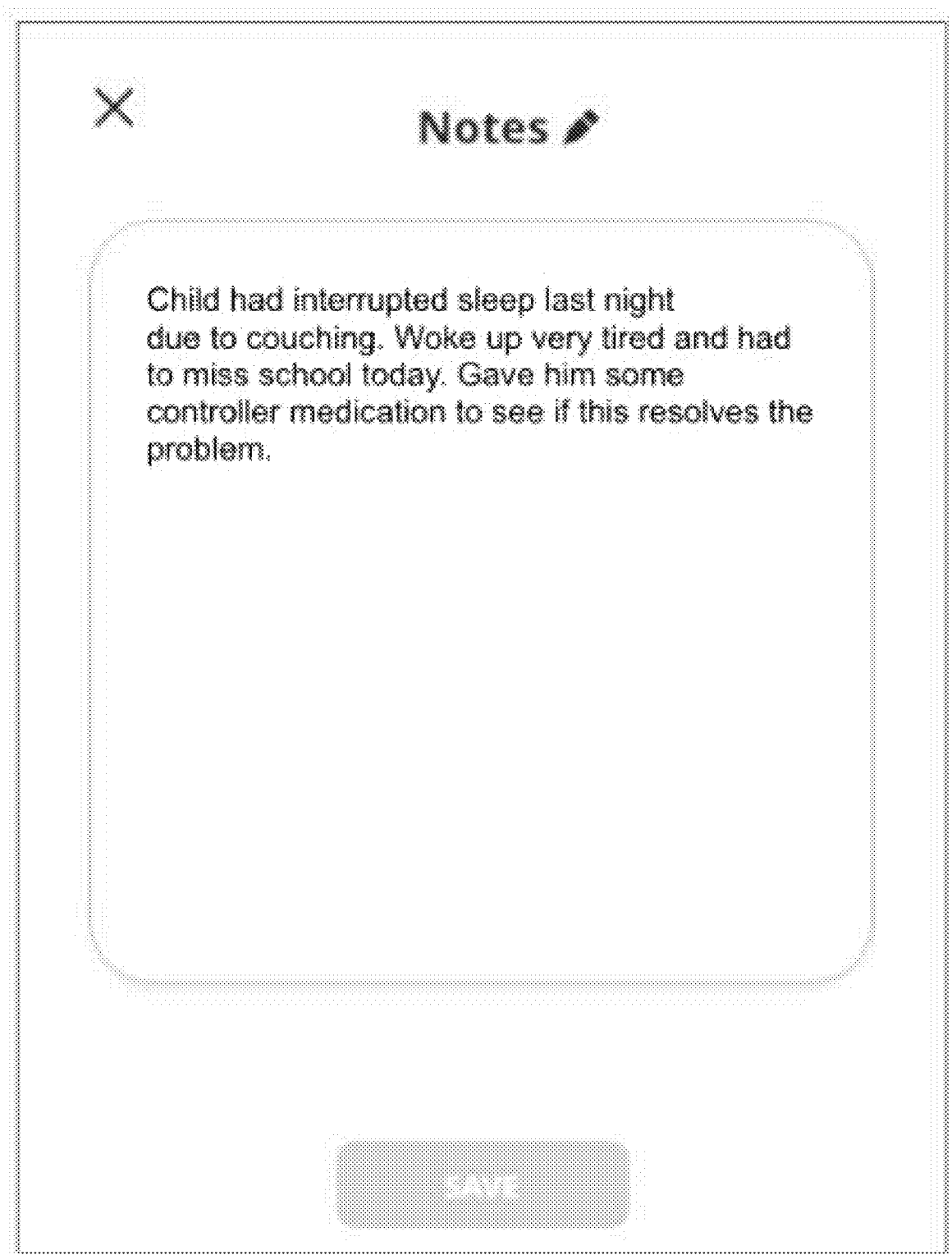

The patient or parent can add an inhalation therapy session on a given date, such as by way of an add inhalation therapy session interface 826 shown in FIG. 7D, which is configured for receiving patient or parent input corresponding to an outcome for a newly-added session, and any patient or parent notes corresponding to the newly-added session. An inhalation therapy session notes interface 828 such as shown in FIG. 7E can receive input (e.g., by way of a text box) corresponding to patient or parent notes for a given inhalation therapy session.

Figure 7F:
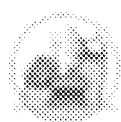
Figure 7F:
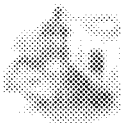
Figure 7F:
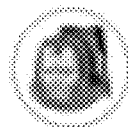
Figure 7F:
Figure 7F:
Figure 7F:
Figure 7F:
Figure 7F:
Figure 7G:
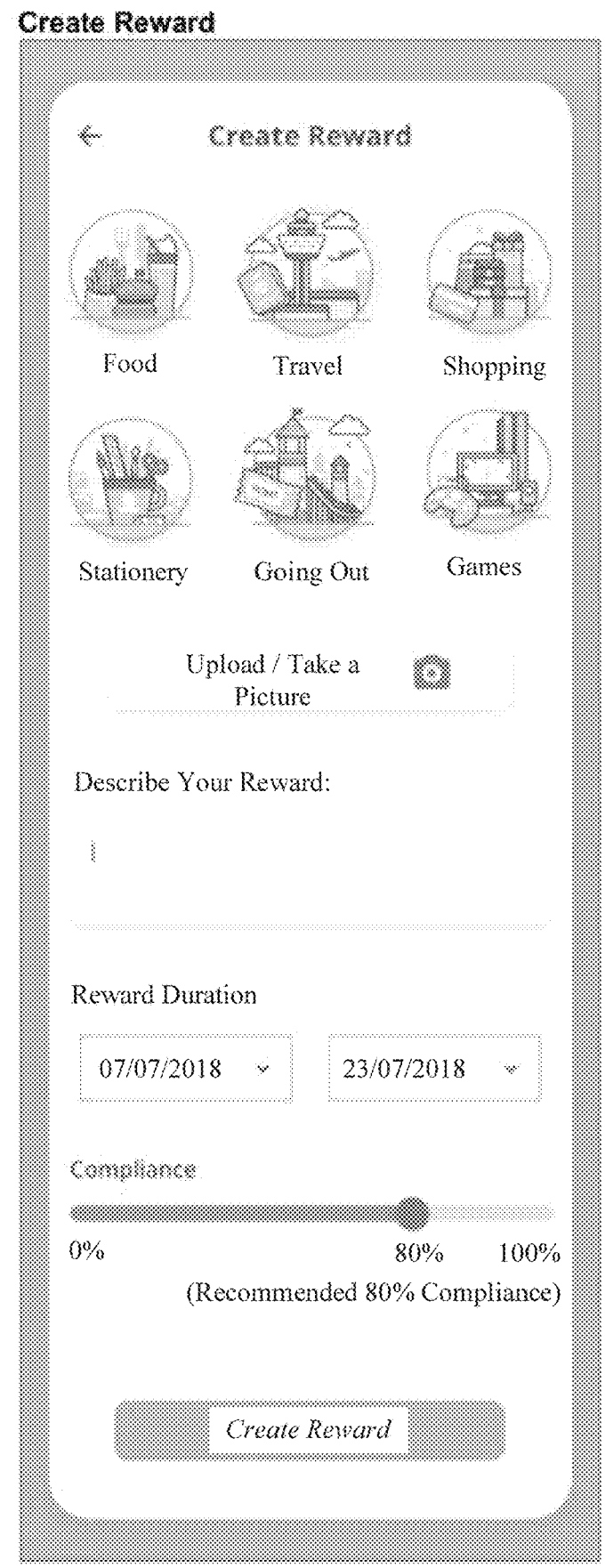

FIGS. 7F-7I show representative inhalation therapy regimen compliance incentive reward interfaces provided by the patient/parent computing device 500. More specifically, FIG. 7F shows a current inhalation therapy regimen compliance incentive reward interface 860, which visually or graphically lists or identifies one or more inhalation therapy regimen compliance incentive rewards that the patient is currently working toward obtaining; a target or threshold inhalation therapy regimen compliance measure corresponding to each such reward; and the patient's current progress in obtaining each such award based on their current or most-recent inhalation therapy regimen compliance measure (s) relative to the target or threshold inhalation therapy regimen compliance measure(s).

The current inhalation therapy regimen compliance incentive reward interface 860 also provides a reward creation icon or button. In response to the selection thereof, the patient/parent computing device 500 generates an inhalation therapy regimen compliance incentive reward creation/selection interface 870 such as that shown in FIG. 7G. The reward creation/selection interface 870 provides multiple selectable visual/graphical objects (e.g., icons or buttons) corresponding to or indicating different categorical types of rewards (e.g., rewards associated with food, travel, shopping, stationery, amusement/entertainment, and electronic or computer games). The reward creation/selection interface 870 additionally includes an "upload picture" interface, in response to which the patient/parent computing device 400 uploads an image corresponding to a reward that is custom-defined by the patient or parent, and a "describe reward" interface (e.g., a text box) responsive to patient or parent input that describes the reward corresponding to the uploaded image. The reward creation/selection interface 870 further includes a reward duration interface responsive to patient or parent input for defining a start date and an end date across which the newly created reward remains valid and can be obtained by the patient; and an inhalation therapy regimen compliance measure interface responsive to patient or parent input for defining or establishing a target or threshold patient inhalation therapy regimen compliance measure (e.g., 80%) that the patient must attain or reach in order to obtain the newly created reward.

Figures 7H, 7I:
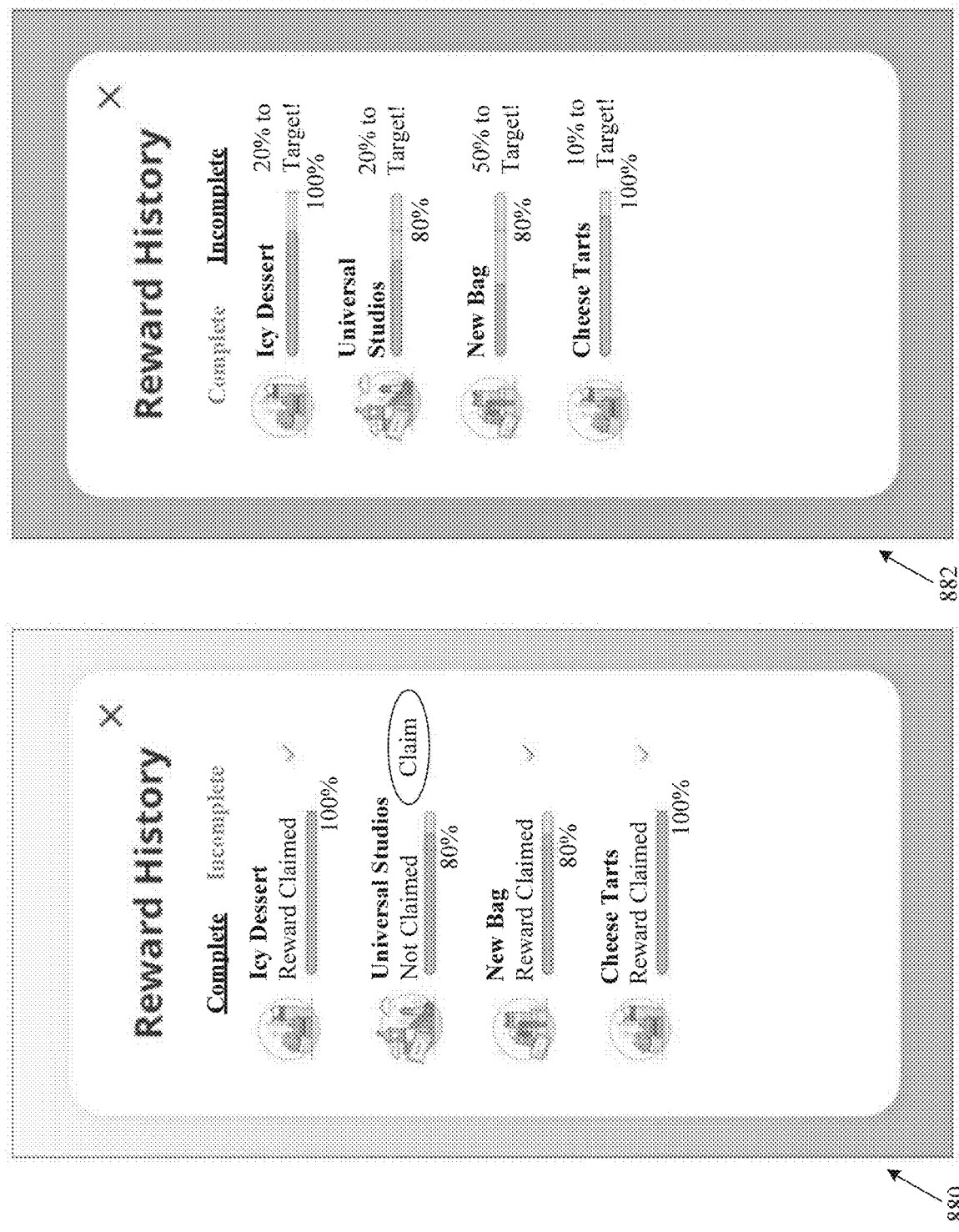

FIGS. 7H-7I show representative inhalation therapy regimen compliance incentive reward history interfaces provided by the patient/parent computing device 500. For instance, a completed reward interface 872 shown in FIG. 7H visually or graphically identifies compliance incentive rewards that the patient has already obtained or which can be immediately awarded to or claimed by the patient, along with the patient's inhalation therapy regimen compliance measure corresponding to each such reward. An incomplete reward interface 874 shown in FIG. 7I visually or graphically identifies compliance incentive rewards that the patient was unable to obtain due to insufficient compliance with their inhalation therapy regimen, and associated inhalation therapy regimen compliance measures for each such reward. Similar, analogous, or essentially the same types of interfaces can be provided with respect to incentive point awards.

Aspects of Representative Physician/Clinician User/Visual Interfaces

Figure 8:
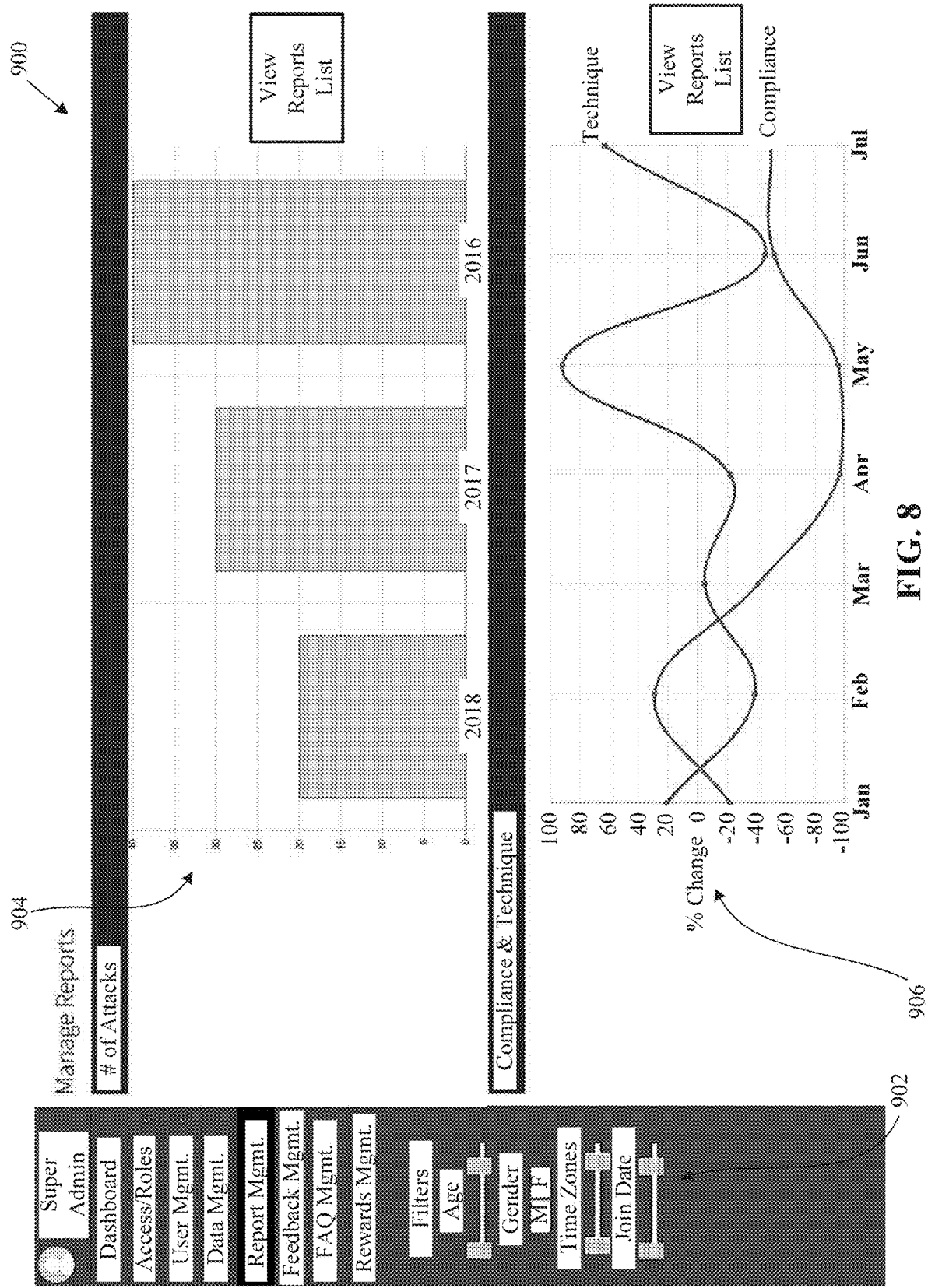
FIG. 8 shows particular representative user/visual interface provided by a physician computing device in accordance with an embodiment of the present disclosure.

FIG. 8 shows a representative user/visual interface generated or provided by a physician computing device 700 in accordance with a particular non-limiting representative embodiment of the present disclosure. In an embodiment, a physician/clinician interfaces 900 provides a main graphical window having a plurality of information display filters 902, e.g., for selecting, calculating, and presenting patient-related information filtered by the age, gender, time zone, and/or therapy start dates of one or multiple patients; and one or more sub-windows within the main graphical window, such as a first window 904 in which a cumulative number of patient respiratory attacks across a first time period are graphically presented, e.g., in bar chart form, and a second window 906 in which composite inhalation therapy technique scores and inhalation therapy regimen compliance scores across a second time period are presented, e.g., in line graph form. The first and second time periods can be selectable, or physician-definable, and the physician computing device 700 can determine or calculate the number of respiratory attacks, the composite inhalation therapy technique scores, and the inhalation therapy regimen compliance scores corresponding to their relevant time periods accordingly, e.g., from source data obtained from the remote therapy management server 600 and/or the physician computing device's local inhalation therapy database.

Aspects of Representative Inhalation Session Processes

Figure 9:
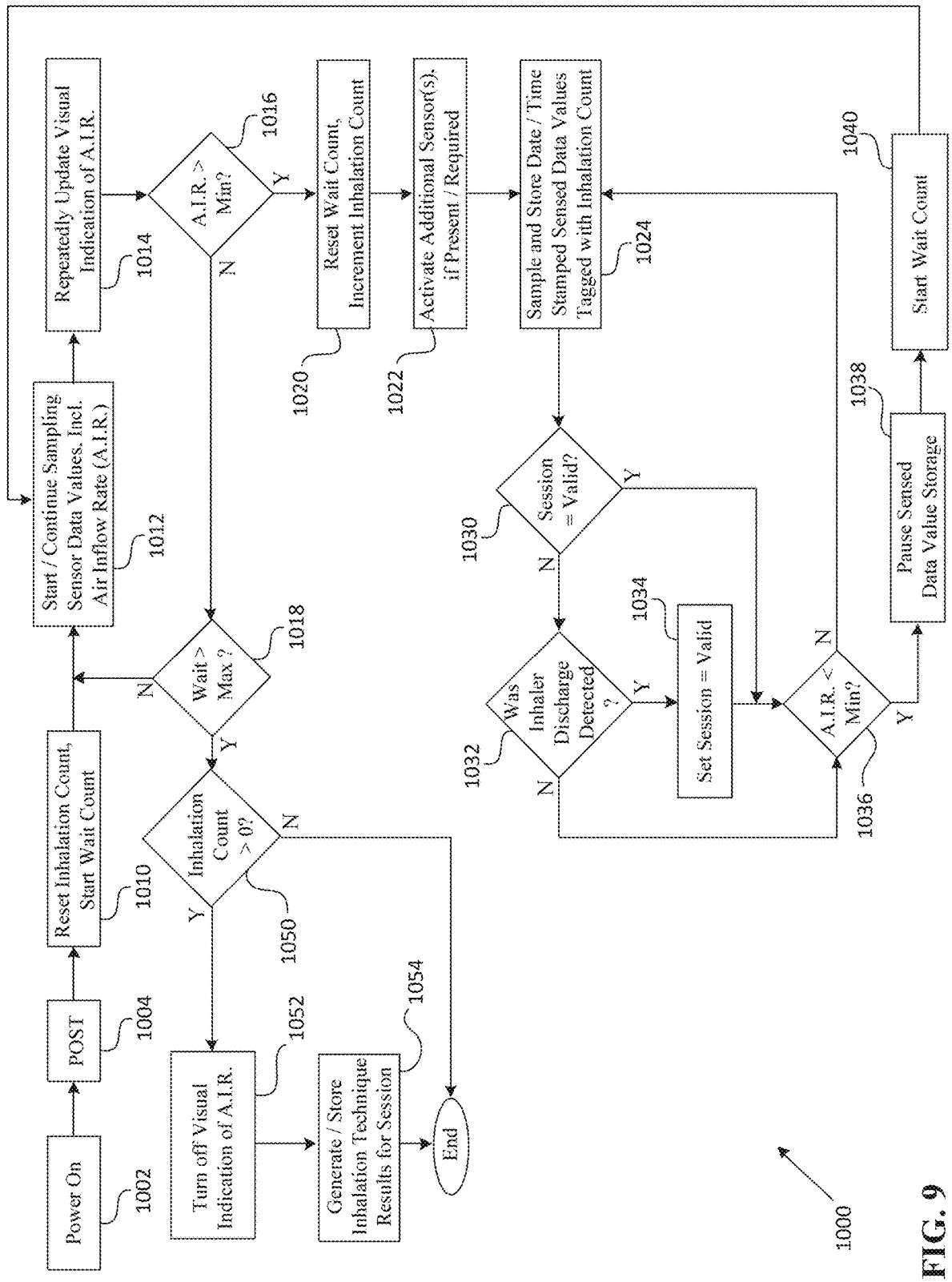
FIG. 9 is a flow diagram showing aspects of an IVHC inhalation therapy session process performed by an IVHC in accordance with an embodiment of the present disclosure.

FIG. 9 is a flow diagram showing aspects of an IVHC inhalation session process 1000 performable or performed by an IVHC 100, i.e., in association with program instruction set execution by the IVHC's processing unit 142, in accordance with a particular non-limiting representative embodiment of the present disclosure. In an embodiment, the process 1000 is initiated by an IVHC power-on condition 1002, in response to which the IVHC 100 performs power-on self-test (POST) operations in process portion 1004. The IVHC 100 then resets a current inhalation event count to zero, and starts a wait count in process portion 1010, e.g., from a time that can be defined as zero. The IVHC 100 starts sampling sensor data values relevant to the current inhalation session, including sampling air inflow rate data values, e.g., by way of the IVHC's set of gas flow sensors 120, in process portion 1012; and updates a visual representation of a set of current/most-recent air inflow rate data values, e.g., by way of the IVHC's set of LEDs 136a-d, in process portion 1014. In general, the number of individual LEDs 136a-d that are activated at any given time, and the activation color(s) of the LEDs 136a-d, depends upon the set of current/most-recent air inflow data rate values. The visual representation of the set of current/most-recent air inflow rate data values can be based on a mathematical function repeatedly applied to air inflow rate data values sampled across a predetermined time period, such as an average of air inflow rate data values sampled within each of multiple successive 0.25 second intervals, in a manner readily understood by individuals having ordinary skill in the relevant art.

Figure 10:
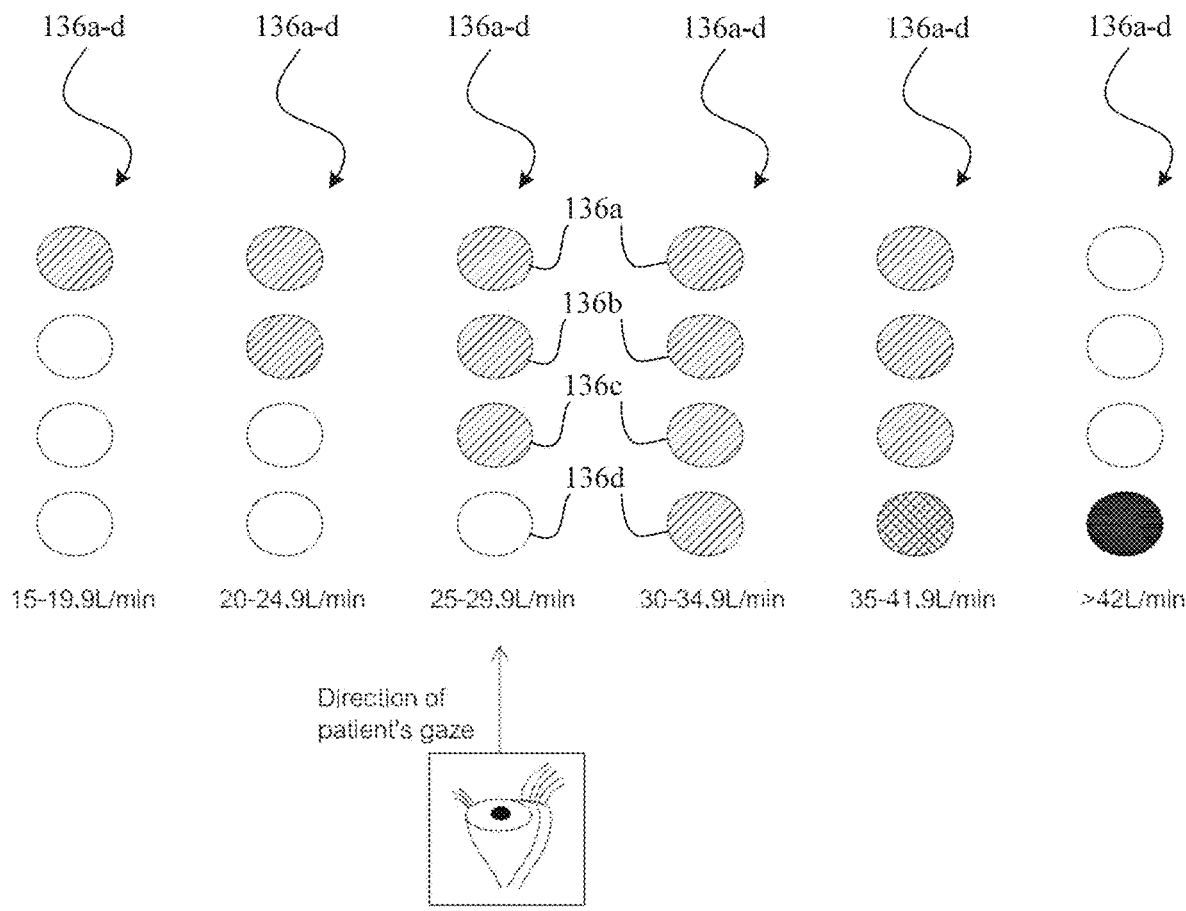
FIG. 10 is a schematic illustration showing a representative manner in which a set of IVHC LEDs can be updated in accordance with an embodiment of the present disclosure.

FIG. 10 is a schematic illustration showing a non-limiting representative manner in which the IVHC's set of LEDs 136a-d can be updated based on current/most-recent sampled air inflow rate data values in accordance with a particular non-limiting representative embodiment of the present disclosure. In this representative example, a first LED 136a is considered to reside distally furthest from the patient's face while the patient is drawing air into the IVHC 100; a second LED 136b is proximally adjacent to the first LED 136a; a third LED 136c is proximally adjacent to the second LED 136b; and a fourth LED 136d is proximally adjacent to the third LED 136c.

In an embodiment, if the set of current/most-recent sampled air inflow rate values corresponds to an air inflow rate below a minimum acceptable air inflow rate, e.g., an air inflow rate of less than approximately 15 L/min, none of the LEDs 136*a-d* are activated. If the set of current/most-recent sampled air inflow rate values corresponds to an air inflow rate between approximately 15.0-19.9 L/min, the first LED 136*a* is activated to output a first color such as green, while the other LEDs 136*b-d* remain inactive. If the set of current/most-recent sampled air inflow rate values corresponds to an air inflow rate between approximately 20.0-24.9 L/min, the first and second the LEDs 136*a,b* are activated to output the first color, while the remaining two LEDs 136*c,d* remain inactive. If the set of current/most-recent sampled air inflow rate values corresponds to an air inflow rate between approximately 25.0-29.9 L/min, the first, second, and third LEDs 136*a-c* are activated to output the first color, while the remaining LED 136*d* remains inactive. If the set of current/most-recent sampled air inflow rate values corresponds to an air inflow rate between approximately 30.0-34.9 L/min, each of the LEDs 136*a-d* is activated to output the first color. If the set of current/most-recent sampled air inflow rate values corresponds to an air inflow rate between approximately 35.0-41.9 L/min, three of the LEDs 136*a-c* are activated to output the first color, while the remaining LEDs 136*d* is activated to output a second color such as yellow. Finally, if the set of current/most-recent sampled air inflow rate values corresponds to an air inflow rate greater than or equal to a maximum acceptable air inflow rate, e.g., an air inflow rate of approximately 42.0 L/min, a single LED 136*d* is activated to output a third color such as red, while the remaining three LEDs 136*a-c* remain inactive. From the foregoing description, individuals having ordinary skill in the art will understand that an expected optimum air inflow rate can be indicated by simultaneous activation of each of the LEDs 136*a-d* to output the first color. Less optimal, sub-optimal, or non-optimal air inflow rates can be indicated by way of activating fewer than all LEDs 136*a-d* to output the first color, e.g., if below the optimum air inflow rate; or by way of activating at least one LED 136*d* to output the second or the third color, e.g., if above the optimum air inflow rate.

With reference again to FIG. 9, the IVHC 100 determines in process portion 1016 whether the current/most-recent sampled air inflow data values indicate an air inflow rate above the minimum acceptable air inflow rate, e.g., approximately 15 L/min. If so, the IVHC 100 determines whether a maximum wait time, such as 3 seconds, 5 seconds, or 8 seconds has been exceeded in process portion 1018. If the maximum wait time has not been exceeded, the IVHC 100 continues sampling air inflow rate data values by way of process portion 1012.

If in association with process portion 1016 the IVHC 100 determines that the current air inflow rate is above the minimum acceptable air inflow rate, this indicates that an inhalation event exhibiting a minimum acceptable patient inhalation airflow is underway, and the IVHC 100 correspondingly resets the wait count, and increments an inhalation event count in process portion 1020. The IVHC 100 can activate one or more additional sensors, such as a set of inhaler discharge detection sensors 121, if present or required, in process portion 1022.

In process portion 1024, as air inflow data value sampling continues, the IVHC 100 date and time stamps sampled air inflow rate data values, tags these date and time stamped data values with the current inhalation event count, and stores the inhalation event count tagged, date and time stamped air inflow rate data values in its memory 144.

The IVHC 100 additionally determines in process portion 1030 whether the current inhalation session has been flagged or tagged as valid. In several embodiments, an inhalation session is valid if (a) patient inhalation draws air into the IVHC 100 at an air inflow rate that is at least the minimum acceptable air inflow rate, and (b) discharge of a medical aerosol dose from the inhaler 90 has been detected. Thus, if the current inhalation session has not yet been flagged as valid, the IVHC 100 determines in process portion 1032 whether medical aerosol dose discharge has been detected. If so, the IVHC 100 flags the current inhalation session as valid in process portion 1034. After process portion 1034, or if no inhaler discharge of a medical aerosol dose has been detected in association with process portion 1032, the IVHC 100 determines in process portion 1036 whether the most-recent sampled air inflow data values indicate that the current/most-recent air inflow rate has dropped below the minimum acceptable air inflow rate. If not, this indicates that the current inhalation event continues, i.e., patient inhalation at an air inflow rate that meets or exceeds the minimum acceptable air inflow rate is ongoing, and the IVHC 100 correspondingly continues to sample and store inhalation event count tagged, date and time stamped sampled air inflow data values by way of process portion 1024.

If in process portion 1036 the IVHC 100 determines that the air inflow rate has dropped below the minimum acceptable air inflow rate, this indicates that the current inhalation event associated with the patient's inhalation is ending or has ended, in which case the IVHC 100 pauses the storage of inhalation event count tagged, date and time stamped sampled air inflow data values in process portion 1038, and starts a wait count in process portion 1040. The IVHC 100 then returns to process portions 1012-1018 to determine whether another inhalation event has been initiated, or whether a maximum wait time has been exceeded indicating that additional inhalation events during the current inhalation session are unlikely, and the current inhalation session can come to an end. For each distinct inhalation event, which corresponds to a patient inbreath that draws air into the IVHC 100 at an air inflow rate that meets or exceeds the minimum acceptable patient inhalation airflow, the IVHC returns to process portions 1020-1040.

If in process portion 1018 the IVHC 100 determines that the wait time has exceeded the predetermined maximum wait time, the IVHC 100 determines whether the inhalation event count is greater than zero in process portion 1050. If so, the IVHC 100 turns off the visual indication of air inflow rate in process portion 1052; and generates and stores inhalation technique scores for the current inhalation session in process portion 1054. Following process portion 1054, or after process portion 1050 if the inhalation event count was not above zero, the inhalation session process 1100 ends, and the IVHC 100 can power down.

Figure 11A:
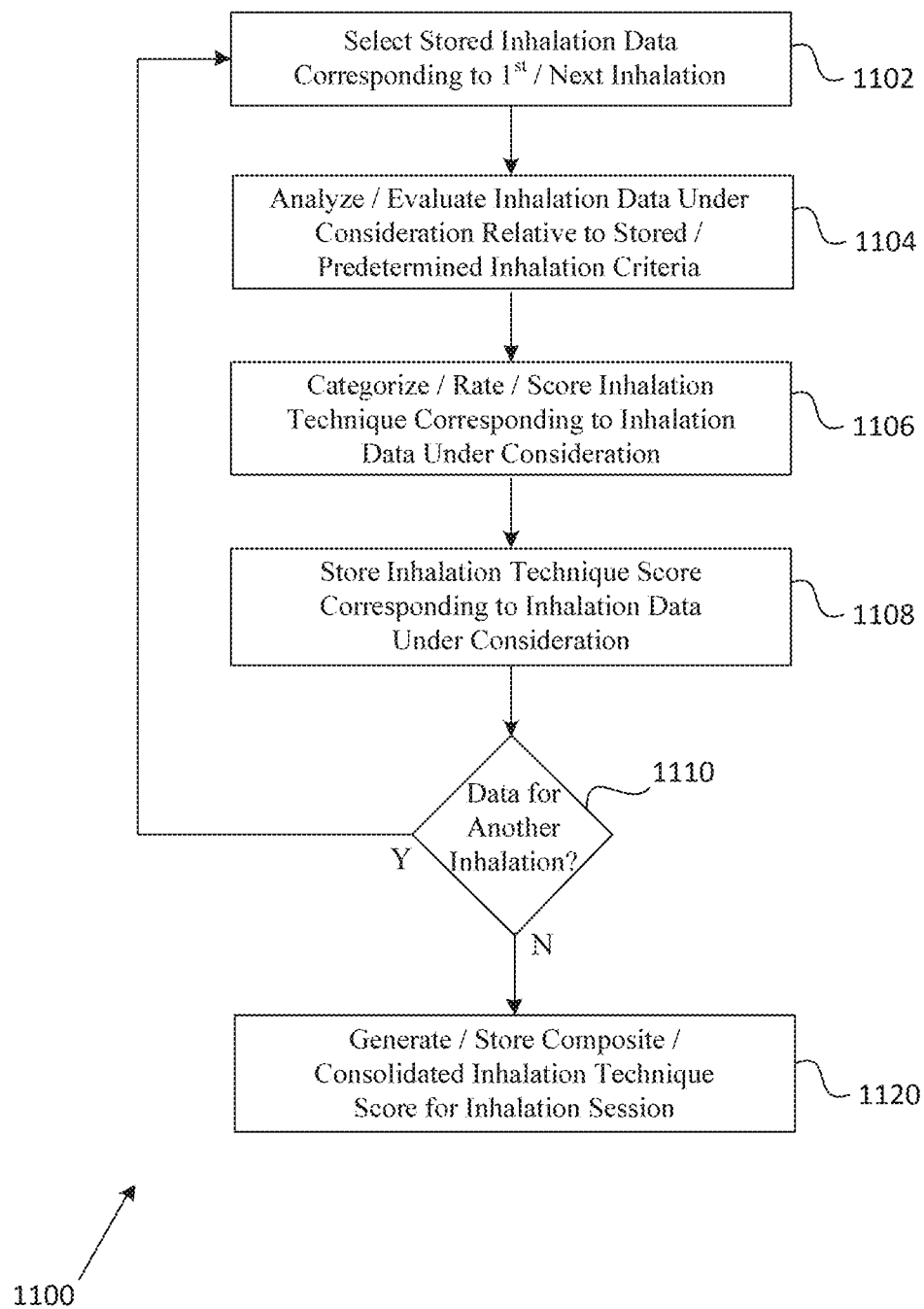
FIGS. 11A and 11B are flow diagrams respectively showing a first inhalation technique score generation process and a second inhalation technique score generation processed performed by an IVHC in accordance with an embodiment of the present disclosure.
Figures 12, 13:
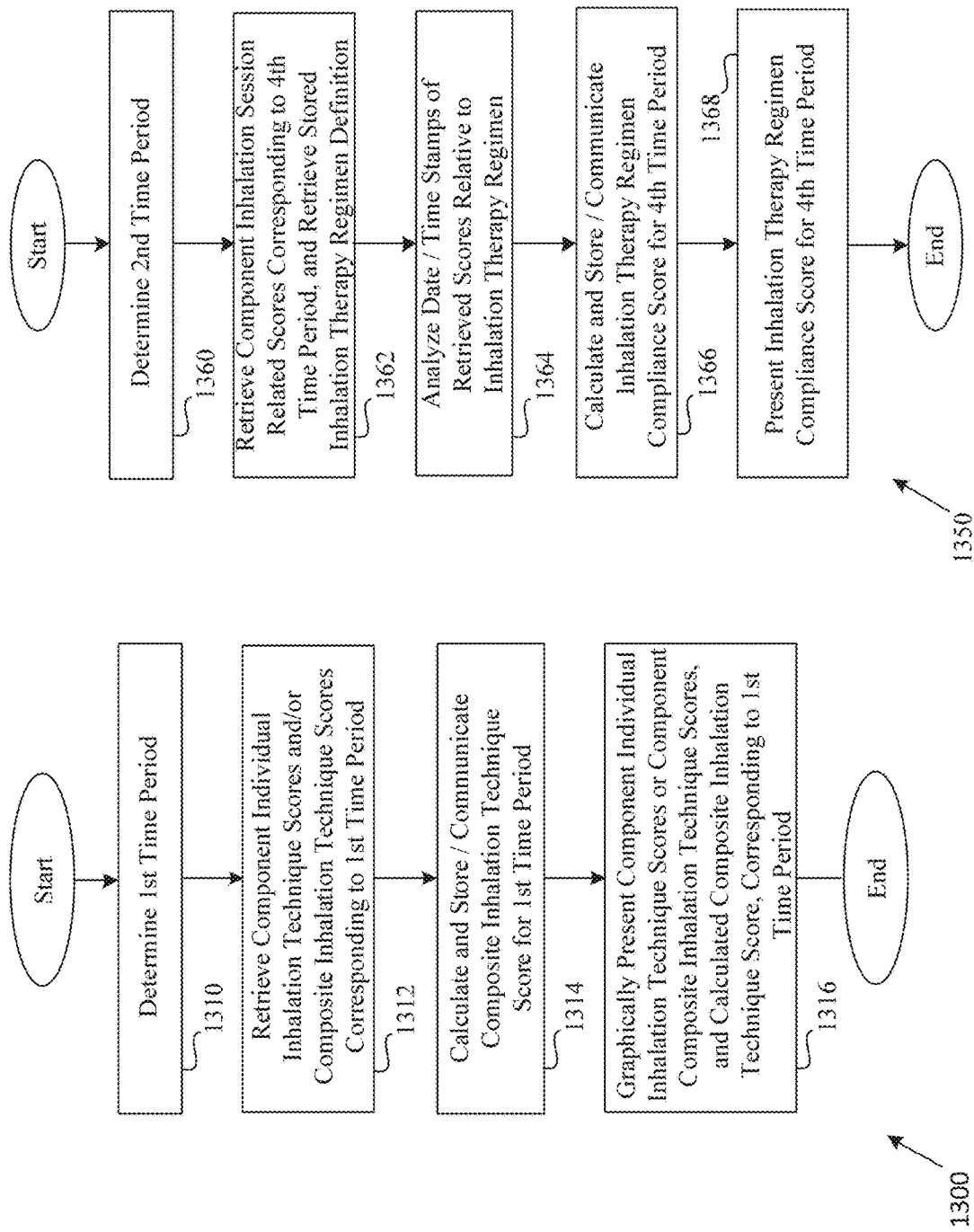
FIG. 12 is a flow diagram of a process for generating and presenting particular types of composite scores in accordance with an embodiment of the present disclosure.
FIG. 13 is a flow diagram of a process for generating and presenting inhalation therapy regimen compliance scores for a given patient in accordance with an embodiment of the present disclosure.

FIG. 11A is a flow diagram of a first inhalation technique score generation process 1100 performable or performed by an IVHC 100, i.e., in association with program instruction set execution by the IVHC's processing unit, in accordance with a particular non-limiting representative embodiment of the present disclosure, corresponding to process portion 1054 of FIG. 12. In an embodiment, the IVHC selects stored inhalation session data corresponding to a first inhalation event within the current inhalation session in process portion 1102. Such stored data includes or is inhalation event count tagged, date and time stamped sampled air inflow rate data values. In process portion 1104, the IVHC 100 analyzes the inhalation data under consideration relative to predetermined stored criteria; generates an inhalation event technique score corresponding to the current inhalation event in process portion 1106; and stores this inhalation event technique score in process portion 1108. The IVHC 100 determines whether stored data exists for another or next inhalation event within the current inhalation session in process portion 1110. If so, the IVHC returns to process portion 1102 to select and process data corresponding to the next inhalation event.

Once stored data corresponding to each inhalation event within the current inhalation session has been considered and inhalation event technique scores for each inhalation event have been generated and stored, in process portion 1120 the IVHC 100 generates and stores an inhalation session technique score for the current inhalation session. A representative manner of generating inhalation event technique scores and an inhalation session technique score in particular embodiments is considered hereafter with reference to FIG. 11B.

Figure 11B:
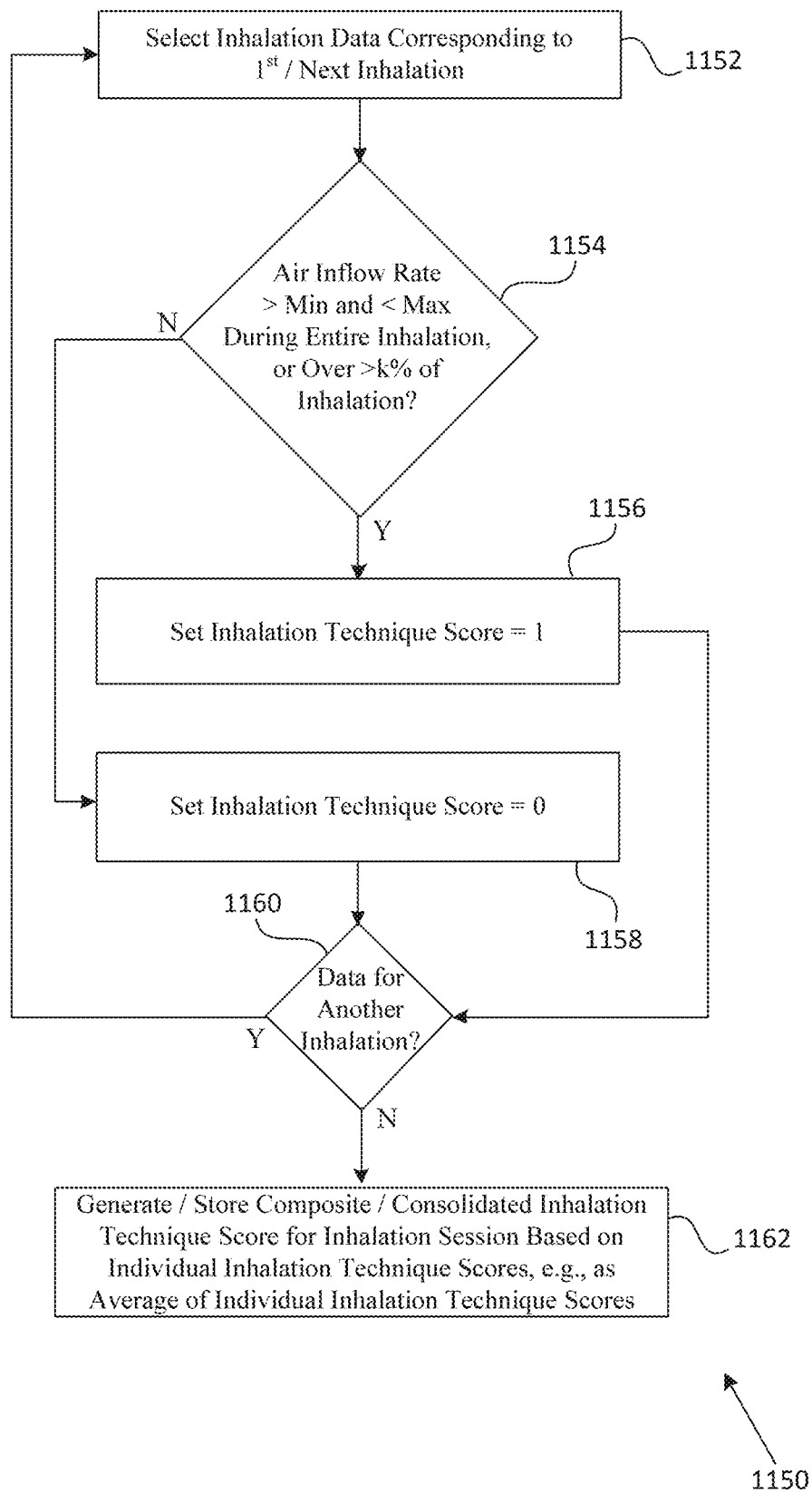

FIG. 11B is a flow diagram of a second inhalation technique score generation process 1150 performable or performed by an IVHC 100, i.e., in association with program instruction set execution by the IVHC's processing unit, in accordance with a particular non-limiting representative embodiment of the present disclosure, corresponding to process portion 1054 of FIG. 12. In an embodiment, the IVHC 100 selects stored inhalation data corresponding to a first inhalation event in process portion 1152, which includes or is inhalation event count tagged, date and time stamped sampled air inflow rate data values. In process portion 1054, the IVHC 100 then processes/analyzes the inhalation data corresponding to the currently considered inhalation event, and determines whether during the sampled air inflow rate data values for this inhalation event indicate that the air inflow rate was above the minimum acceptable air inflow rate and below the maximum acceptable air inflow rate across the entirety of the inhalation event, or over a predetermined percentage (e.g., 85%, 90%, or 95%) of the inhalation event. If so, the IVHC 100 sets the inhalation event technique score for the inhalation event under consideration to 1 in process portion 1156; otherwise, the IVHC 100 sets the inhalation event technique score to zero in process portion 1158. The IVHC 100 determines in process portion 1160 whether stored data corresponding to a next sequential inhalation event exists. If so, the IVHC 100 returns to process portion 1152. The IVHC 100 thus repeats process portions 1152-1158 to process/analyze inhalation event data and generate a corresponding inhalation event technique score for each inhalation event within the current inhalation session.

In several embodiments, in order to minimize the amount of data that the IVHC 100 needs to persistently store for communication thereof to other devices (e.g., a patient/parent computing device 500), after generating and storing the inhalation session score for the inhalation session under consideration, the IVHC 100 can disregard or discard the date and time stamped sampled data values that were generated during the inhalation session, while simply retaining the inhalation session technique score. Thus, the IVHC 100 can delete or flag as deleted the raw sampled data values and the date and time stamped sampled data values that were generated during one or more successive inhalation sessions, while persistently retaining the inhalation session technique scores corresponding to such sessions until these inhalation session technique scores have been successfully communicated to a patient/parent computing device 500. After successful communication of a set of inhalation session technique scores corresponding to one or more successive inhalation sessions to a patient/parent computing device 500, the IVHC 100 can delete or flag as deleted the set of inhalation session technique scores.

Aspects of Representative Composite Score Generation and Presentation

FIG. 12 is a flow diagram of a process 1300 for generating and presenting particular composite scores for a given patient in accordance with a particular non-limiting representative embodiment of the present disclosure, including particular composite inhalation technique scores. One or more portions of such a process 1300 can be performed by way of program instruction execution on a patient/parent computing device 500, the remote therapy management server 600, and/or a physician computing device 700, depending upon embodiment and/or situational details.

In an embodiment, the process 1300 includes a first process portion 1310 that involves determining a first time period for which a composite inhalation technique score is to be generated. The first time period can initially be set to a default first time period, such as 1 week, or 2 weeks, 1 month, 2 months, or 3 months. Additionally, the first time period can be selected by a user (e.g., the patient, or their parent, or their physician), and thus the first time period can be established in accordance with user input.

A second process portion 1312 involves retrieving individual inhalation technique scores and/or composite inhalation technique scores that will be used as component scores in generating the composite inhalation technique score across the first time period. For instance, if the first time period is the past week, then daily individual inhalation technique scores for each inhalation session that occurred on each day of the past week can be retrieved and used to generate the composite inhalation technique score for the past week. Alternatively, if the first time period is the past 3 months, then previously calculated and stored weekly or monthly composite inhalation technique scores can be retrieved and used to generate the composite inhalation technique score for the past 3 months.

A third process portion 1314 involves calculating the composite inhalation technique score across the first time period, such as by way of averaging component inhalation technique scores that were retrieved in association with the second process portion 1304. The third process portion 1314 can additionally involve storing the calculated composite inhalation technique score for the first time period, and possibly communicating the calculated composite inhalation technique score for the first time period to one or more electronic destinations, such as other computing systems/devices.

A fourth process portion 1316 involves graphically presenting (e.g., by way of a bar chart or line segment graph) on a visual/user interface at least some component inhalation technique scores from which the composite inhalation technique score corresponding to the first time period was calculated, and also presenting on the visual/user interface the calculated composite inhalation technique score corresponding to the first time period. For instance, if the first time period is the past week, the visual/user interface can present as a bar or data point in a chart or graph for each day of the past week a composite inhalation technique score for that day (e.g., which can be calculated as an average of the individual inhalation technique scores for that day), and can also present the calculated composite inhalation technique score for the entirety of the past week. Alternatively, if the first time period is the past 3 months, the visual/user interface can present as a bar or data point in a chart or graph for each week of each month of the past 3 months a composite inhalation technique score for that week (e.g., which can be calculated as an average of the composite inhalation technique scores for each day of a given week), and can also present the calculated composite inhalation technique score for the entirety of the past 3 months.

Aspects of Representative Regimen Compliance Score Generation and Presentation

FIG. 16 is a flow diagram of a process 1350 for generating and presenting inhalation therapy regimen compliance scores for a given patient in accordance with a particular non-limiting representative embodiment of the present disclosure. One or more portions of such a process 1350 can be performed by way of program instruction execution on a patient/parent computing device 500, the remote therapy management server 600, and/or a physician computing device 700, depending upon embodiment and/or situational details.

The process 1350 includes a first process portion 1360 involving determination of a second time period relative to which an inhalation therapy regimen compliance score is to be calculated. The second time period can initially be set to a default second time period, such as 1 week, or 2 weeks, 1 month, 2 months, or 3 months. Additionally, the second time period can be selected by a user (e.g., the patient, or their parent, or their physician), and thus the second time period can be established in accordance with user input.

The process 1350 further includes a second process portion 1362 involving retrieving (a) component inhalation technique scores corresponding to the fourth time period, where such component inhalation session scores can include individual inhalation technique scores and/or composite inhalation technique scores having date/time stamps that fall within the fourth time period; and (b) a stored inhalation therapy regimen definition, e.g., a current inhalation therapy regimen definition for the patient under consideration. A third process portion 1364 involves analyzing in the context of the fourth time period the date/time stamps of the retrieved component inhalation technique scores relative to a prescribed or planned schedule of inhalation sessions specified by the retrieved inhalation therapy regimen definition. A fourth process portion 1366 involves calculating an inhalation therapy regimen compliance score for the fourth time period, e.g., as a percentage of the aforementioned component inhalation technique scores having date/time stamps that align with, fall within, approximately match, or match the prescribed schedule of inhalation sessions. The fourth process portion 1366 can also involve storing and/or communicating the calculated inhalation therapy regimen compliance score for the fourth time period to one or more electronic destinations, such as other computing systems/devices. A fifth process portion 1368 includes presenting, e.g., by way of a visual/user interface, the calculated inhalation therapy regimen compliance score for the fourth time period.

Aspects of Representative Compliance Incentive Award Definition/Selection

Figure 14:
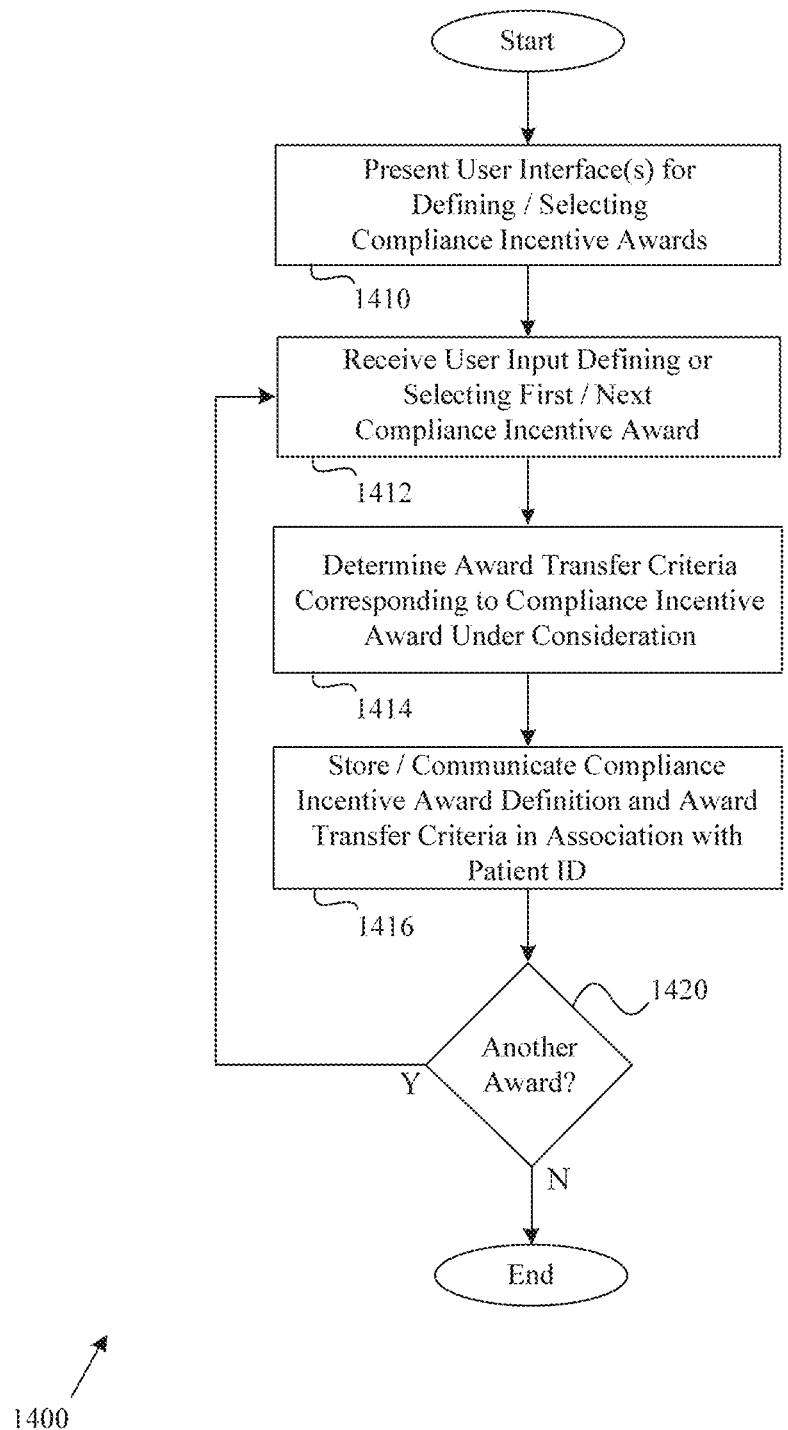
FIG. 14 is a flow diagram of a process for managing the definition and/or selection of particular compliance incentive awards in accordance with an embodiment of the present disclosure.

FIG. 14 is a flow diagram of a process 1400 for managing the definition and/or selection of compliance incentive awards, e.g., inhalation therapy regimen compliance incentive awards, for a given patient in accordance with a particular non-limiting representative embodiment of the present disclosure. One or more portions of such a process 1400 can be performed by way of program instruction execution on a patient/parent computing device 500 or possibly the remote therapy management server 600, depending upon embodiment and/or situational details.

In an embodiment, the process 1400 includes a first process portion 1410 involving presenting a set of visual/user interfaces for defining/selecting compliance incentive awards; and a second process portion 1412 involving receiving user input defining or selecting a particular compliance incentive award under consideration for the patient (e.g., by way of user input that identifies a compliance incentive award for which data does not already exist in the reward/award database 684, or user input that selects a particular compliance incentive award corresponding to compliance incentive award data previously stored in the reward/award database 684). Such user input can define or identify a particular compliance incentive award, as well as a time period during which the compliance incentive award remains available for transfer to the patient. A third process portion 1414 involves determining a set of compliance incentive award transfer criteria in accordance with which the incentive award can be transferred to the patient when such criteria are satisfied. Such criteria can be received by way of user input directed to the aforementioned set of visual/user interfaces, and can specify one or more thresholds or requirements that the patient's inhalation therapy regimen compliance scores, possibly in association with one or more other patient scores, e.g., composite inhalation technique scores, must meet relative to a particular time period. A fourth process portion 1416 involves storing/communicating a compliance incentive award definition and associated compliance incentive award transfer criteria in association with the patient's ID. A fifth process portion 1420 can determine whether another compliance incentive award for the patient is to be defined or selected, in which case control can return to the second process portion 1412, otherwise the process 1400 can end.

Incentive Point Incrementation, Allocation, and Redemption Processes

Figure 15:
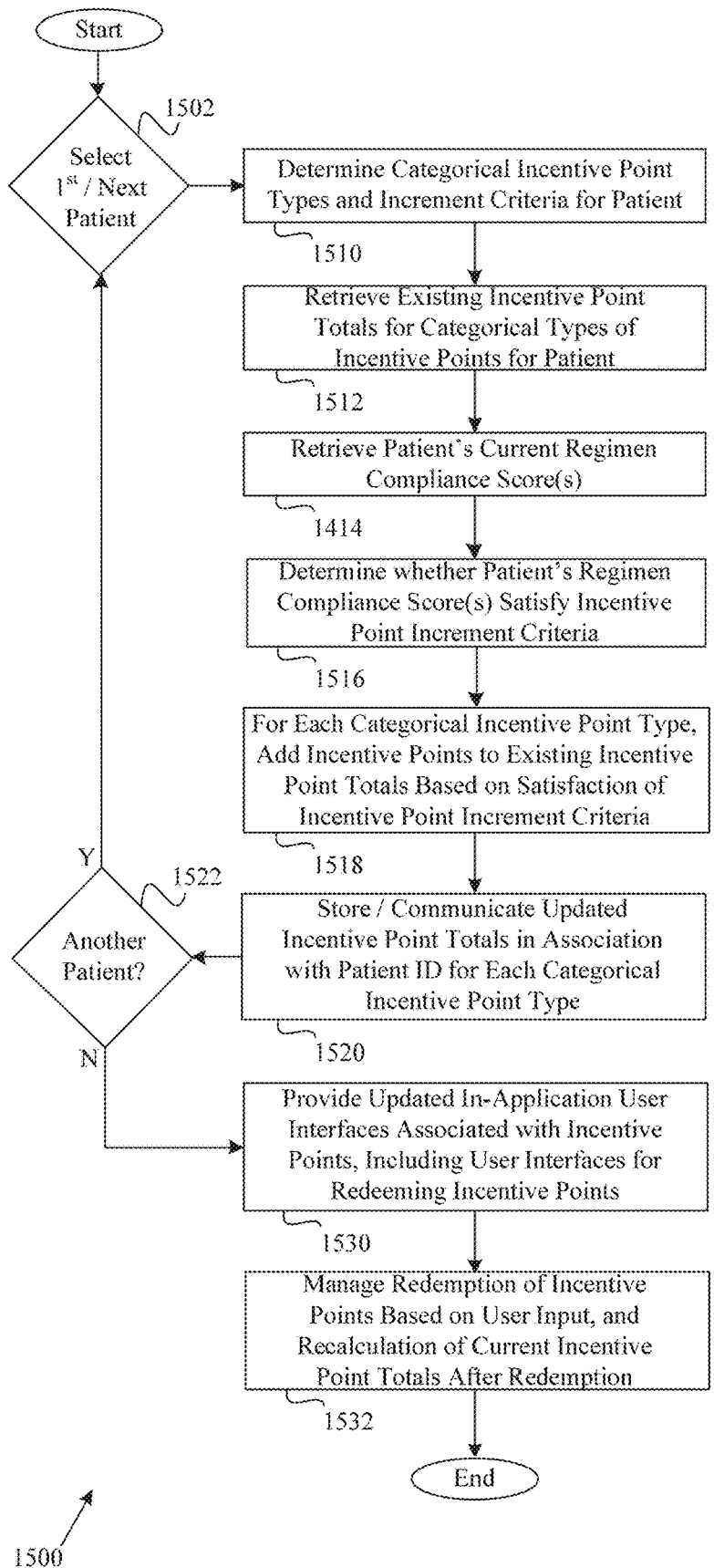
FIG. 15 is a flow diagram of a process for incrementing, allocating, and managing the redemption of incentive points in accordance with an embodiment of the present disclosure.

FIG. 15 is a flow diagram of a process 1500 for incrementing, allocating, and managing the redemption of incentive points for patients, such as different categorical types of incentive points, in accordance with a particular non-limiting representative embodiment of the present disclosure. One or more portions of such a process 1500 can be performed by way of program instruction execution on a patient/parent computing device 500 and/or the remote therapy management server 600, depending upon embodiment and/or situational details.

In an embodiment, the process 1500 includes a first process portion 1502 involving selecting a first or next patient for consideration (e.g., from among patients having patient records in the remote therapy management server's patient database 680). A second process portion 1510 involves determining one or more categorical incentive point types that are available or applicable to the patient under consideration. Different categorical incentive point types can include one or more of (a) first redeemable incentive points that can be redeemed or exchanged for physical goods, or discounts/vouchers therefor, which are offered by way of an incentive point redemption app executing on the corresponding patient/parent computing device 500, e.g., where the incentive point redemption app can provide patient and/or parent access to a set of user interfaces by which particular physical good(s) and/or discounts/vouchers can be selected, and transferred to the patient or parent by way of (i) shipping to a particular physical address (e.g., by way of a parcel delivery service for a physical good); (ii) picking up from a specified physical location near or generally near that of the patient or parent (e.g., for physical good pickup, such as from a physical store location within a certain distance of the patient or parent); and/or (iii) electronic transfer of information corresponding to a physical good or a discount/voucher therefor, where such information can include an electronically readable or printable information (e.g., a Quick Response (QR) code or barcode, or a printable voucher); (b) second redeemable incentive points that can be redeemed or exchanged in-game for virtual goods, such as virtual accessories or clothing (e.g., for a patient avatar), or in-game accessories that aid or further enable patient game play; (c) accumulative incentive points that can establish patient permissions, status, or standing on the inhalation therapy relevant social media platform; and (d) bonus incentive points, which can be awarded to the patient in accordance with predetermined criteria, or quasi-randomly (e.g., in association with patient game play, such as on quasi-random game play days based on one or more regimen compliance scores for the patient).

Particular non-limiting representative aspects of the present disclosure have been described herein and shown in the accompanying FIGs. Individuals having ordinary skill in the relevant art will understand that multiple variations upon or modifications to such representative aspects of the present disclosure can exist, where such variations or modifications remain within the scope of the present disclosure.

The invention claimed is:

1. A system for managing aspects of respiratory therapy, including inhalation therapy, for each of a set of patients, comprising:
a set of intelligent valved holding chamber (IVHC) devices, each IVHC device configured to correspond to a particular patient and providing:
a distal receiver portion couplable with a pressurized metered dose inhaler (pMDI), and providing:
a set of air inlets fluidically coupled to an external environment of the IVHC device; and
a lumen structure into which a medical aerosol dose discharged from the pMDI is introducible;
an intermediate sleeve member extending proximal to the receiver portion and providing:
a chamber fluidically couplable to the air inlets and the lumen of the receiver portion, into which the medical aerosol dose can travel in a proximal direction after discharge from the pMDI, wherein the chamber has a volume greater than that of the lumen structure; and
an exit aperture fluidically coupled to the chamber;
a mouthpiece portion extending proximal to the receiver portion and providing an inhalation/exhalation aperture at a proximal end thereof, which is fluidically couplable to the chamber of the intermediate sleeve member, and which is configured to be inserted into the patient's mouth, by which the patient can draw air from the external environment into the and through the IVHC device and inhale the medical aerosol dose into the patient's respiratory passages;
a one-way valve structure configured for enabling distal-to-proximal flow of gases through the intermediate sleeve member, and preventing proximal-to-distal flow of gases through the intermediate sleeve member;
a set of sensors, including at least one gas flow sensor configured for detecting air inflow into a portion of the IVHC device;
a first processing unit coupled to the set of sensors;
a power source coupled to the first processing unit;
a user interface panel providing a set of patient selectable controls and a set of visual feedback elements;
a communication unit coupled to the first processing unit; and
a memory coupled to the set of sensors and the first processing unit and storing first program instructions executable by the first processing unit, which when executed cause the first processing unit to:
obtain data values including sampled air inflow data values sensed by the at least one gas flow sensor from the set of sensors;
determine whether an inhalation therapy session is occurring by way of:
determining whether each inhalation event is occurring by way of determining whether sampled air inflow data values have reached or exceeded a predetermined threshold air inflow rate; and
determining whether the medical aerosol dose discharge has occurred during each inhalation event;
during the inhalation therapy session, multiple date and time stamped sampled air inflow data values for each inhalation event of the inhalation therapy session; and
following the inhalation therapy session, determine and store a date and time stamped inhalation technique score for the inhalation therapy session based on the set of multiple date and time stamped sampled air inflow data values;
for each IVHC device, a mobile/portable computing device configured to be associated with the patient and configured for communication with the IVHC device, wherein the mobile/portable computing device comprises:
a second processing unit;
a user interface device that includes a display; and
a memory coupled to the second processing unit, the memory storing second program instructions executable by the second processing unit, which when executed cause the second processing unit to:
communicate with the IVHC device to obtain a set of date and time stamped inhalation technique scores stored in the memory of the IVHC device; and
process the set of multiple date and time stamped inhalation technique scores obtained from the IVHC device to generate at least one composite inhalation technique score, wherein each composite inhalation technique score represents the patient's inhalation technique across multiple inhalation therapy sessions corresponding to a predetermined or selectable time period,
wherein the memory of the mobile/portable computing device further stores an inhalation therapy regimen for the patient corresponding to the IVHC device, and wherein the second program instructions when executed cause the second processing unit to further:
analyze the set of date and time stamps of inhalation technique scores relative to a set of time periods corresponding to an inhalation therapy schedule established by the inhalation therapy regimen;
determine a set of inhalation therapy compliance scores for each time period under consideration, wherein each inhalation therapy regimen compliance score represents an extent or measure of the patient's compliance with their inhalation therapy regimen across a particular time period; and present a set of user/visual interfaces on the user interface device, wherein the set of user/visual interfaces is configurable or configured to visually, graphically, or pictorially represent particular scores, ratings, or measures indicating the patient's current, recent, and/or historical inhalation therapy technique and inhalation therapy regimen compliance; and a remote therapy management server configured for communication with each mobile/portable computing device and coupled to a reward/award database, the remote therapy management server comprising:
a third processing unit; and
a memory storing third program instructions executable by the third processing unit, including a compliance application program, wherein the third program instructions when executed cause the third processing unit to, for each mobile/portable computing device configured to be associated with the patient:
communicate with the mobile/portable computing device;
obtain from the mobile/portable computing device inhalation therapy regimen compliance scores and composite inhalation technique scores from the mobile/portable computing device for the patient;
analyze the set of inhalation therapy regimen compliance scores and the at least composite inhalation technique score for the patient corresponding to a particular time period relative to stored criteria;
determine whether the set of inhalation therapy regimen compliance scores and the at least composite inhalation technique score for the patient associated with the mobile/computing device for the particular time period meet or exceed at least incentive points award threshold;
selectively award or allocate a particular number of incentive points configured for the patient, including by way of:
applying an above-unity multiplier to a current incentive point total configured to correspond to the patient in response to sequentially uninterrupted or unbroken patient attainment of the at least incentive points award threshold; and/or
allocating a quasi-random incentive points bonus to the current incentive points total configured to correspond to the patient if the set of inhalation therapy regimen compliance scores and/or the at least composite inhalation technique score exceed a bonus threshold level relative to one or more time periods; and
transferring the current incentive points total for the patient to the mobile/portable computing device.

2. The system of claim 1, wherein the inhalation therapy session corresponds to a single medical aerosol discharge and multiple inhalation events associated with a tidal breathing protocol, and wherein the inhalation technique score provides a single value that represents patient inhalation technique across the multiple inhalation events.

3. The system of claim 1, wherein the lumen structure includes structural elements configured for creating a spiral flow of the medical aerosol dose and inhaled air passing through the lumen structure.

4. The system of claim 3, wherein the structural elements comprise a plurality of curved structures disposed nonlinearly with respect to an IVHC central axis defined along a proximal to distal direction through the IVHC, and wherein the plurality of curved structures guide or deflect inhaled air and the medical aerosol dose passing through the lumen structure along spiral pathways.

5. The system of claim 1, wherein the second program instructions when executed further cause the second processing unit to communicate each of (a) patient data, scores, ratings, or measures, and (b) respiratory attack indications to the remote therapy management server.

6. The system of claim 1, wherein the third program instructions when executed further configured to cause the third processing unit to at least one of:
(a) provide the patient associated with the mobile/portable computing device access to a set of games playable by the patient, wherein for at least one game within the set of games a level of game play, aspects of a game avatar, game player characteristics or capabilities, and/or game player accessories are established, adjusted, or varied based on inhalation therapy regimen compliance scores and/or composite inhalation technique scores corresponding to the patient; and
(b) provide the patient associated with the mobile/computing device and/or a caretaker associated with the patient access to a social media platform; and
establish and/or adjust a social media standing, rating, categorization, or communication capability of the patient based on patient inhalation therapy regimen compliance scores and/or inhalation patient composite inhalation technique scores.

7. The system of claim 1, further comprising a set of physician computing devices configured for communication with the remote therapy management server, wherein each physician computing device is configured to correspond to a physician responsible for one or more patients having IVHC devices corresponding thereto, and each physician computing device comprises: a fourth processing unit; a user interface including a display device; and a memory storing fourth program instructions executable by the fourth processing unit for causing the fourth processing unit to: communicate with the remote therapy management unit to obtain the set of inhalation therapy regimen compliance scores and the at least composite inhalation technique score configured to correspond to the one or more patients for whom the physician is responsible; and present on the user interface visual representations of the set of inhalation therapy regimen compliance scores and/or the at least inhalation therapy technique score corresponding to individual patients or groups of patients based on predetermined or physician-selectable criteria.

8. The system of claim 6, further comprising a set of physician computing devices configured for communication with the remote therapy management server, wherein each physician computing device is configured to correspond to a physician responsible for one or more patients having IVHC devices corresponding thereto, and each physician computing device comprises: a fourth processing unit; a user interface including a display device; and a memory storing fourth program instructions executable by the fourth processing unit for causing the fourth processing unit to: communicate with the remote therapy management unit to obtain the set of inhalation therapy regimen compliance scores and the at least composite inhalation technique score configured to correspond to the one or more patients for whom the physician is responsible; and present on the user interface visual representations of the set of inhalation therapy regimen compliance scores and/or the at least composite inhalation therapy technique score configured to correspond to individual patients or groups of patients based on a predetermined or physician-selectable criteria, wherein the third program instructions and the fourth program instructions configured provide the physician access to the social media platform, such that physicians can interact with patients and/or caretakers associated with patients by way of the social media platform.

9. The system of claim 1, wherein the IVHC device further comprises:
a geolocation unit providing a micro-GPS or nano-GPS integrated circuit chip coupled to the first processing unit, and which is configured for capturing satellite generated signals to facilitate or enable the determination of a geospatial or geographic location of the receiver portion on a real time or near-real time basis, wherein the communication unit includes a wireless communication unit, and wherein the wireless communication unit comprises a cellular data network communication circuitry providing a cellular modem coupled to a subscriber identity module (SIM) card and a cellular communication antenna, and wherein the wireless communication unit is configured for wireless signal communication by way of a wireless communication modality, and is also configured for wireless signal communication by way of a cellular data network using the cellular data network communication circuitry when communication by way of the wireless communication modality is unreliable or unavailable but communication with the cellular data network is available.

10. The system of claim 9, wherein the IVHC device further comprises a set of emergency alert/SOS buttons activatable by the patient to indicate that the patient is currently experiencing a respiratory attack, and wherein the IVHC device is configured to communicate an emergency alert/SOS notification to one or more electronic/computing destinations by way of wireless data communication using the wireless communication unit in response to the patient's activation of the set of emergency alert/SOS buttons, wherein the emergency alert/SOS notification comprises a date and time stamp, a patient ID, and a current geolocation corresponding to the IVHC device.

11. The system of claim 10, wherein the mobile/portable computing device provides a visual/graphical emergency alert SOS button activatable by the patient or the patient's parent, and wherein in response to an activation of the virtual/graphical emergency alert SOS button the mobile/portable computing device communicates an emergency alert/SOS notification to the remote therapy management server.

* * * * *